(12) United States Patent
Pacifico et al.

(10) Patent No.: US 12,205,107 B2
(45) Date of Patent: Jan. 21, 2025

(54) SERVER SYSTEMS AND METHODS FOR VALUING BLOCKCHAIN TOKENS BASED ON ORGANIZATIONAL PERFORMANCE

(71) Applicant: USSCYBER INC., Cape Coral, FL (US)

(72) Inventors: Michel Pacifico, Cape Coral, FL (US); Cree Finnikin, Grand Cayman (KY)

(73) Assignee: USSCYBER INC., Cape Coral, FL (US)

( * ) Notice: Subject to any disclaimer, the term of this patent is extended or adjusted under 35 U.S.C. 154(b) by 252 days.

(21) Appl. No.: 17/887,090

(22) Filed: Aug. 12, 2022

(65) Prior Publication Data

US 2023/0050782 A1 Feb. 16, 2023

Related U.S. Application Data

(60) Provisional application No. 63/232,792, filed on Aug. 13, 2021.

(51) Int. Cl.
| | | |
|---|---|---|
| *G06Q 20/36* | (2012.01) | |
| *G06Q 40/04* | (2012.01) | |
| *H04L 9/00* | (2022.01) | |

(52) U.S. Cl.
CPC ......... *G06Q 20/3672* (2013.01); *G06Q 40/04* (2013.01); *H04L 9/50* (2022.05); *G06Q 2220/00* (2013.01)

(58) Field of Classification Search
CPC ............... G06Q 20/3672; G06Q 40/04; G06Q 2220/00; G06Q 20/065; G06Q 20/12;

(Continued)

(56) References Cited

U.S. PATENT DOCUMENTS 9,555,333 B2 * 1/2017 Hansen ................ A63F 13/795
2008/0040253 A1 * 2/2008 Jacobson ............... G06Q 40/00
705/37

(Continued)

FOREIGN PATENT DOCUMENTS

| EP | 3432240 A1 * | 1/2019 | ............. G06Q 20/02 |
| KR | 2020-00228285 A * | 3/2020 | ............. G06Q 50/10 |

OTHER PUBLICATIONS

Pacifico, Michel: New Blockchain Platform, Jul. 5, 2019, Medium, p. 1 (Year: 2019).*

(Continued)

*Primary Examiner* — Bijendra K Shrestha
(74) *Attorney, Agent, or Firm* — Greenberg Traurig, LLP

(57) ABSTRACT

A system for assigning value to a digital asset is disclosed. In some embodiments, the system is configured to link the monetary valuation for a digital asset to a sport team's performance. In some embodiments, the monetary valuation for a digital asset associated with a sport team can increase or decrease based on historical performance or live performance. In some embodiments, the system includes a dashboard that displays various sport teams and the value of associated digital assets. In some embodiments, the system includes functionality that allows a user to buy, sell, and/or trade digital assets associated with a sports team. In some embodiments, the system includes a digital wallet configured to store the digital asset and/or a crypto key that enables access to the digital asset on a blockchain. In some embodiments, the digital asset is a digital token or a digital coin.

10 Claims, 79 Drawing Sheets

1) A user completes the checkout process by depositing one of the main supported Crypto currencies on the system by sending it to a specific address. 31/79 155%+
2) The transaction is received by the WSCE Cloud system and recorded to the WSCE Blockchain.
3) Funds are sent to the WSCE Online Wallet and recorded to the WSCE Blockchain.
4) The system completed the pending sale by finalizing the transaction and transferring the requested Team Tokens to the user WSCE Online Wallet and records it to the WSCE Blockchain.
5) User has the option of:
 o Leaving the Team Tokens in their online Wallet
 o Sending it to their WSCE Client Downloaded Wallet
 o Selling the Tokens and converting it Fiat via Ripple Network to arrive in their bank account
 o Selling the Tokens and converting to any of the supported cryptocurrencies and send them to an external wallet
 o Selling the Tokens and converting to WSCE Coin which can be stored in their online WSCE Wallet or WSCE Client Downloaded Wallet
 o All recorded to the WSCE Blockchain platform

(58) Field of Classification Search
CPC ............ G06Q 20/367; G06Q 20/4014; G06Q 30/0641; G06Q 30/0633; H04L 9/50; H04L 2209/56
See application file for complete search history.

(56) References Cited

U.S. PATENT DOCUMENTS

2020/0005284 A1   1/2020  Vijayan
2020/0330883 A1*  10/2020 Amaitis ................ A63F 13/792

OTHER PUBLICATIONS

Saggu et al.: Anticipatory Gain and Even-driven Losses in Blockchain-based Fan Tokens: Evidence from the FIFA World Cup, 2024 , Research in International Business and Finance, 70, pp. 1-16 (Year: 2024).*
Shorin, G: Team Payroll Versus Performance in Professional Sports: Is Increased Spending Associated with Greater Success? 2017, Duke University, North Carolina, pp. 1-69 (Year: 2017).*
International Search Report and Written Opinion in related International Application No. PCT/US2022/040214 dated Nov. 21, 2022, 9 pages.
Arsenal Media; "$AFC Fan Token: Everything you need to know," Aug. 6, 2021; online <https://www.arsenal.com/news/afc-fan-token-everything-you-need-know>.
"Team Vitality launches its fan token in collaboration with Socios.com," Jul. 18, 2021; online ,https://vitality.gg/en/partnership/team-vitality-launches-its-fan-token-in-collaboration-with-socios-com/>.
Pacifico; New Blockchain platform, Jul. 5, 2019; online; <https://medium.com/@michelpacifico/new-blockchain-platform-a016716eb674>.

* cited by examiner

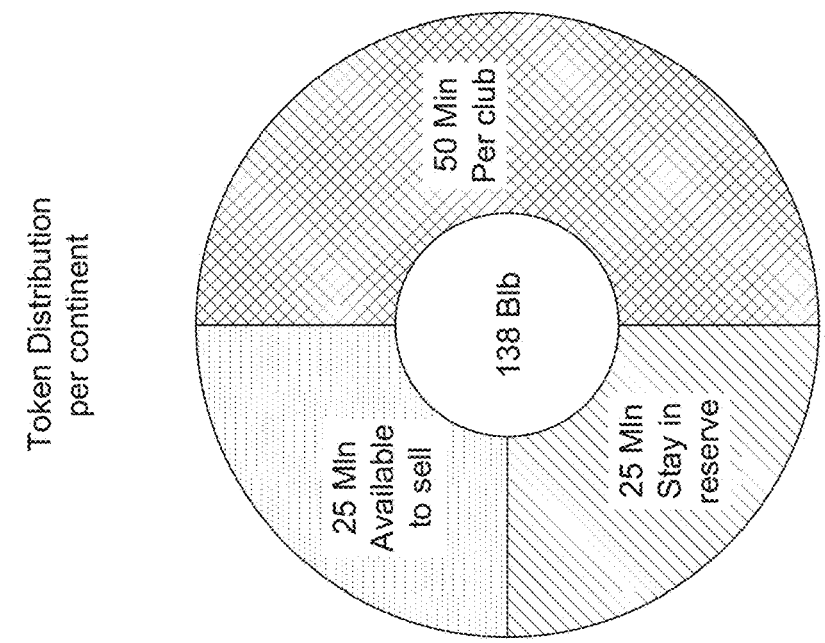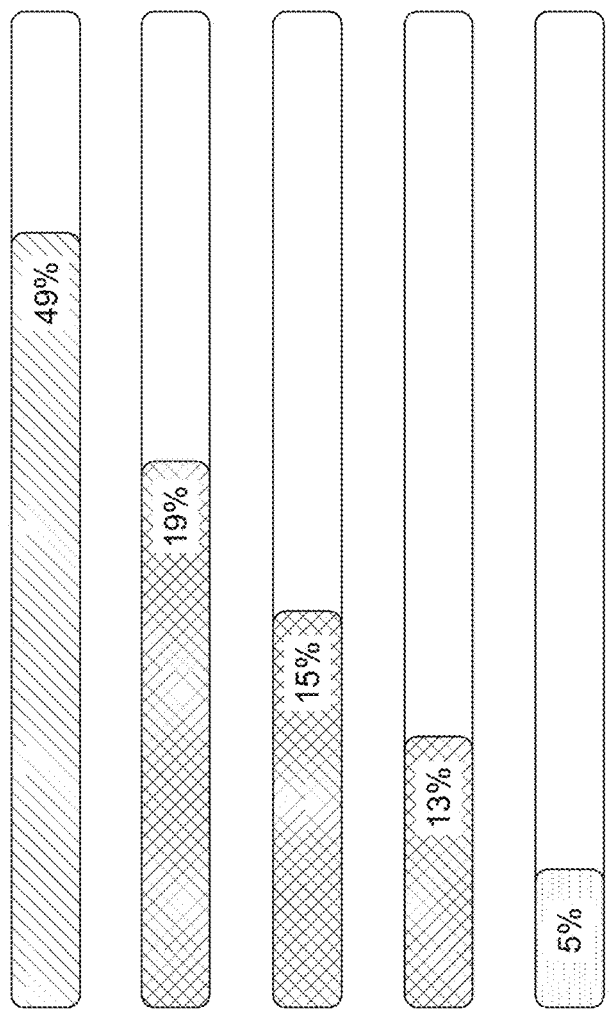
FIG. 4

Diagram of Teams Liquidation-Profits

USSCyber will pay 25 cents per every transaction in the second market. 50 million tokens sells distribution.
50% for the team.
30% for USSCyber platform.
20% for liquidation.

Clubs will be able to sell their merchandising but accepting tokens and will be able to sell their tokens back to the secondary market.

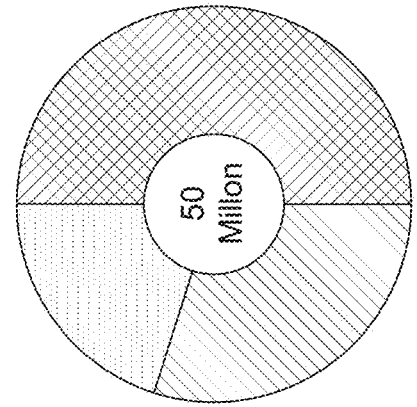

Token sells distribution

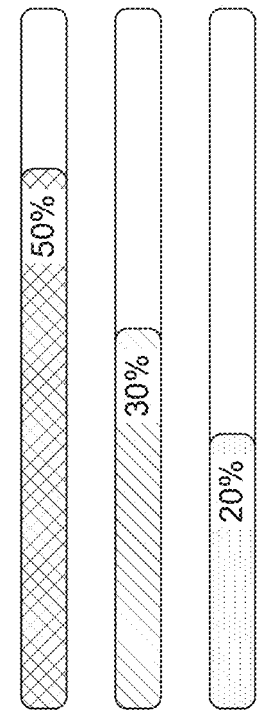

Soccer teams WFCE Exchange Platform reserve liquidation

FIG. 5

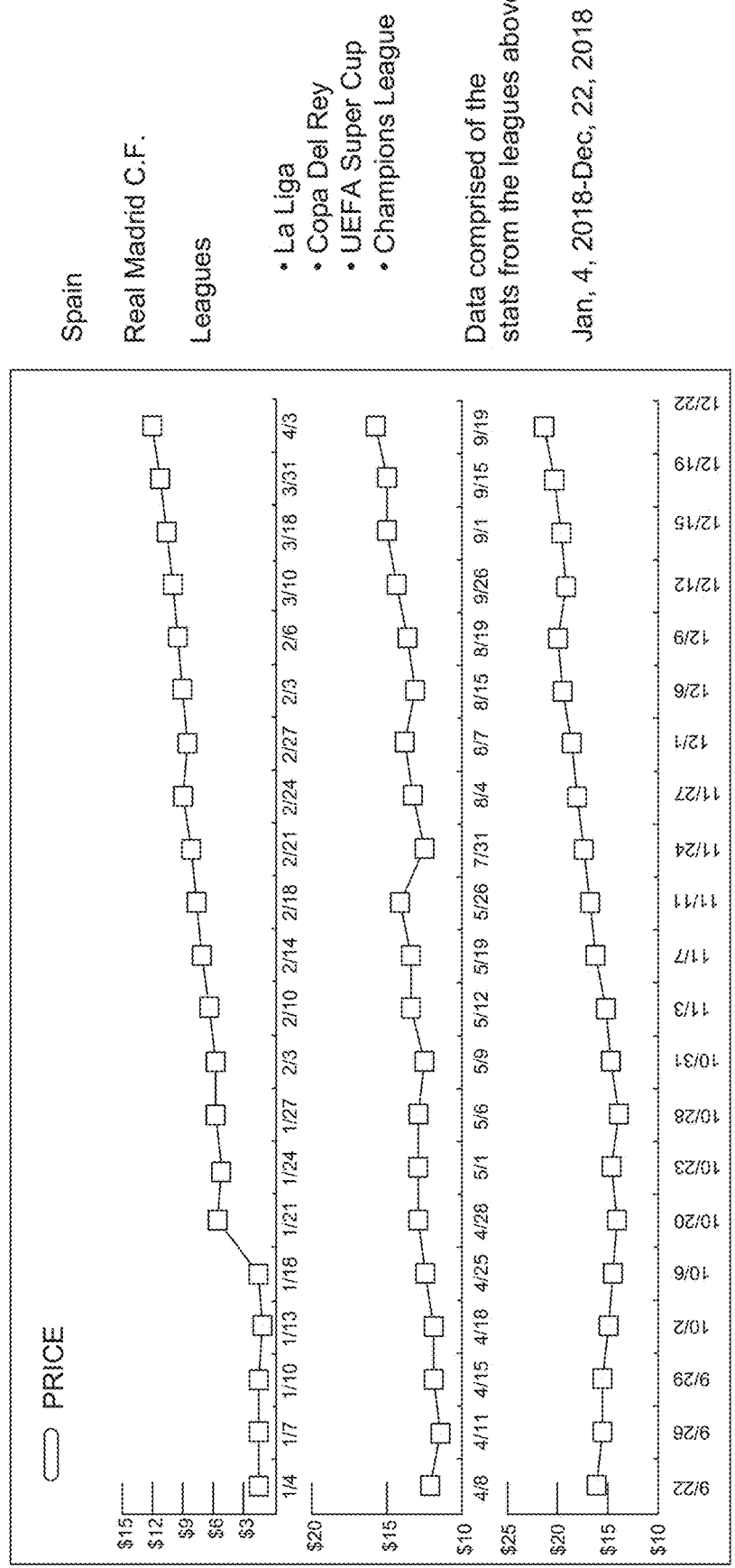
FIG. 6

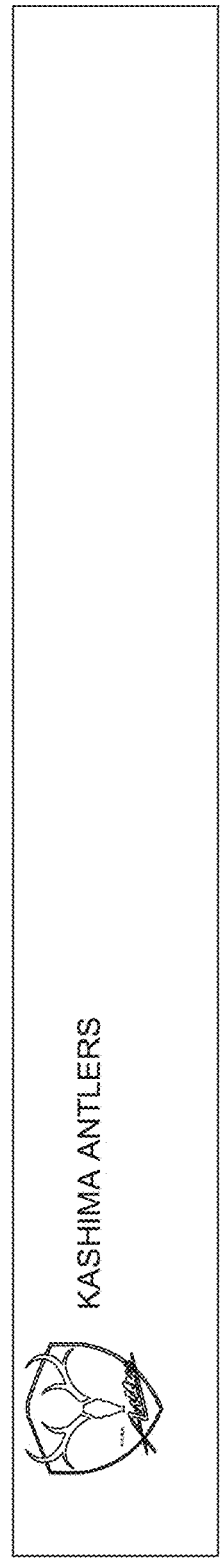
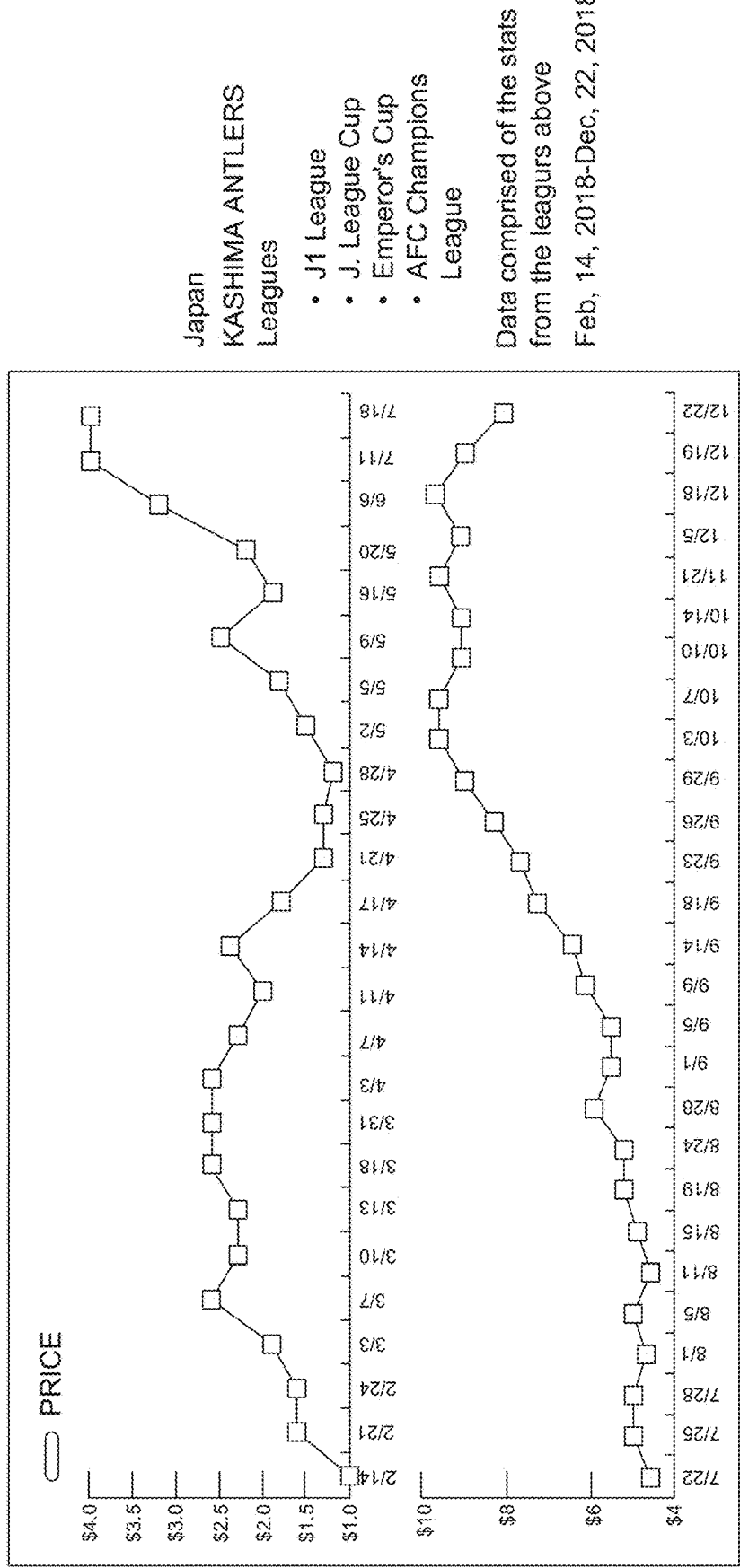
FIG. 10

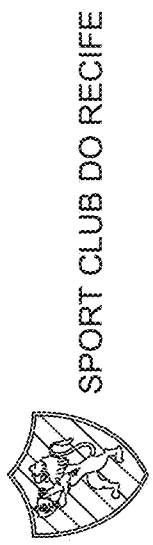

SPORT CLUB DO RECIFE

You will find a perfect example of a team that was relegated to Serie B (Second Division) and in our system when that happens if the Club currency is negative it will automatically start the following year with the currency of WFCE0.05 equivalent to USD$0.05 SPORT CLUBE from Brazil in 2019 has improved its performance, and the Token performance is currently going up. We have selected and created a simulation for your better understanding.

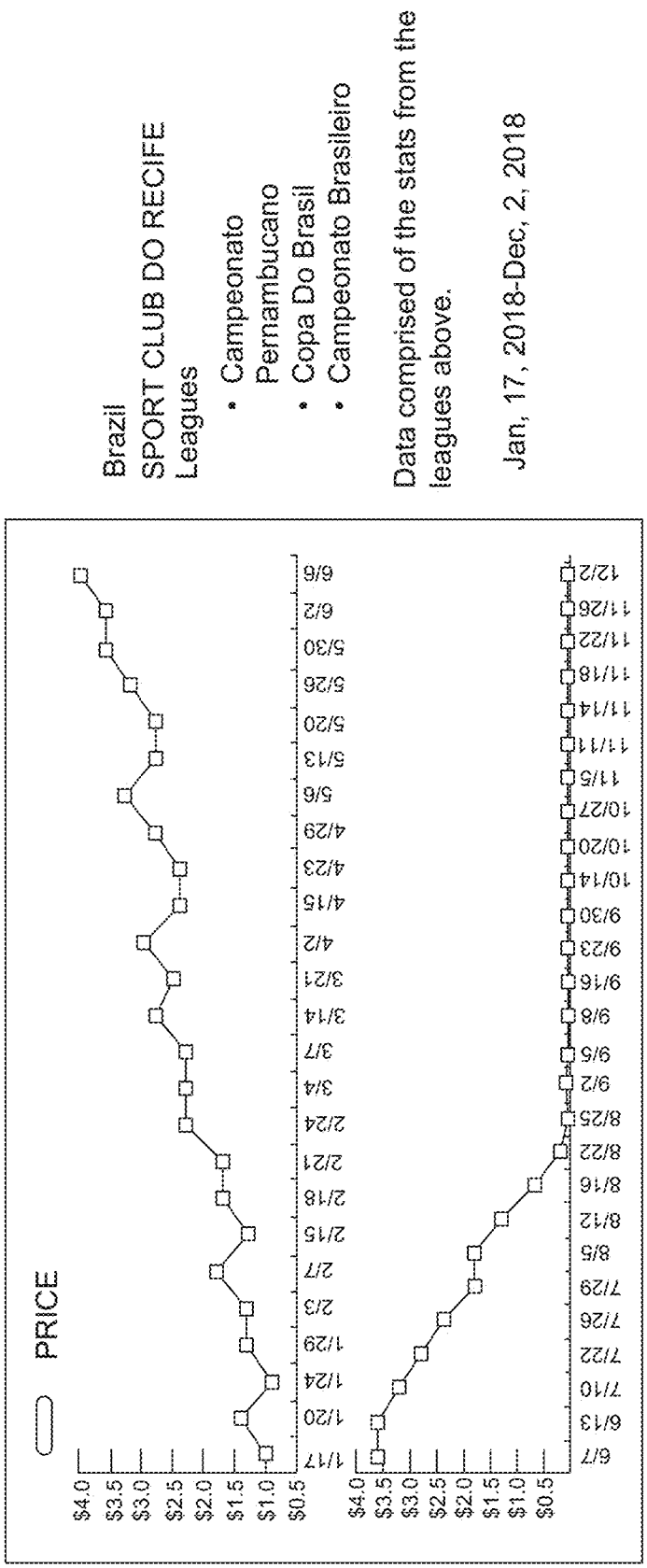

Brazil
SPORT CLUB DO RECIFE
Leagues
- Campeonato Pernambucano
- Copa Do Brasil
- Campeonato Brasileiro Data comprised of the stats from the leagues above.

Jan, 17, 2018-Dec, 2, 2018

FIG. 12

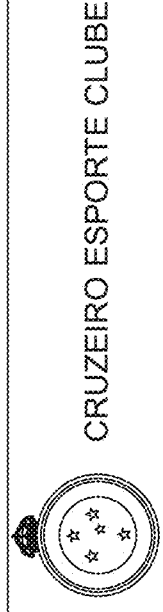

CRUZEIRO ESPORTE CLUBE

In this chart demonstration, we are using a team from Brazil that played in the following competitions: Campeonato Mineiro, Copa Do Brasil, Campeonato Brasileiro, and Copa Libertadores da America. Cruzeiro played in an average of 72 games in 2018. The first match of the year was at 1/17/18, and from WFCE 1.00 Token starting point it increases to 1.40WFCE and the last game of the year, the Token reached WFCE 9.60 equivalent to $9.60USD. Cruzeiro ends up being a State Champion of the Campeonato Mineiro, and the Champion of Copa do Brazil and 9th place on the national league. We believe the Brazilian Tokens will be one of the most requested tokens in the Globe due to a full calendar matches throughout the year.

Brazil
CRUZEIRO ESPORTE CLUBE
Leagues
- Campeonato Mineiro
- Campeonato Brasileiro
- Copa do Brasil
- Copa Libertadores da America Data comprised of the stats from the leagues above.

Jan, 17, 2018-Dec, 2, 2018

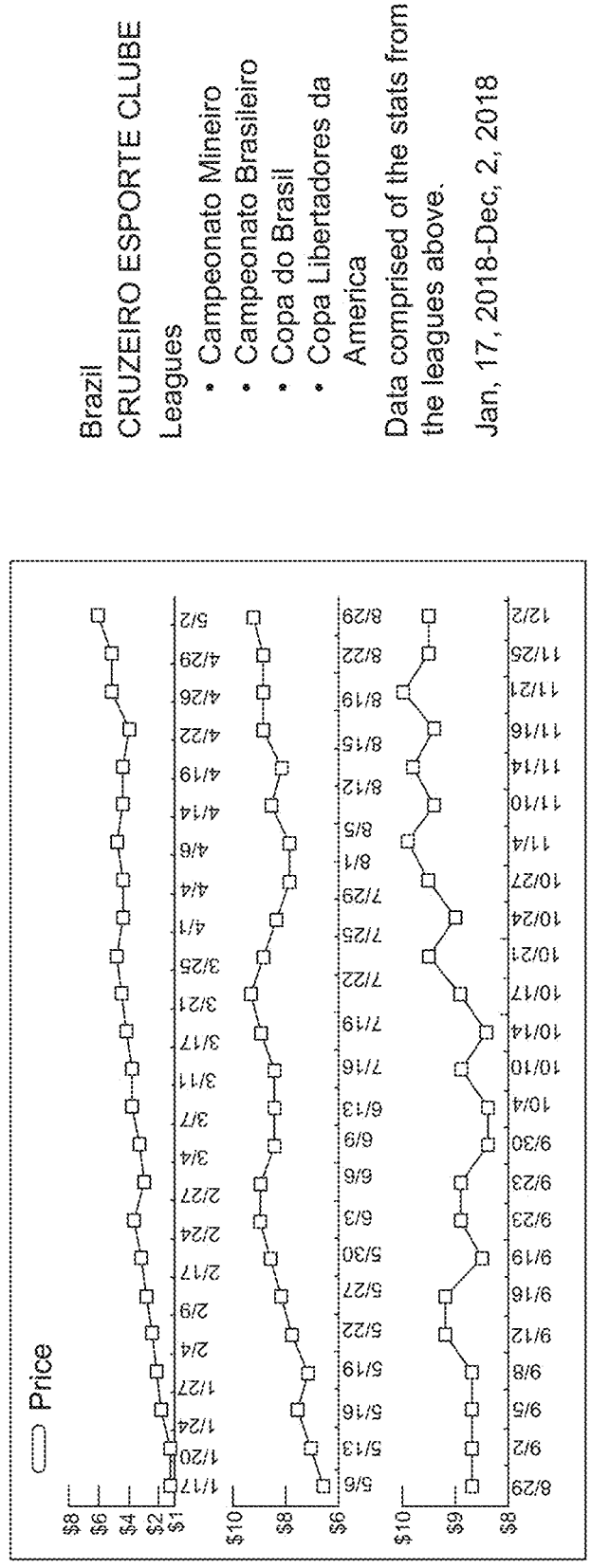

FIG. 13

| Most valuable teams | | | | | Show 10 <> |
|---|---|---|---|---|---|
| Rank | Team | Points | Market Price | Options | |
| 0 | O'Higgins | 0 | ⊙ 0 | 🛒buy | |
| 0 | Universidad de Concepcion | 0 | ⊙ 0 | 🛒buy | |
| 0 | Cobreloa | 0 | ⊙ 0 | 🛒buy | |
| 0 | Antofagasta | 0 | ⊙ 0 | 🛒buy | |
| 0 | Palestino | 0 | ⊙ 0 | 🛒buy | |
| 0 | Huachipato | 0 | ⊙ 0 | 🛒buy | |
| 0 | Audax Italiano | 0 | ⊙ 0 | 🛒buy | |
| 0 | Deportes Iquique | 0 | ⊙ 0 | 🛒buy | |
| 0 | Union Espanola | 0 | ⊙ 0 | 🛒buy | |
| 0 | Atletico Nublense | 0 | ⊙ 0 | 🛒buy | |
| < 1 - 8 9 10 - 64 > | | | | | |

FIG. 15

○ Quick links    Hello Cree!         🛒 15 ○

[ View All teams ]    [ Manage My Team ]

CARD WALLET    Salt Lake City    19th
○ 1,690    18.7M    19.9M
$4,850.89    +120.93    October - 2018

Top teams   See more      Reload

| Team | Points | Market Price |
|---|---|---|
| ● San Lrenzo | -12 | ⊕ 0.09 |
| ● Boca Juniors | 19 | ⊕ 5.53 |
| ● Rosario Central | -32 | ⊕ 0.1 |
| ● River Plate | 1 | ⊕ 2.04 |
| ● Racing Club | 17 | ⊕ 5.05 |
| ● Belgrano | -6 | ⊕ 0.52 |
| ● Banfield | 0 | ⊕ 1.68 |
| ● Lanús | 0 | ⊕ 0 |
| ● Newell's Old Boys | 0 | ⊕ 0 |
| ● Independiente | 2 | ⊕ 2.08 |

Scheduled matches      Reload
Monday, March 18th, 2019

Barcelona    Barcelona
Barcelona    Barcelona
Barcelona    Barcelona
Barcelona    Barcelona
Barcelona    Barcelona My Top Teams   See more      Reload

| Team | Points | Market Price |
|---|---|---|
| ● Chelsea | 32 | ⊕ 8.09 |
| ● Manchester United | 13 | ⊕ 4.39 |
| ● Real Madrid | 38 | ⊕ 9.23 |

FIG. 16

| Albania | Bulgaria | England | Germany |
|---|---|---|---|
| Teams 30 | Teams 30 | Teams 44 | Teams 36 |
| Tokens 1.5 billion | Tokens 1.5 billion | Tokens 2.2 billion | Tokens 1.8 billion |

| Austria | Czech Republic | Estonia | Greece |
|---|---|---|---|
| Teams 24 | Teams 32 | Teams 20 | Teams 32 |
| Tokens 1.2 billion | Tokens 1.6 billion | Tokens 1.0 billion | Tokens 1.6 billion |

| Belarus | Croatia | Finland | Hungary |
|---|---|---|---|
| Teams 32 | Teams 24 | Teams 22 | Teams 32 |
| Tokens 1.6 billion | Tokens 1.2 billion | Tokens 1.1 billion | Tokens 1.6 billion |

| Belgium | Cyprus | France | Iceland |
|---|---|---|---|
| Teams 24 | Teams 28 | Teams 44 | Teams 24 |
| Tokens 1.2 billion | Tokens 1.4 billion | Tokens 2.2 billion | Tokens 1.2 billion |

| Bosnia | Denmark | Georgia | Ireland |
|---|---|---|---|
| Teams 28 | Teams 26 | Teams 20 | Teams 20 |
| Tokens 1.4 billion | Tokens 1.3 billion | Tokens 1.0 billion | Tokens 1.0 billion |

| Italy | Latvia | Lithuania | Luxemburg |
|---|---|---|---|
| Teams 39 | Teams 20 | Teams 32 | Teams 28 |
| Tokens 1.95 billion | Tokens 1.0 billion | Tokens 1.6 billion | Tokens 1.4 billion |

| Macedonia | Malta | Moldova | Montenegro |
|---|---|---|---|
| Teams 30 | Teams 28 | Teams 20 | Teams 20 |
| Tokens 1.5 billion | Tokens 1.4 billion | Tokens 1.0 billion | Tokens 1.0 billion |

| Netherlands | Norway | Poland | Portugal |
|---|---|---|---|
| Teams 38 | Teams 38 | Teams 34 | Teams 38 |
| Tokens 1.9 billion | Tokens 1.9 billion | Tokens 1.7 billion | Tokens 1.9 billion |

| Romania | Russia | Scotland | Serbia |
|---|---|---|---|
| Teams 34 | Teams 36 | Teams 22 | Teams 32 |
| Tokens 1.7 billion | Tokens 1.8 billion | Tokens 1.1 billion | Tokens 1.6 billion |

| Slovakia | Slovenia | Sweden | Spain |
|---|---|---|---|
| Teams 32 | Teams 32 | Teams 32 | Teams 42 |
| Tokens 1.6 billion | Tokens 1.6 billion | Tokens 1.6 billion | Tokens 2.1 billion |

| Switzerland | Turkey | Ukraine | Wales |
|---|---|---|---|
| Teams 20 | Teams 36 | Teams 38 | Teams 28 |
| Tokens 1.0 billion | Tokens 1.8 billion | Tokens 1.9 billion | Tokens 1.4 billion |

FIG. 24

| Argentina | Bolivia | Brazil | Chile |
|---|---|---|---|
| Teams 51 | Teams 35 | Teams 40 | Teams 32 |
| Tokens 2.55 billion | Tokens 1.75 billion | Tokens 2 billion | Tokens 1.6 billion |

| Colombia | Ecuador | Paraguay | Perú |
|---|---|---|---|
| Teams 36 | Teams 26 | Teams 28 | Teams 32 |
| Tokens 1.8 billion | Tokens 1.3 billion | Tokens 1.4 billion | Tokens 1.6 billion |

| Uruguay | Venezuela |
|---|---|
| Teams 30 | Teams 38 |
| Tokens 1.5 billion | Tokens 1.9 billion |

FIG. 25

| Egypt | Cameroon | Ghana | Kenya |
|---|---|---|---|
| Teams 51 | Teams 35 | Teams 40 | Teams 32 |
| Tokens 2.55 billion | Tokens 1.75 billion | Tokens 2 billion | Tokens 1.6 billion |

| Mozambique | South Africa | Tunisia | Zimbabwe |
|---|---|---|---|
| Teams 51 | Teams 35 | Teams 40 | Teams 32 |
| Tokens 2.55 billion | Tokens 1.75 billion | Tokens 2 billion | Tokens 1.6 billion |

| Nigeria | Ivory Coast | Jordan | Guinea |
|---|---|---|---|
| Teams 24 | Teams 35 | Teams 40 | Teams 32 |
| Tokens 1.2 billion | Tokens 1.75 billion | Tokens 2 billion | Tokens 1.6 billion |

| DR Congo | Sudan | Libya | Angola |
|---|---|---|---|
| Teams 16 | Teams 16 | Teams 24 | Teams 16 |
| Tokens 800 million | Tokens 800 million | Tokens 1.2 billion | Tokens 800 million |

| Algeria | Morocco |
|---|---|
| Teams 32 | Teams 32 |
| Tokens 1.6 billion | Tokens 1.6 billion |

FIG. 26

| Japan | | China | | Vietnam | | Hong Kong | |
|---|---|---|---|---|---|---|---|
| Teams | 36 | Teams | 32 | Teams | 26 | Teams | 24 |
| Tokens | 1.8 billion | Tokens | 1.6 billion | Tokens | 1.3 billion | Tokens | 1.2 billion |

| Malaysia | | Thailand | | South Korea | | Indonesia | |
|---|---|---|---|---|---|---|---|
| Teams | 32 | Teams | 24 | Teams | 22 | Teams | 40 |
| Tokens | 1.6 billion | Tokens | 1.2 billion | Tokens | 1.1 billion | Tokens | 2 billion |

| Iraq | | Kuwait | | Uzbekistan | | UAE | |
|---|---|---|---|---|---|---|---|
| Teams | 32 | Teams | 15 | Teams | 22 | Teams | 24 |
| Tokens | 1.6 billion | Tokens | 750 million | Tokens | 1.1 billion | Tokens | 1.2 billion |

| Qatar | | Iran | | Turkmenistan | | Bahrain | |
|---|---|---|---|---|---|---|---|
| Teams | 31 | Teams | 32 | Teams | 8 | Teams | 19 |
| Tokens | 1.55 billion | Tokens | 1.6 billion | Tokens | 400 million | Tokens | 950 million |

| Singapore | | Australia | | Saudi Arabia | |
|---|---|---|---|---|---|
| Teams | 19 | Teams | 40 | Teams | 36 |
| Tokens | 955 million | Tokens | 2 billion | Tokens | 1.8 billion |

FIG. 27

| Mexico | United States | Guatemala | Canada |
|---|---|---|---|
| Teams 33 | Teams 60 | Teams 36 | Teams 7 |
| Tokens 1.65 billion | Tokens 3 billion | Tokens 1.8 billion | Tokens 1.2 billion |

FIG. 28

Token League Difficulty Summary

| Europe | A / AAAAA |
|---|---|
| South America | A / AAAAA |
| Africa | A / AAAA |
| North America | A / AAAA |
| Asia | A / AAAA |
| Oceania | A / AAAA |

| Europe | B / BBB |
|---|---|
| South America | B / BBB |
| Africa | B / BB |
| North America | B / BB |
| Asia | B / BB |
| Oceania | B / BB |

| Europe International League | AAAAA |
|---|---|
| South America International League | AAAAA |
| Africa International League | AAAAA |
| North America International League | AAAAA |
| Asia International League | AAAAA |
| Oceania International League | AAAAA |

| Continental Club World Cup | AAAAA |
|---|---|

A - Difficulty Low
A - Difficulty Medium
A - Difficulty Hard

B - Difficulty Low
B - Difficulty Medium
B - Difficulty Hard

Division A all leagues are equally calculated. From State Leagues to National Leagues and national cups.

Division B all leagues are equally calculated. From State Leagues and National leagues. B represents a lower difficulty level.

Continental Club World Cup has the maximum amount of difficulty calculation applied at this level. The exception is when a team loses a match in this league. It will not be taken into consideration due to the high-level competition that is required to participate in the league.

FIG. 30

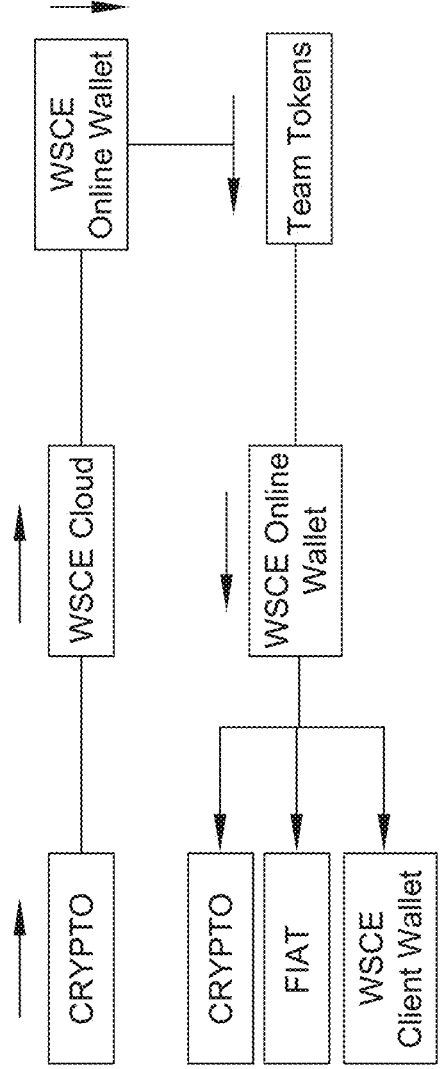

1) A user completes the checkout process by depositing one of the main supported Crypto currencies on the system by sending it to a specific address.
2) The transaction is received by the WSCE Cloud system and recorded to the WSCE Blockchain.
3) Funds are sent to the WSCE Online Wallet and recorded to the WSCE Blockchain.
4) The system completed the pending sale by finalizing the transaction and transferring the requested Team Tokens to the user WSCE Online Wallet and records it to the WSCE Blockchain.
5) User has the option of:
   o Leaving the Team Tokens in their online Wallet
   o Sending it to their WSCE Client Downloaded Wallet
   o Selling the Tokens and converting it Fiat via Ripple Network to arrive in their bank account
   o Selling the Tokens and converting to any of the supported cryptocurrencies and send them to an external wallet
   o Selling the Tokens and converting to WSCE Coin which can be stored in their online WSCE Wallet or WSCE Client Downloaded Wallet
   o All recorded to the WSCE Blockchain platform

FIG. 31

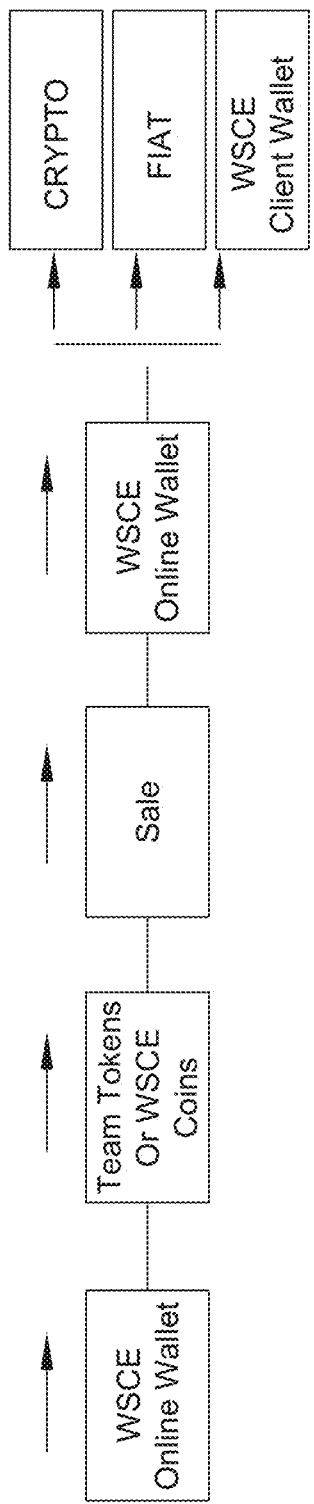

1) A user puts team Tokens or WSCE Coins up for Sale.
2) The System escrows the requested user assets that they would like to sell.
3) The System creates a priority 1 sale request depending on the type of sale the user would like to conduct.
4) The system completed the pending sale request by finalizing the transaction and transferring the requested assets to the user WSCE Online Wallet in the requested payout type.
5) User has the option of:
   o Leaving the newly acquired funds in their online Wallet
   o Sending it to their WSCE Client Downloaded Wallet
   o Convert the funds to Fiat via Ripple Network to arrive in their bank account
   o Convert the funds to any of the supported crypto currencies and send them to an external wallet
   o Convert the funds to WSCE Coin which can be stored in their online WSCE Wallet or WSCE Client Downloaded Wallet
   o All recorded to the WSCE Blockchain

FIG. 32

STEP 1
In step 1, the user is going through the first phase of the cart checkout process. For each team he has in the shopping cart: quantity, amount and total is displayed. The Token quantity could be changed in this phase.

STEP 2
In step 2, the user selects the option to make payment for Tokens. Currently, we are supporting Bitcoin, Bitcoin Cash, Ethereum and Litecoin.

STEP 3
On Step 3, the user gets an address which he needs to use when making payment.

FIG. 34

⊕ WFCE

Please make a payment in the next 50 minutes.

Once the payment is received, Your new Tokens will be transferred automatically to your account.

Please use the address below, or scan the QR code to complete transaction.

1EX1MfzxruRDs7gNbWhJmiBWrJqBYvEjtx

Total cost    13 WFCE (57.07 USD)

New wallet status    482 WFCE (0 USD)    WFCE

FIG. 35

Sell tokens

Choose type of sale

◉ Public sale
○ Private sale

Number of tokens

[ 1 ]

Sale ends

[ 03/12/2019 ]

Set token price(per token)

[ 8.09 ]

[ Confirm ]

| Chelsea | Token | Value |
| WFCE token | 36 | $291 |

| Country flag | Country Name | Number of Teams | Tokens Assigned | Tokens Available |
|---|---|---|---|---|
| | Albania | 28 | 1.40B | 699.50M |
| | Algeria | 30 | 1.50B | 750.00M |
| | Angola | 17 | 850.00M | 425.00M |
| | Argentina | 51 | 2.55B | 1.27B |
| | Australia | 29 | 1.45B | 725.00M |
| | Austria | 24 | 1.20B | 600.00M |
| | Bahrain | 15 | 750.00M | 375.00M |
| | Belarus | 26 | 1.30B | 650.00M |
| | Belgium | 23 | 1.15B | 575.00M |
| | Bolivia | 12 | 600.00M | 300.00M |
| | Bosnia and Herzegovina | 25 | 1.25B | 625.00M |
| | Brazil | 41 | 2.05B | 1.02B |
| | Bulgaria | 26 | 1.30B | 650.00M |
| | Cameroon | 14 | 700.00M | 350.00M |
| | Canada | 2 | 100.00M | 50.00M |
| | Chile | 31 | 1.55B | 775.00M |
| | China | 42 | 2.10B | 1.05B |

FIG. 43

| | | | League ⌄ | League | | |
|---|---|---|---|---|---|---|
| ⊚ 0 | Ceará | 25.00M | 50.00M | 0.35 | 0.25 | Buy\|Sell 0% |
| ⊚ 0 | Chapecoense | 25.00M | 50.00M | 0.35 | 0.25 | Buy\|Sell 0% |
| ⊚ 0 | Coritiba | 25.00M | 50.00M | 0.35 | 0.25 | Buy\|Sell 0% |
| ⊚ 0 | CRB | 25.00M | 50.00M | 0.35 | 0.25 | Buy\|Sell 0% |
| ⊚ 0 | Criciúma | 25.00M | 50.00M | 0.35 | 0.25 | Buy\|Sell 0% |
| ⊚ 0 | Cruzeiro | 25.00M | 50.00M | 0.35 | 0.25 | Buy\|Sell 0% |
| ⊚ 0 | CSA | 25.00M | 50.00M | 0.35 | 0.25 | Buy\|Sell 0% |
| ⊚ 0 | Cuiabá | 25.00M | 50.00M | 0.35 | 0.25 | Buy\|Sell 0% |
| ⊚ 0 | Figueirense | 25.00M | 50.00M | 0.35 | 0.25 | Buy\|Sell 0% |
| ⊚ 0 | Flamengo | 24.99M | 49.99M | 0.35 | 0.25 | Buy\|Sell 0% |
| ⊚ 0 | Fluminense | 25.00M | 50.00M | 0.35 | 0.25 | Buy\|Sell 0% |
| ⊚ 0 | Fortaleza | 25.00M | 50.00M | 0.35 | 0.25 | Buy\|Sell 0% |
| ⊚ 0 | Goiás | 25.00M | 50.00M | 0.35 | 0.25 | Buy\|Sell 0% |
| ⊚ 0 | Grêmio | 25.00M | 50.00M | 0.35 | 0.25 | Buy\|Sell 0% |
| ⊚ 0 | Guarani | 25.00M | 50.00M | 0.35 | 0.25 | Buy\|Sell 0% |
| ⊚ 0 | Internacional | 25.00M | 50.00M | 0.35 | 0.25 | Buy\|Sell 0% |
| ⊚ 0 | Joinville | 25.00M | 50.00M | 0.35 | 0.25 | Buy\|Sell 0% |
| ⊚ 0 | Londrina | 25.00M | 50.00M | 0.35 | 0.25 | Buy\|Sell 0% |

Tokens availability in Europe                                    Login [Signup]  EN ⌄

| Country flag | Country Name | Number of Teams | Tokens Assigned | Tokens Available |
|---|---|---|---|---|
| 🏳 | Bosnia and Herzegovina | 30 | 1.50B | 750.00M |
| 🏳 | Croatia | 23 | 1.15B | 575.00M |
| 🏳 | England | 49 | 2.45B | 1.22B |
| 🏳 | France | 44 | 2.20B | 1.10B |
| 🏳 | Germany | 39 | 1.95B | 974.99M |
| 🏳 | Greece | 38 | 1.90B | 950.00M |
| 🏳 | Italy | 42 | 2.10B | 1.05B |
| 🏳 | Netherlands | 36 | 1.80B | 900.00M |
| 🏳 | Norway | 40 | 2.00B | 1.00B |
| 🏳 | Poland | 44 | 2.20B | 1.10B |

[10 ⌄] item per page                               Total number of items 52

SERVER SYSTEMS AND METHODS FOR VALUING BLOCKCHAIN TOKENS BASED ON ORGANIZATIONAL PERFORMANCE

CROSS-REFERENCE TO RELATED APPLICATION

This application claims the benefit and priority to U.S. Provisional Application No. 63/232,792, filed Aug. 13, 2021, the entire contents of which are incorporated herein by reference.

BACKGROUND

Blockchain technology is increasingly used due to its unique way in which it stores data. Unlike a typical database, new data within a blockchain is stored as a group within a block. After a new block becomes full, the newly filled block is then added to a series of previously filled blocks that are chained together in chronological order. When decentralized, the blockchain creates a permanent record for both the data that is stored on the blockchain as well as the time it was added. This record security is provided because any attempt at modifying the blockchain at any particular node can be identified and pinpointed by cross-referencing other copies of the node among the other computers in the network.

While blockchain technology has been used heavily in the field of cryptocurrency for storing transaction histories, any source of data such as legal documents, medical records, votes, supply chain tracking, etc., can use blockchain technology to create a secure record of transactions.

One recent innovation in blockchain is the use of tokens to exert influence in the realm of sports. This may allow fans to directly engage in activities such as voting for a specific player to start, or a venue where a competition takes place. However, while current tokens may provide certain privileges in influencing a team's decisions, there is currently no effective system to assign value to the tokens. Therefore, there is a need for a system and method that enables a fair and measurable evaluation of a coin or token by linking the coin/token value to an organization's performance and which enables transactions based on the valuation.

SUMMARY

From the introduction of the blockchain technology in 2008, opportunities for entrepreneurs and developers to innovate, create and offer tokens all over the globe have made a difference in today's world. With innovative ideas, blockchain can be a solution for many problems in the technology industry, from security to finance and diversity of products, blockchain opens doors for a new sector to be explored.

A non-limiting example of the system and methods described herein embodied in a practical application is the World of Football Coin Exchange (WFCE) Group: the first blockchain football exchange token to be ever launched which includes the latest technology available. The concepts described herein are also applicable to all sports, and accordingly reference to a World of Sports Coin Exchange (WSCE) comprises the same features. The blockchain technology system and methods described herein, embodied in such non-limiting examples such as the WFCE team platform, is changing the sports industry with Future Data Performance Crypto Products: the first system in the world to launch crypto products based on data performance. In some embodiments, the system runs on a blockchain technology platform, and includes the only coin that is "backed up by live data." In some embodiments, the system is configured to enable the valuation of the coin to fluctuate based on the performance of the various teams. In addition, in some embodiments, the system is configured to fluctuate each coin/token's evaluation based on the supply and demand and/or the club's performance supported by live data.

While some embodiments describe the system embodied as a coin and/or token, it is understood that all system functionality, such as computer implemented instructions, are directed to both coins and tokens, and use of one term serves as a reference to the system's ability to apply the same principles to the other. Additionally, the described sports-related examples are only one example application and the systems and methods described herein are also applicable to a wide array of industries and applications.

In some embodiments, the system is embodied as the world's first sports platform in the form of the WSCE/WFCE (World Football Coin Exchange). In some embodiments, the WFCE token implementation is related to the largest sport in the world. With over 4 billion football fans, in some embodiments, the system not only configured to create a token, but also to create an exchange platform for football with over 2,000 teams and over 100 leagues. With everyday games throughout the year, the system enables users to buy, sell, make an offer, and trade coins and tokens at any given time according to some embodiments.

In some embodiments, the system promotes sports and assists in the stabilization of the crypto-coin market as a significant avenue for investments. In some embodiments, the system is configured to enable fans to buy and sell tokens for their favorite teams. In some embodiments, the system includes a global blockchain network to support sports. In some embodiments, the system is configured to record one or more statistical and proprietary data types to help clubs and finance the blockchain.

In some embodiments, WFCE is configured to utilize blockchain technology to tokenize the football industry and facilitate a new type of cryptocurrency throughout the globe, tokenizing all the football clubs by assigning 136 billion tokens among them. In some embodiments, the system creates more opportunities for commerce. Within a short time, and with the help of the WFCE algorithm, in some embodiments, clubs are able to have their cryptocurrency tied to their team's performance. In some embodiments, the system is configured to analyze a team's performance data with one or more unique mathematical formulas which are accurate and secure. In some embodiments, the value of a token is configured to increase or decrease according to the team's performance and other algorithmic factors like supply and demand.

In some embodiments, the World Sports Coin Exchange, or WSCE for short, is the first innovation of cryptocurrency for sports. in some embodiments, WSCE is the first decentralized coin exchange platform based on bitcoin technology for creating a blockchain token across all major sports in the globe. In some embodiments, the system is configured to create a crypto coin exchange platform, configured to manage and process analytical and live data related to sports. In some embodiments, this is accomplished by attaching the system's unique crypto coins to a team to support the team's performance.

In some embodiments, a sports implementation is a football (i.e., soccer) coin. In some embodiments, the system is not based on the same analyses used to evaluate gambling performance. In some embodiments, the system is configured to change a coin's price according to the team performance match by match. In some embodiments, the system is configured to increase or decrease the coin's value depends on the team winning/losing/draw performance.

In some embodiments, systems and methods described herein produce the official coin issued by World Sports Coin Exchange (WSCE). In some embodiments, the system is configured to offer a full set of services in support of sports coins, which includes but not limited to coin buying, coin sales, funds escrow, and funds transfer to and from the system in various forms. In some embodiments, the system is configured to promote sports and assist in the stabilization of the crypto-coin market as a significant avenue for investments. In some embodiments, the WSCE manages all other products assigned to each significant sports group.

Besides providing a platform for football token exchange, in some embodiments, the system enables platforms for other sports, including, as non-limiting examples: Football—(WFCE) World Football Token (COIN) Exchange; Rugby—(WRYTE) World Rugby Token Exchange; Formula1—(WF1TE) World Formula1 Token Exchange; Cricket—(WCKTE) World Cricket Token Exchange; Basketball—(WBKTE) World Basketball Token Exchange; Hockey—(WHKTE) World Hockey Token Exchange; and Volleyball—(WVTE) World Volleyball Token Exchange.

In some embodiments, the values of WFCE tokens are configured to fluctuate according to the teams' matches in the leagues and cups through the year. In some embodiments, according to team winning/losing/draw performance, the token prices are configured to change by the algorithm with the support of live data. In some embodiments, the system enables a new type of football fan that follows teams for which they own tokens, watches other club's performance, and improves the visibility of clubs. In some embodiments, the system enables people around the world to have a new ability to engage with their favorite teams. In some embodiments, the system enables clubs to increase their number of fans, and investors are able to explore leagues/clubs around the globe, growing visibility of football teams from all over the world.

In some embodiments, the system includes blockchain for one or more sports. In some embodiments, the system is configured to receive and/or store one or more of supporting data inserted into the blockchain, news reports, game and event stats, and summary videos as non-limiting examples. In some embodiments, the system includes a client wallet configured to decide what to sync/keep. With offline support, in some embodiments, data is available up until the last sync.

In some embodiments, the WFCE platform operates primarily in the cloud, as a globally distributed system, which is comprised of various technologies and services. In some embodiments, this includes but is not limited to cloud API's, bots, AI cognitive systems, modern security systems, WSCE proprietary algorithms, smart contracts, and WSCE blockchain. In some embodiments, the system includes at least two customer service portals comprised of one or more of three or more channels, a publicly accessible site, and ultra-secure trading and management platforms that are both responsive and mobile friendly. In some embodiments, other interaction channels include a mobile version of the application that runs on most modern smartphones and a client wallet application.

In some embodiments, the disclosure is directed to systems and methods (collectively referred to herein as "the system") for assigning value to a blockchain token based on an organization's attributes. In some embodiments, an organization's attributes include an organization's performance and/or popularity. In some embodiments, non-limiting examples of organizations (also referred to as industries herein) include sports, markets, industrial, services, medical, technical, and sustainability organizations.

In some embodiments, sport organizations include, as non-limiting examples, one or more of football (i.e., soccer), cricket, rugby, basketball, American football, hockey, and Formula One racing. In some embodiments, market organizations include, as non-limiting examples, one or more of XLiquidus, high-yield term deposits, electronic and crypto commerce, non-profit, trading, investments, non-fungible tokens (NFTs), real estate, and income management. In some embodiments, XLiquidus includes, as non-limiting examples, one or more of stable coins, fiat and crypto transactions, token wallets, wire transfers, automated clearing house networks (ACH), debit cards, and fiat tokenization.

In some embodiments, industrial organizations include one or more of mining, utilities, shipping, and manufacturing as non-limiting examples. In some embodiments, service organizations include, as non-limiting examples, insurance, gig economy+AI, and know your customer (KYC). In some embodiments, medical organizations include, as non-limiting examples, health care platforms, advanced medical care (AI+ mixed/AR and digital twins), and data monetization. In some embodiments, technical organizations include, as non-limiting examples, research and development and technical markets. In some embodiments, sustainability organizations include, as non-limiting examples, environmental, social and governance (ESG) investments, carbon credits, and energy commission cooperatives. In some embodiments, one or more of the industrial, service, medical, technical, and sustainability organizations are decentralized organizations.

In some embodiments, the system includes global functions and services. In some embodiments, the system includes built-in network functions and features that include, as non-limiting examples, one or more of quantum resilience, AI assisted functions, smart contracts, block explores, malicious threat and fraud detection/monitoring with AI, regulatory compliance, identity verification with AI, chargeback integration, automated fintech integration, universal token wallets, high speed transactions, and mobile wallets. In some embodiments, quantum resilience includes, as non-limiting examples, one or more of quantum event detection, quantum triggers, variable encryption protocols, and quantum shift (encryption paradigm shift). In some embodiments, smart contracts include, as non-limiting examples, one or more of simple escrow service, cloud contracts with services, and contract repositories.

In some embodiments, the system includes a globally distributed system of sophisticated technologies, algorithms, and solutions. In some embodiments, the system includes one or more of cloud API's, bots, AI cognitive systems, modern security systems, proprietary algorithms, smart contracts, and blockchain technology. In some embodiments, the system includes one or more customer service portals, channels, publicly accessible sites, secure trading platforms, and management platforms that are both responsive and mobile-friendly.

In some embodiments, the system comprises quantum resilience. In some embodiments, quantum resilience is configured to protect blockchain encryption from cracking methods by modern computer systems and the proliferation of quantum computers/services and artificial intelligence (AI). In some embodiments, the system includes AI assisted functions that includes one or more of behavior analysis and threat detection.

In some embodiments, the system is configured to enable the development of blockchain technology for various sectors including, without limitation, financial, energy, and sports industries. In some embodiments, the system allows business customers to utilize its platform solutions effortlessly. In some embodiments, the system offers a full set of services supporting its blockchain products, including tokens purchase and sale, escrow funds, transfer funds, compliance with know-your-customer, and anti-money-laundering regulations.

In some embodiments, the system's platform operates primarily in the cloud, as a globally distributed system, which is comprised of various technologies and services. In some embodiments, the system platform includes but is not limited to cloud API's, bots, AI cognitive systems, modern security systems, proprietary algorithms, smart contracts, and the system's proprietary blockchain solution, as well as the enabling hardware and software described herein. In some embodiments, the system includes at least two portals comprising one or more of at least three channels, an accessible public site, ultra-secure trading, and management platforms that are both responsive and mobile-friendly. In some embodiments, the system includes other interaction channels that are mobile versions of applications that run on most conventional smartphones and client wallet applications.

In some embodiments, other key features of the system include one or more of industry-specific blockchain for sports, utility, finance, and green mining technology. In some embodiments, the system includes the ability for teams from any sports to take advantage of the system's algorithmic performance-based tokens, virtually turning any team's performance into asset valuation, and providing the ability to support other organizations/industries as described above. In addition, the system is regulatory compliant, and includes AML/KYC functionality, supports cross-border/cross-chain payment solutions (e.g., supporting major Fiat and Crypto payments automatically), has quantum resilience, and provides skilled support teams for a turnkey solution for businesses.

In some embodiments, the system includes a custom blockchain comprising network specific blockchains that support the sports, energy, finance, and data performance industries as non-limiting examples. In some embodiments, the system includes a hybrid blockchain that comprises one or more of blockchain, cloud technology & security, fiat and crypto commerce, identity verification (aml-ctf+kyc), and cyber security teams. In some embodiments, the system includes a custom exchange app where all coins, tokens, and system features are accessible via computers such as desktop computers and mobile computers that use iOS® or Android® software, as non-limiting examples. In some embodiments, the system includes a custom exchange platform configured to support over 2,500 transactions per second. In some embodiments, the system employs military grade security technologies that includes AI and cyber security teams. In some embodiments, the system is configured to support operations in various domestic and international jurisdictions (e.g., Brazil, USA, Europe, and Asia). In some embodiments, the system includes a zero-setup cost and/or the lowest exchange transaction fee in the market. In some embodiments, the system includes third party partnership (e.g., Visa®) to provide a custom stable coin in multiple jurisdiction. In some embodiments, one or more cloud-based portions of the system are General Data Protection Regulated (GDPR) compliant. FIGS. 1-3 depict some non-limiting system platform features according to some embodiments.

In some embodiments, the disclosure is directed to system for determining the value of a digital asset. In some embodiments, the system comprises one or more computers comprising one or more processors and one or more non-transitory computer readable media, the one or more non-transitory computer readable media including instructions stored thereon that when executed cause the one or more computers to execute one or more steps. In some embodiments, a step includes to generate, by the one or more processors, a first digital asset. In some embodiments, a step includes to associate, by the one or more processors, the digital asset with a first sport team. In some embodiments, a step includes to assign, by the one or more processors, a first monetary value to the first digital asset. In some embodiments, a step includes to generate, by the one or more processors, a second digital asset. In some embodiments, a step includes to associate, by the one or more processors, the second digital asset with a second sport team. In some embodiments, a step includes to assign, by the one or more processors, a second monetary value to the second digital asset. In some embodiments, a step includes to execute, by the one or more processors, an analysis of a performance of the first sport team. In some embodiments, a step includes to execute, by the one or more processors, an analysis of a performance of the second sport team. In some embodiments, a step includes to determine, by the one or more processors, which of the first sport team or the second sport team has a higher performance. In some embodiments, a step includes to alter, by the one or more processors, the first monetary value of the first digital asset to be higher than the second monetary value of the second digital asset if the first sport team is determined to have a higher performance than the second sport team. In some embodiments, a step includes to alter, by the one or more processors, the second monetary value of the second digital asset to be higher than the first monetary value of the first digital asset if the second sport team is determined to have a higher performance than the first sport team.

In some embodiments, the system is configured to alter the first monetary value of the first digital asset during a live sporting event including a competition between the first sport team and a different sport team. In some embodiments, the system is configured to alter the first monetary value of the first digital asset based on a score between the first sport team and the different sport team. In some embodiments, the analysis of the performance of the first sport team includes a ranking analysis of a first sport team's national and/or international ranking.

In some embodiments, determining whether the performance of the first sport team is higher than the performance of the second sport team includes determining if a first sport team fan participation of the first sport team is higher than a second sport team fan participation of the second sport team. In some embodiments, the first sport team fan participation and the second sport team fan participation each include one or more of game ticket sales, game attendance, pay-per-view subscriptions, broadcast ratings, polling data, online views, online searches, online trending. In some embodiments, the first digital asset and the second digital asset are stored on a blockchain.

In some embodiments, a step includes to generate, by the one or more processors, a dashboard on a graphical user interface (GUI). In some embodiments, a step includes to display, by the one or more processors, a change in monetary value over time of the first digital asset on the dashboard. In some embodiments, a step includes to generate, by the one or more processors, a first digital wallet for a first user. In some embodiments, a step includes to display, by the one or more processors, a first digital wallet link to the first digital wallet on the dashboard. In some embodiments, the first digital wallet is configured to store an access right to the digital asset.

In some embodiments, a step includes to display, by the one or more processors, a link to purchase at least one of a plurality of digital assets. In some embodiments, a step includes to generate, by the one or more processors, a dashboard on a graphical user interface (GUI). In some embodiments, a step includes to display, by the one or more processors, a list of sport teams. In some embodiments, a step includes to display, by the one or more processors, a list of digital assets including a plurality of digital assets. In some embodiments, a step includes to display, by the one or more processors, a monetary value of each digital asset on the list of digital assets. In some embodiments, each of the plurality of digital assets is associated with a sport team on the list of sport teams.

In some embodiments, a step includes to display, by the one or more processors, a link to purchase at least one of the plurality of digital assets on the GUI. In some embodiments, a step includes to receive, by the one or more processors, a request to purchase at least one of the plurality of digital assets. In some embodiments, a step includes to receive, by the one or more processors, a confirmation of a purchase of the at least one of the plurality of digital assets. In some embodiments, a step includes to record, by the one or more processors, the confirmation on a blockchain. In some embodiments, a step includes to send, by the one or more processors, a crypto key to a digital wallet. In some embodiments, the crypto key is configured to enable a user to access the at least one of the plurality of digital assets on the blockchain. In some embodiments, the digital asset is one of a crypto coin and a crypto token.

BRIEF DESCRIPTION OF DRAWINGS

FIG. 4 shows football club tokenization and token distribution per continent according to some embodiments.

FIG. 5 shows a diagram of teams' liquidation-profits according to some embodiments.

FIGS. 6-13 depict simulations for a better understanding of the system.

FIG. 6 shows a Real Madrid C.F. simulation according to some embodiments.

FIG. 7 shows an AL-AHLI SC simulation according to some embodiments.

FIG. 8 shows a Enyimba International F.C. simulation according to some embodiments.

FIG. 9 shows a Shanghai SIPG F.C. simulation according to some embodiments.

FIG. 10 depicts a Kashima Antlers simulation according to some embodiments.

FIG. 11 illustrates a Manchester City F.C. simulation according to some embodiments.

FIG. 12 shows a Sport Club Do Recife simulation according to some embodiments.

FIG. 13 depicts a Cruzeiro Esporte Clube simulation according to some embodiments.

FIGS. 14-15 depict elements of the homepage according to some embodiments.

FIGS. 16-19 show elements of a dashboard according to some embodiments.

FIG. 24 shows a non-limiting example of a number of clubs, countries, and tokens assigned in the system for the European region according to some embodiments.

FIG. 25 shows a non-limiting example of a number of clubs, countries, and tokens assigned in the system for South America according to some embodiments.

FIG. 26 shows a non-limiting example of a number of clubs, countries, and tokens assigned in the system for Africa according to some embodiments.

FIG. 27 shows a non-limiting example of a number of clubs, countries, and tokens assigned in the system for Asia and Australia according to some embodiments.

FIG. 28 shows a non-limiting example of a number of clubs, countries, and tokens assigned in the system for North America according to some embodiments.

FIG. 30 shows a token league difficulty summary according to some embodiments.

FIG. 31 represents a non-limiting example payment workflow according to some embodiments.

FIG. 32 illustrates a sale workflow according to some embodiments.

FIG. 34 shows non-limiting examples of computer implemented instructions for a cart checkout process according to some embodiments.

FIG. 35 shows a non-limiting example display by the system for a payment request according to some embodiments.

FIG. 37 shows a sell token display according to some embodiments.

Figure 41:
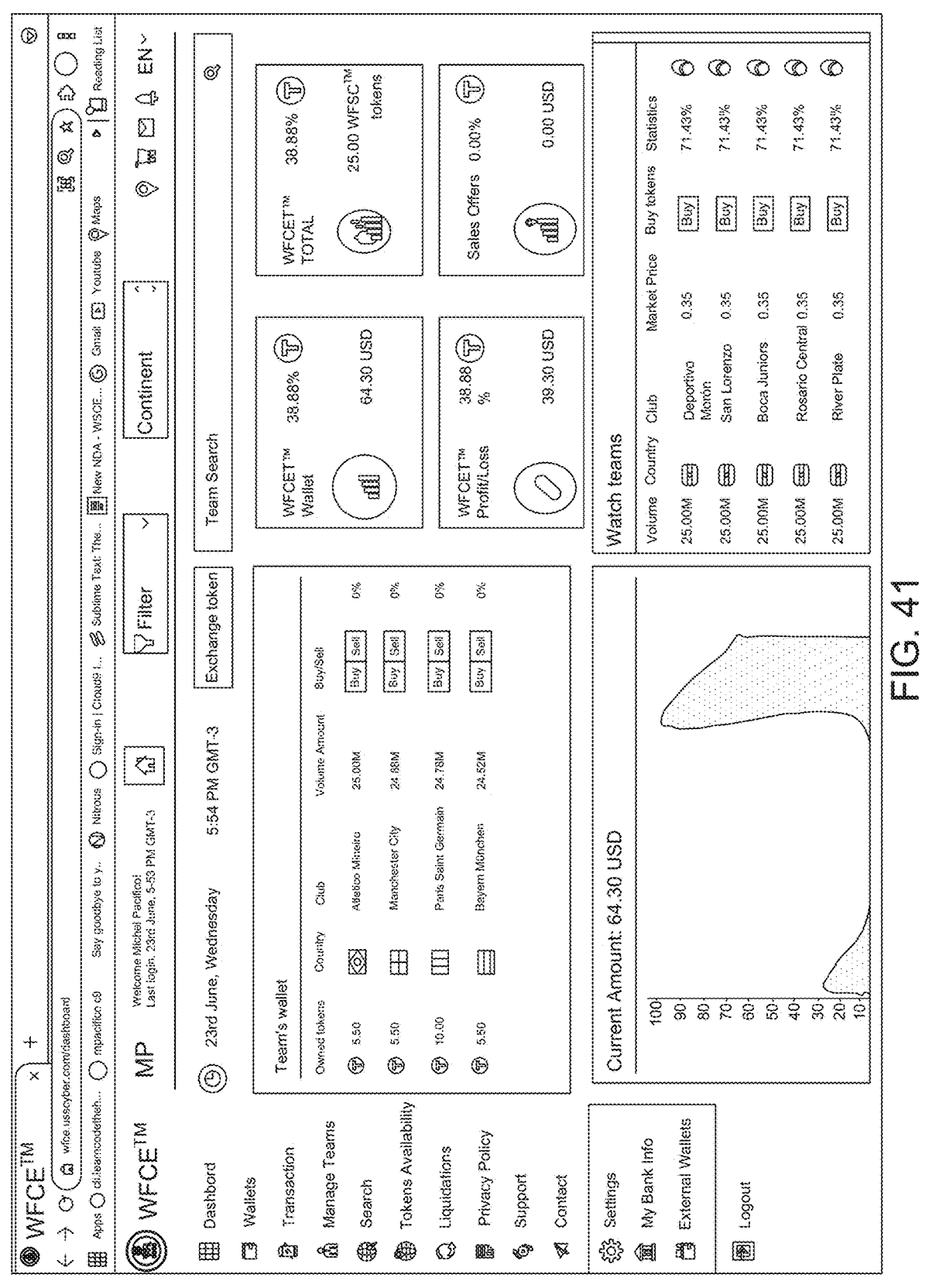
Figure 43:
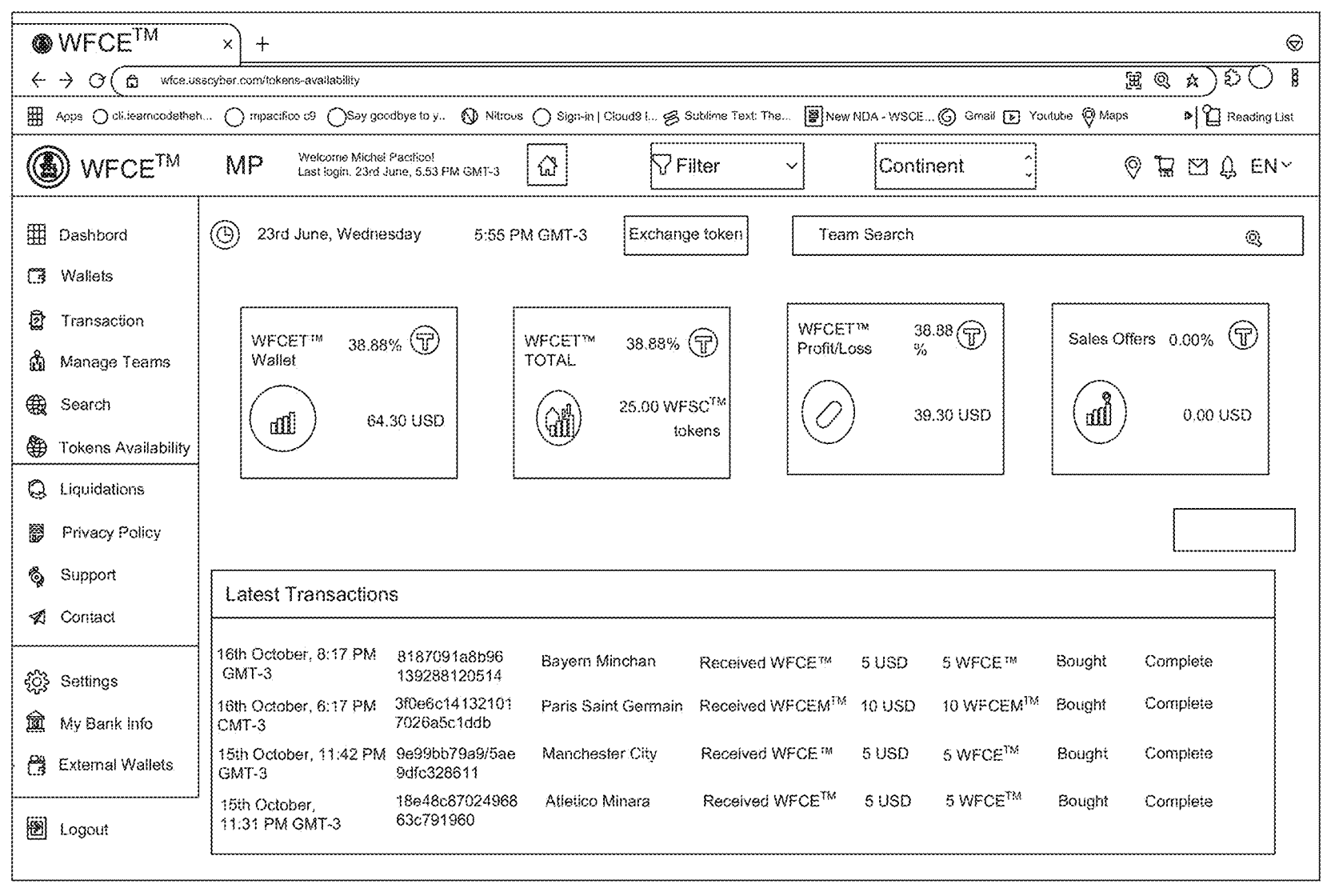
Figure 45:
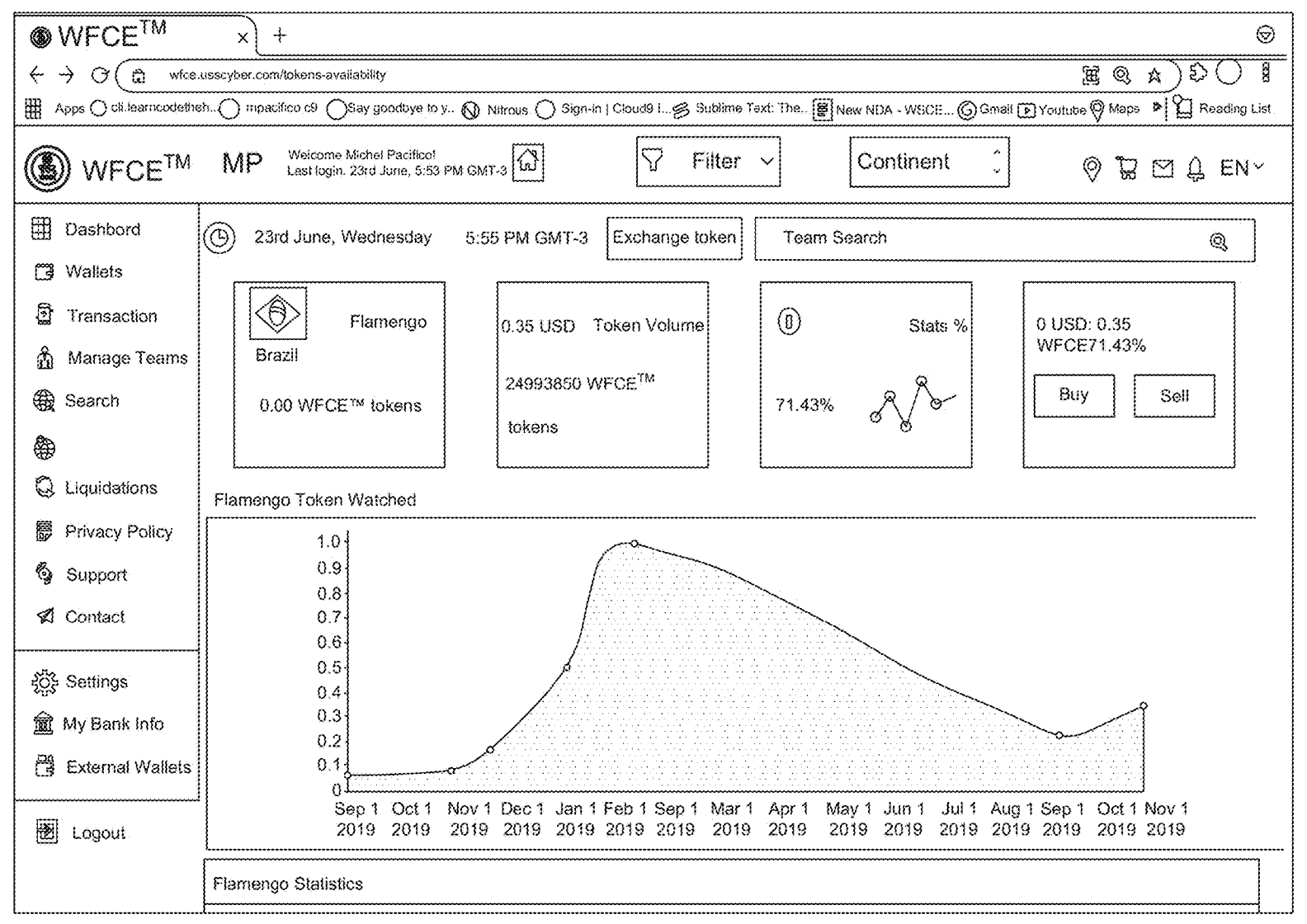

FIGS. 41-45 show various system interfaces according to some embodiments.

FIGS. 70-74 show various system football exchange web app interfaces according to some embodiments.

DETAILED DESCRIPTION

Figure 1:
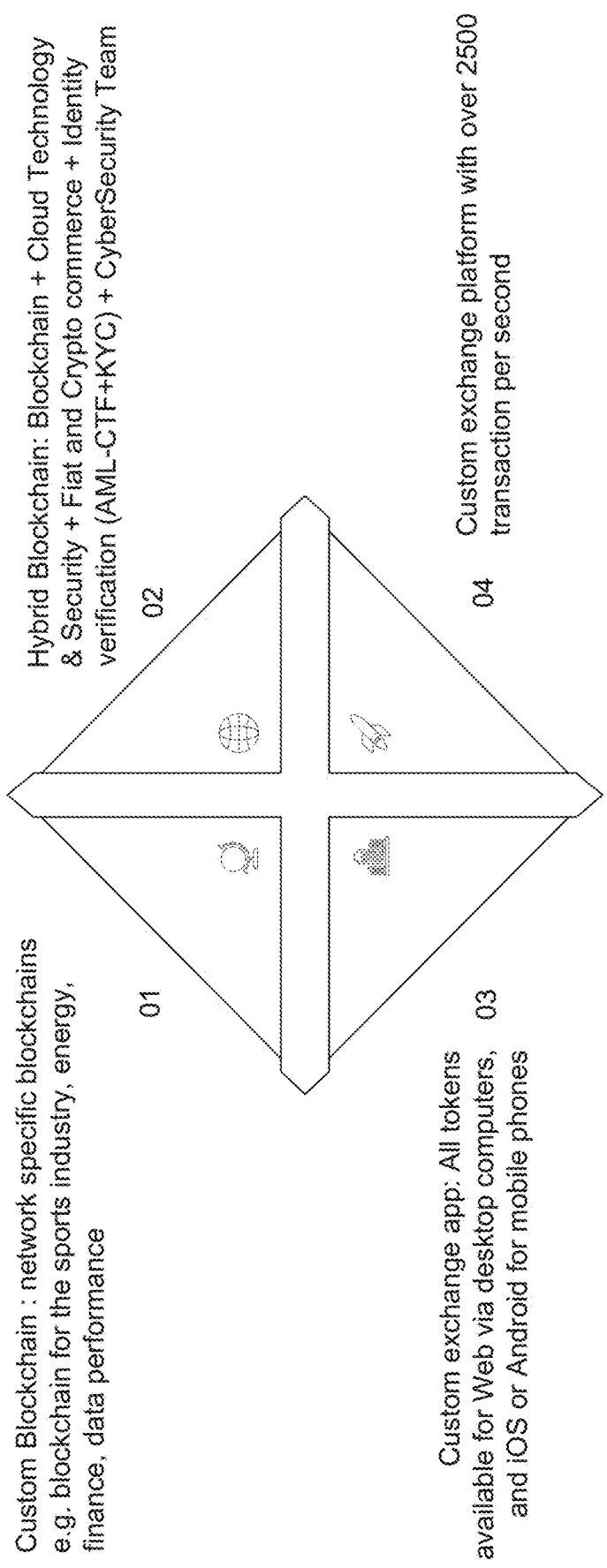
FIGS. 1-3 depict some non-limiting system platform features according to some embodiments.
Figure 2:
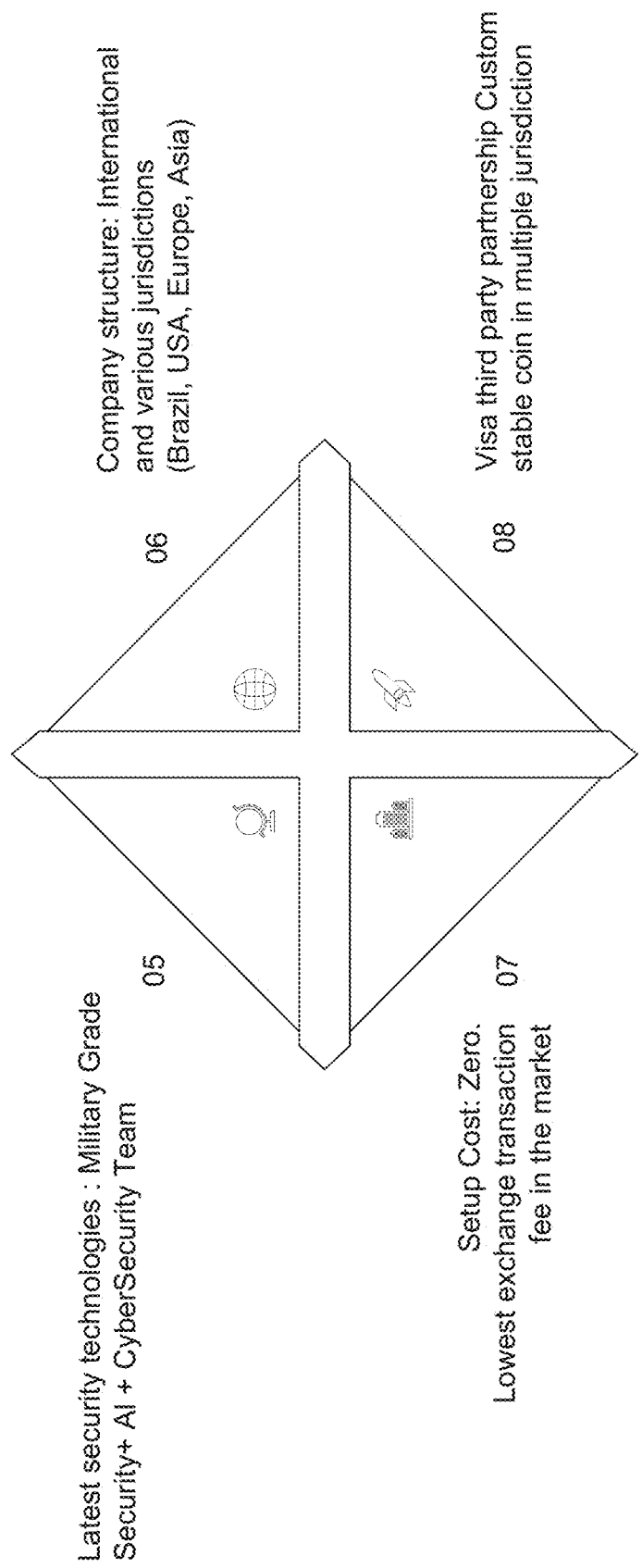
Figure 3:
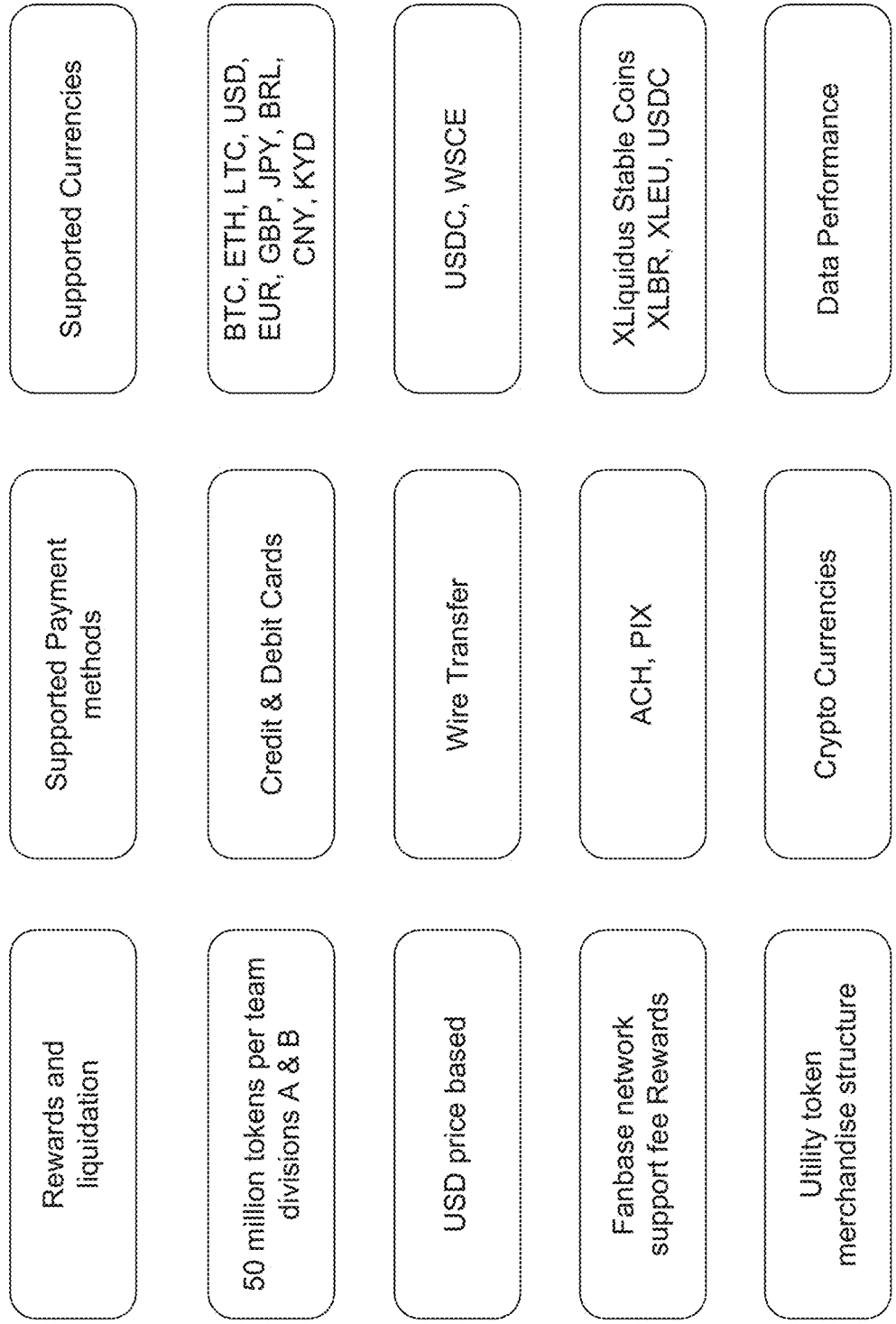

The following non-limited example implementation is merely one of many uses for the system described herein. Embodying a digital asset as a token and/or coin associated with a sport team as disclosed herein is presented solely to aid those of ordinary skill in making and using the system.

In some embodiments, the token is a sport(s) token. In some embodiments, the system is configured to assign value to a sports token based on an organization's performance and/or popularity. In some embodiments, assigning value includes associating a unique algorithm to one or more organizations, where the algorithm is configured to determine the organization's performance and/or popularity using historical data and/or in real-time. In some embodiments, the system is configured to enable token owners to trade, buy, and/or sell their team-related tokens at any time.

In some embodiments, the system includes a World of Sports Coin Exchange™ (WSCE™) which includes a multi-coin blockchain-platform that allows sport community members to buy and sell fan-tokens related to their favorite sport. As a non-limiting example, in the soccer industry, individuals can buy in their favorite soccer club fan-tokens. In some embodiments, the system is crafted for sports enthusiasts. In some embodiments, the platform allows sports fans to track their fan-token-team performance based on teams' national and international leagues ranking. In some embodiments, fans will be able to trade their fan-tokens with merchandising. In some embodiments, the system increases the social engagement level among each team's fanbase and creates awareness and visibility for teams located in farther geographic areas. For example, the system is configured to enable a Brazilian soccer fan to research a team's performance and ad to his/her token basket a rising-star African club that may have limited marketing expression but a higher possibility of granting the fan a significant token valuation.

Performance based valuation may have many inputs according to some embodiments. A sports team that starts the season with a losing streak may see its associated token decrease in value. In some embodiments, a sports team with a winning record may be valued higher than a sports team with a losing record. In some embodiments, although a sports team may have a losing record, the algorithm is configured to adjust the sport team's associated token value to be higher than a team with an equivalent and/or better record based on the sports team's fan participation. In some embodiments, fan participation includes one or more of game attendance, pay-per-view subscriptions, broadcast ratings, online presence, or any conventional method for measuring an organization's popularity.

The football (soccer) market reaches over 4 billion fans located in 95 countries. In some embodiments, the system's blockchain platform currently displays 2,700+ soccer teams, each represented by its token, although any number and/or types of teams are supported by the platform. In some embodiments, the system's exclusive algorithm tracks, in real-time, each soccer team performance. In some embodiments, the team performance is used in the calculation for the team-token valuation. In some embodiments, throughout the year, 24×7, the system platform (a reference to a platform is a reference to all enabling hardware and software) is configured to enable users to negotiate their tokens and utilize it as a utility fan-token by trading merchandise of their favorite soccer club. FIG. 4 shows football club tokenization and token distribution per continent according to some embodiments.

In some embodiments, the algorithm is configured to influence the token's value throughout the year. In some embodiments, the algorithm is configured to influence the token's value game-by-game. In some embodiments, the relative value of each team's related token is configured to fluctuate according to the results of the team's matches in their respective leagues and cups throughout the year, which in turn affects their token price. In some embodiments, live data (e.g., a score) is used by the algorithm to achieve the valuation calculation in real-time.

In some embodiments, the system incorporates a sense of ownership with being a fan which improves participation and results in a better return for both organization and fan (as used herein, a fan, client, user, or participant are terms understood to be interchangeable general references to a token owner). Using some embodiments of the system, people around the world now have the ability to engage with their favorite teams around the clock according to some embodiments. In some embodiments, the system enables clubs to increase their number of fans, and fans will be able to explore leagues/clubs around the globe, growing visibility for football teams from all over the world. In some embodiments, the system's blockchain for all sports includes inserting all supporting data into the system's algorithms including one or more of blockchain data, news reports, game, and event stats, and/or summary videos according to some embodiments. In some embodiments, a client wallet is configured to synchronize and/or display information related to a token's valuation. In some embodiments, the client wallet includes offline support where data is available and/or accessible to the client up until the last sync.

In some embodiments, the system's blockchain technology is a digital, distributed transaction ledger with identical copies maintained on each of the network's members' computers. In some embodiments, the blockchain is an immutable timestamped series record of data that is distributed and managed by a cluster of computers. With everyday games throughout the year, in some embodiments, the system is configured to enable a user to, buy, sell, and make an offer and trade tokens with other team token holders and/or members of the public at any given time. In some embodiments, the system enables the promotion of sports and creates a crypto-coin market as a significant avenue for fan enthusiasm. In some embodiments, the system gives fans the ability to buy, trade, and sell tokens corresponding to their favorite teams. In some embodiments, the system is configured to enable a global blockchain network to support sports. In some embodiments, the system is configured to perform and/or record all statistical and other data types to help clubs and finances on the system's blockchain.

In some embodiments, tokens correlate to each team. In some embodiments, only a limited number of tokens are correlated to each team. In some embodiments, the system includes one or more customer portals. In some embodiments, the system includes one or more channels. In some embodiments, the system includes at least two customer portals comprising at least three channels. In some embodiments, one or more of the three channels can comprise one or more publicly accessible site platforms, one or more ultra-secure trading platforms, and/or one or more management platforms, where each platform is configured to receive user input and/or be displayed on a mobile device. In some embodiments, at least a portion of the system is configured to be executed by a mobile application (App). In some embodiments, the system includes a client wallet App.

FIG. 5 shows a diagram of teams' liquidation-profits according to some embodiments. In some embodiments, the system includes, as a non-limiting example, 50 million tokens correlated to each club. In some non-limiting embodiments, 25 million are available to sell, and 25 million stay in reserve. In some embodiments, the system is configured to receive a pre-determined amount per transaction (e.g., $0.25). In some embodiments, as non-limiting examples, 50% of the available tokens are for the team, 30% are for the platform, and 20% are for liquidation. In some embodiments, clubs are able to sell their merchandising by accepting tokens and are able to sell the tokens back to the secondary market. In some non-limiting embodiments, the total amount of tokens provided by the system is 138 billion.

In some embodiments, the system includes a CFTC compliance private exchange but still enables sales to the rest of the world as a performance-based asset. In some non-limiting embodiments, all liquidation will be routed to an XLiquidus mobile app/wallet (XL App). In some embodiments, this approach gives better control over the liquidation process. In some embodiments, as a non-limiting example, the system is configured to block a particular country's residents from installing the App via the app stores and implement other restrictions in one or more other system applications to enforce the block. In some embodiments, in configurations that do not use a block, the system is configured to sell other crypto assets to customers in any country (e.g., Bitcoin, Ethereum, and so on).

In some embodiments, the system includes one or more transactional workflows and exchanges (e.g., WFCE Exchange) implemented by instructions stored on one or more non-transitory computer readable media. In some embodiments, with new customers KYC is not required. In some embodiments, the system includes instructions to enable a user to access the exchange on one or more of a mobile and web interface. In some embodiments, the system includes instructions for downloading and installing one or more system Apps. In some optional embodiments, the system includes instructions for preventing liquidation of system based assets. In some embodiments, the system includes instructions for enabling the purchase of any asset listed on the platform network. In some embodiments, the system includes instructions for converting one or more conventional crypto based currencies and/or tokens but not system specific assets. In some embodiments, the instructions configure the system to prevent select features in specific countries and/or accounts while allowing other countries and/or accounts full access to all system features.

In some embodiments, the system is configured to execute instructions for team token statistics and simulation. In some embodiments, FIGS. 6-13 depict simulations for a better understanding of the system. In some embodiments, the simulations are based on different clubs examples results for 2018, for the specific period (most of them are for the whole year). In some embodiments, token price performance is shown based on the club's game result. In some embodiments, graphics simulations include a chart with dates and WFCE currency token amount that is equivalent to the USD amount. In some embodiments, the token price goes up and down based on an algorithm which includes one or more of the 5 factors described herein.

In some embodiments, for these non-limiting example simulations, the system launches the tokens at the price of a 1.00 WFCE equivalent to USD 1.00. In some embodiments, the lowest token price is USD 0.05 no matter how many games clubs have lost. In some embodiments, system is configured to ensure that each token does not go under USD 0.05. In some embodiments, the system is configured to not apply the algorithm at a predetermined lowest token price to avoid a token's value from diminishing past the predetermined lowest token price.

Figure 7:
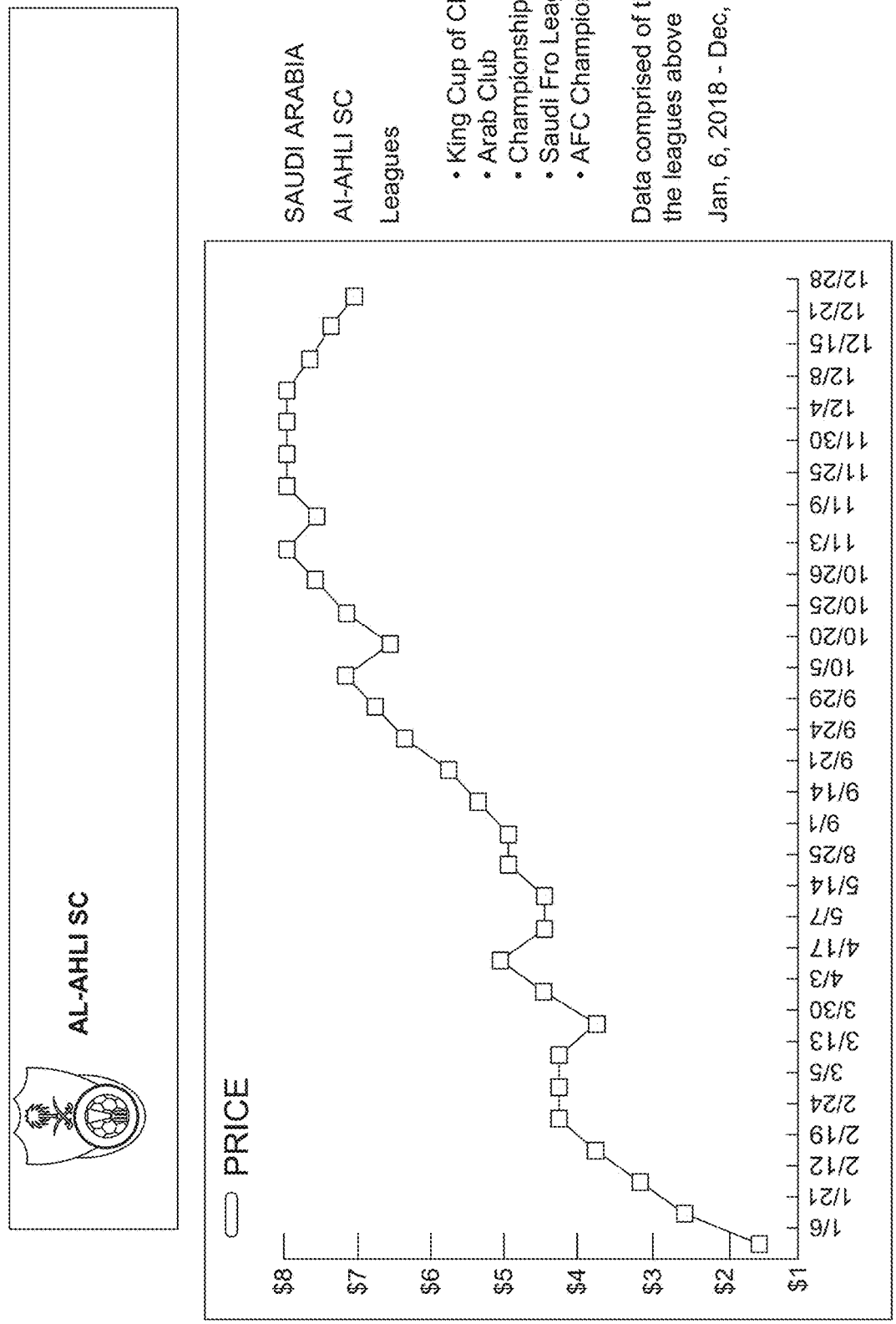
Figure 8:
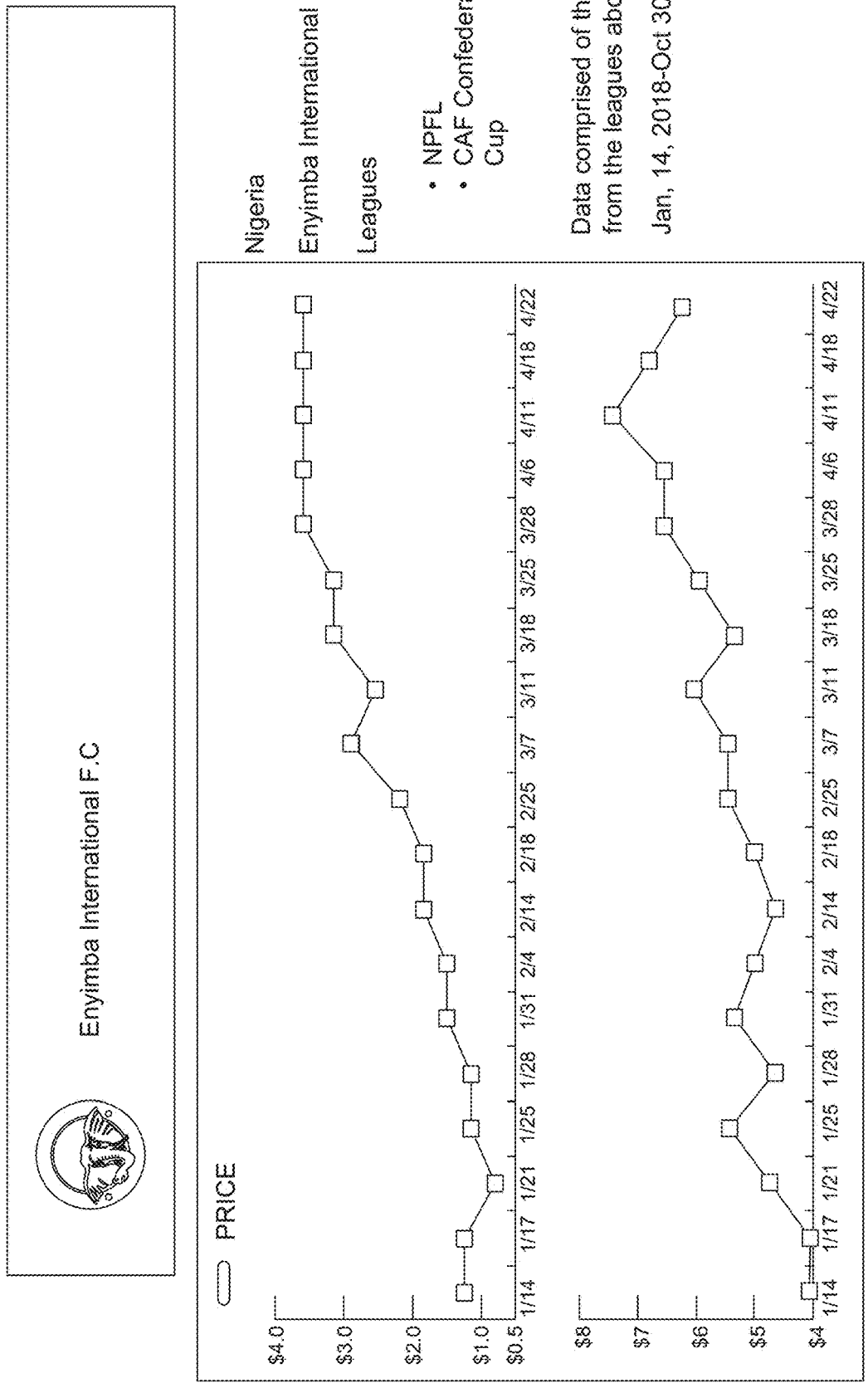
Figure 9:
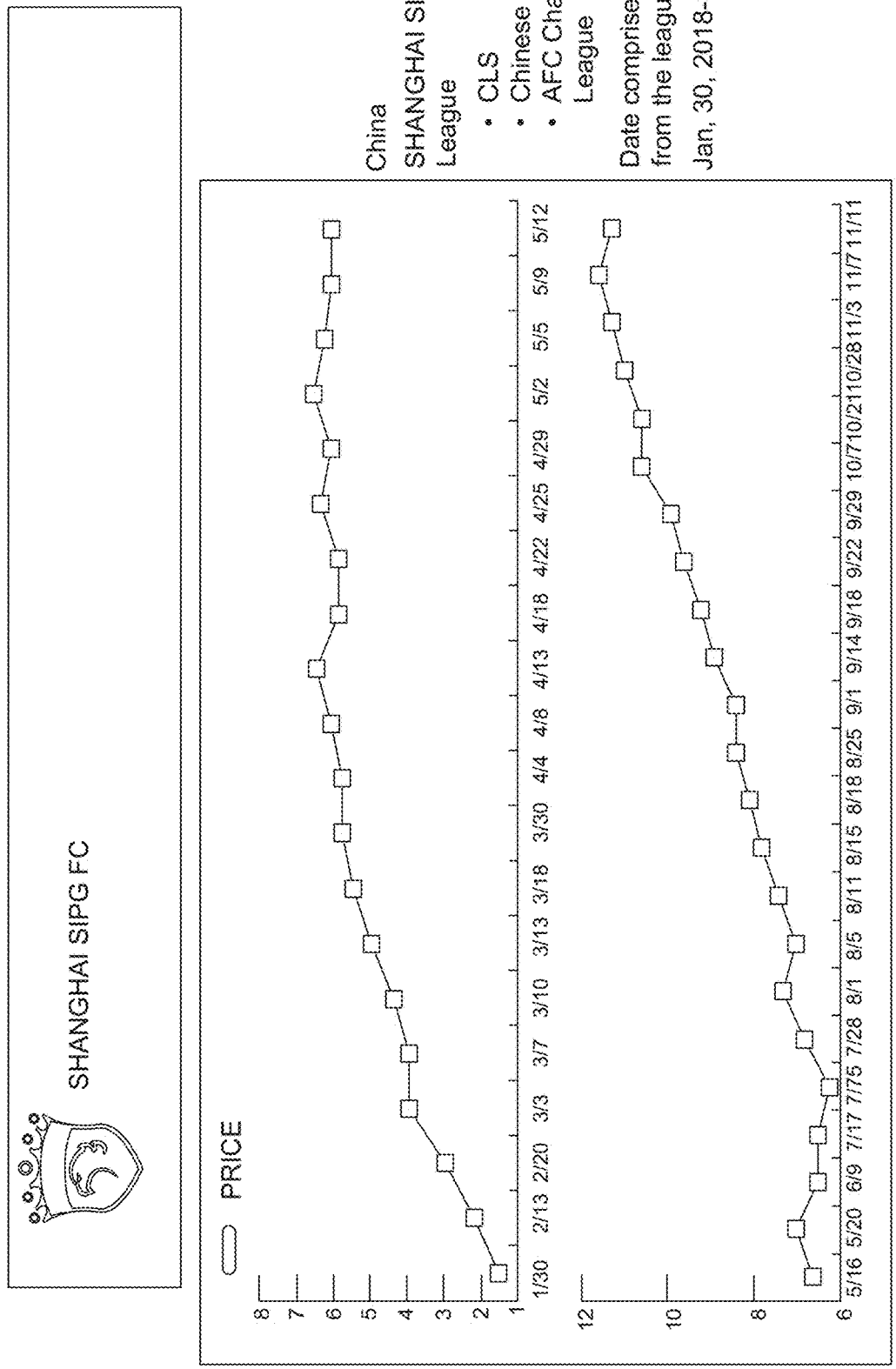
Figure 11:
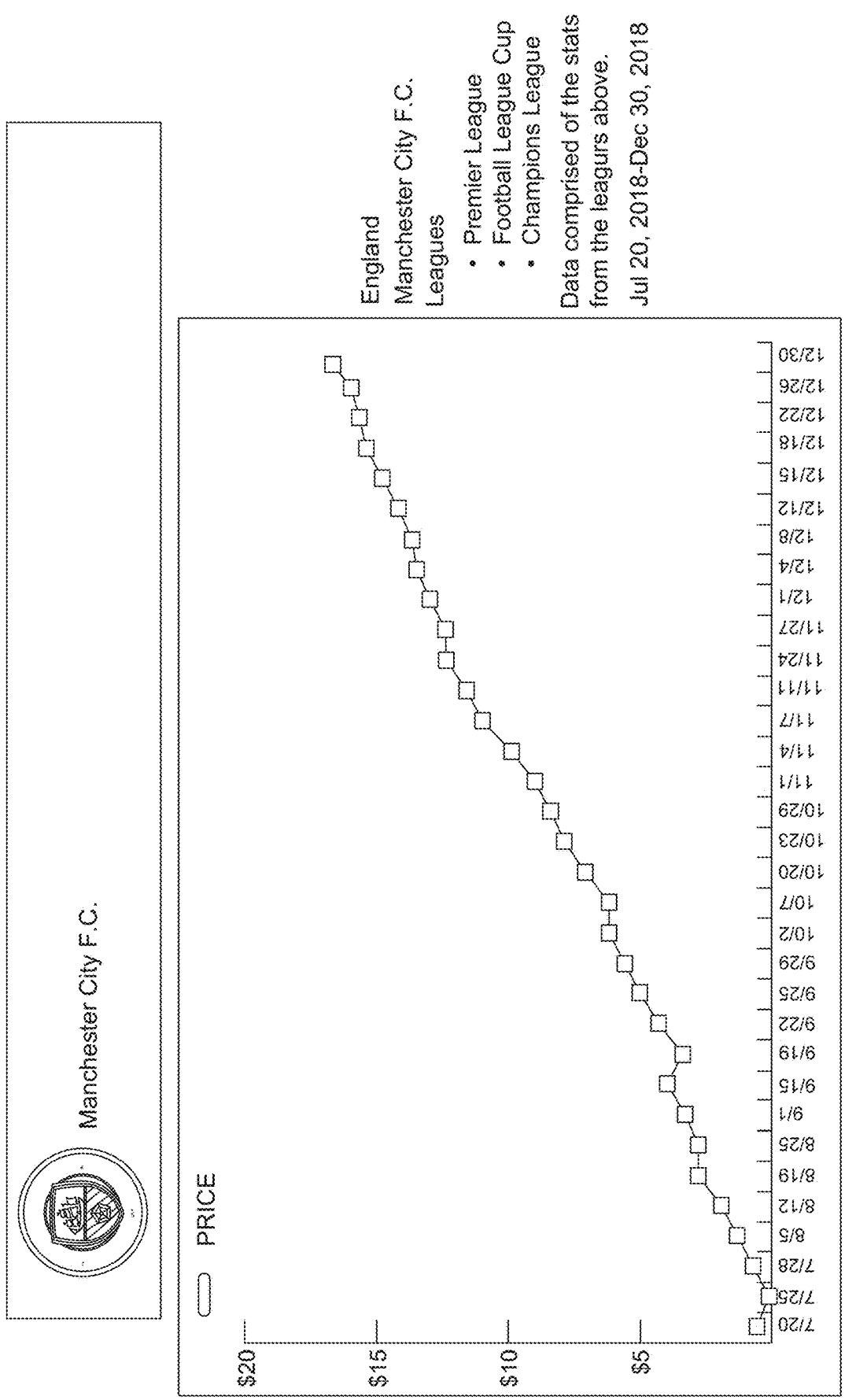

In some embodiments, the simulation shows the functionality of the platform and the performance of the token according to the 2018 results. FIG. 6 shows a Real Madrid C.F. simulation according to some embodiments. FIG. 7 shows an AL-AHLI SC simulation according to some embodiments. FIG. 8 shows an Enyimba International F.C. simulation according to some embodiments. FIG. 9 shows a Shanghai SIPG F.C. simulation according to some embodiments. FIG. 10 depicts a Kashima Antlers simulation according to some embodiments. FIG. 11 illustrates a Manchester City F.C. simulation according to some embodiments. FIG. 12 shows a Sport Club Do Recife simulation according to some embodiments. FIG. 13 depicts a Cruzeiro Esporte Clube simulation according to some embodiments.

Figure 14:
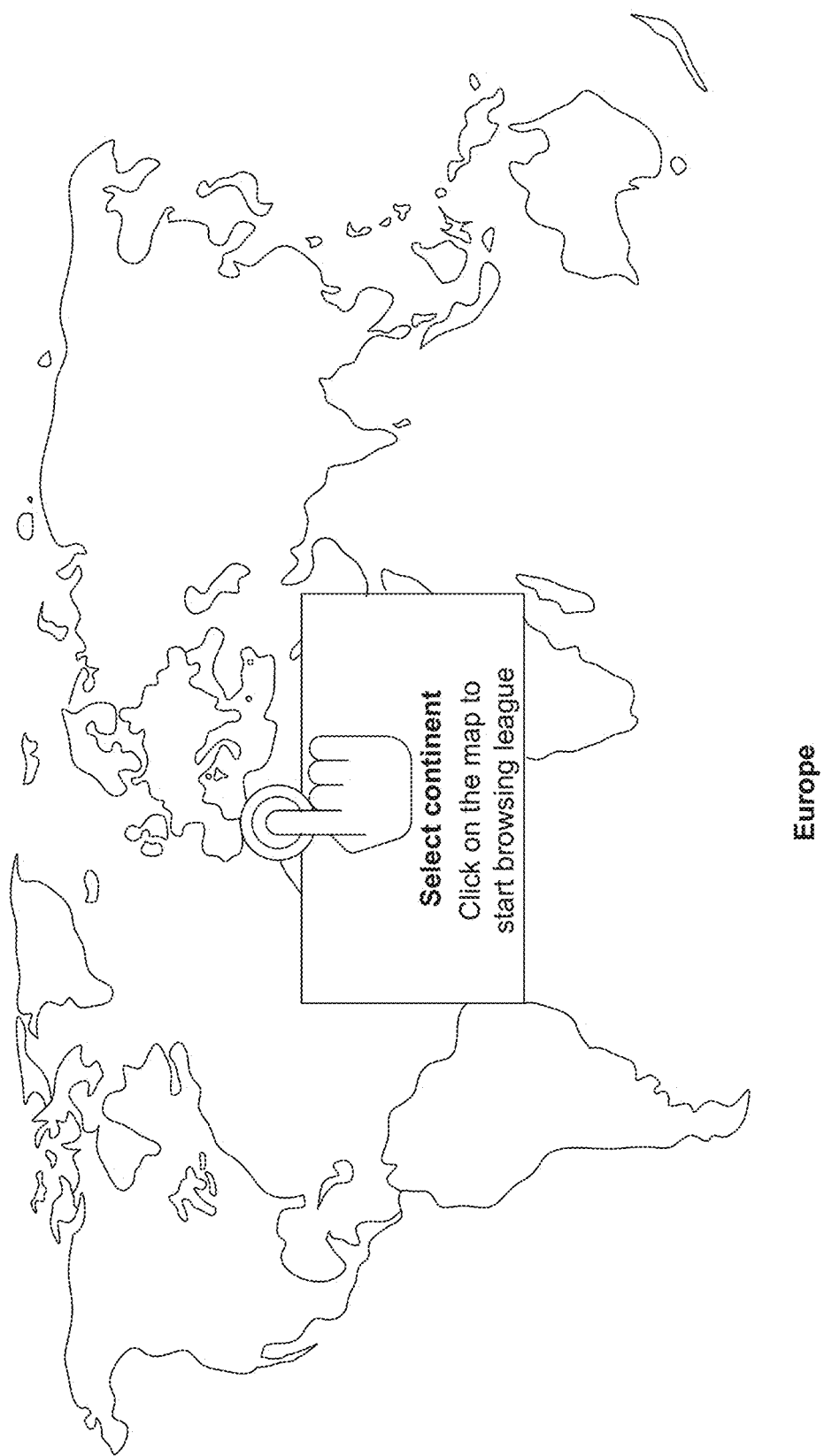
Figure 17:
Figure 18:
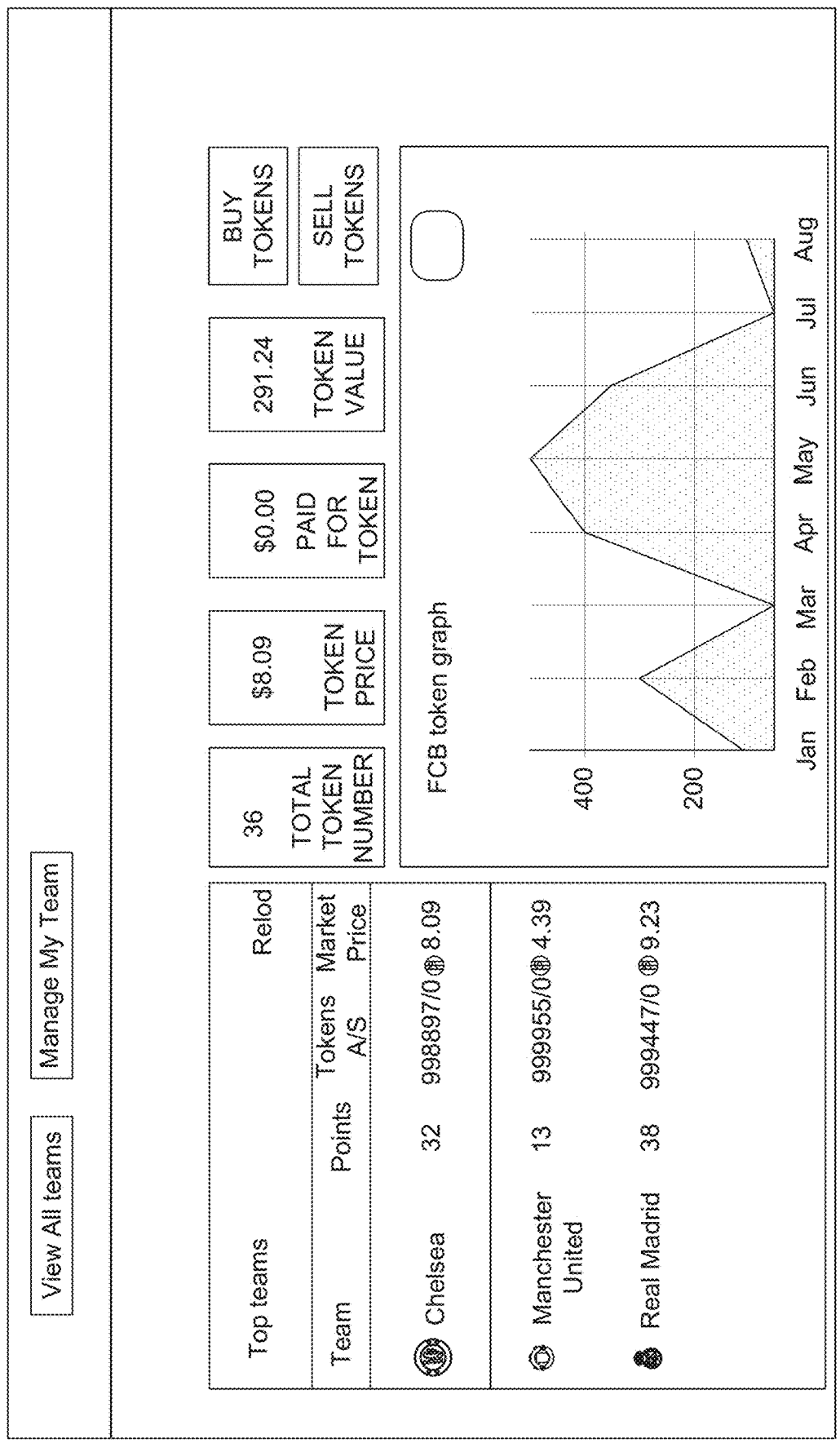
Figure 19:
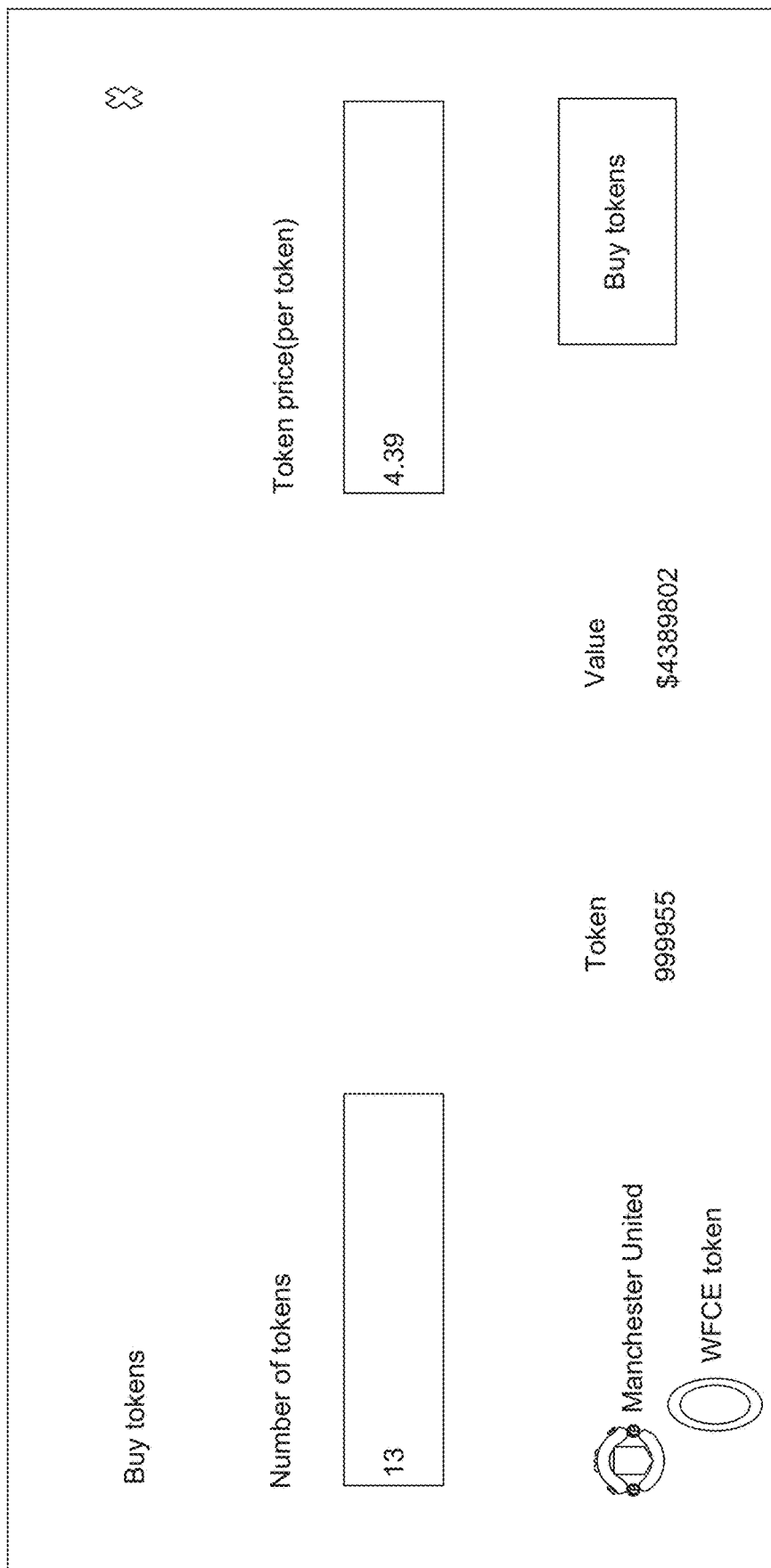

In some embodiments, the system includes a homepage. In some embodiments, the homepage is designed to give the user a better understanding of what the project goals are, how the system works and what security rules are propagated. In some embodiments, the top of the homepage is dedicated to a world map, where the world map is configured to enable the audience to interact with the global map and add tokens for desired teams into the shopping cart. In some embodiments, the homepage shows top teams in WFCE, for each phase selected (continent, country, and league). According to their current token price and coming match schedule, they can decide whether to buy a token or not. FIGS. 14-15 depict elements of the homepage according to some embodiments.

In some embodiments, the system includes a dashboard. In some embodiments, after the user successfully logs in, the page that appears on the screen is dashboard. In some embodiments, on top of the page, in the main navigation bar section, the system is configured to display one or more of quick links, a cart, and user settings. Quick links are displayed to make site navigation faster, and the cart is configured to store and show team tokens according to some embodiments. In some embodiments, below a navigation bar and a navigation panel, a main dashboard view is configured to display (show) one or more of a user wallet status and report for all transactions. In some embodiments, the display includes one or more of: dynamic private offers—displays highest private offers completed; WFCE top teams—displays teams that sold most tokens; match schedules—prints schedule for user teams; user top teams—displays top user teams. In some embodiments, from the main dashboard view, the user can go to a view all teams and/or manage teams section. FIGS. 16-19 show elements of a dashboard according to some embodiments.

In some embodiments, the system includes a manage teams section. In some embodiments, the manage teams section shows owned tokens. In some embodiments, under this view, a user can buy/sell tokens. In some embodiments, for each club the display shows one or more of the following data: token performance shown in a graph; token value; current token price; token paid price; number of tokens owned; number of tokens available/sold; and team current league points. In some embodiments, buying more tokens is a process that involves adding tokens and/or coins to a cart.

In some embodiments, the system comprises one or more computers comprising one or more processors and one or more computer readable media. In some embodiments, the one or more computer readable media includes instructions stored thereon that when executed, cause the one or more computer to implement the instructions by way of the one or more processors.

Figure 20:
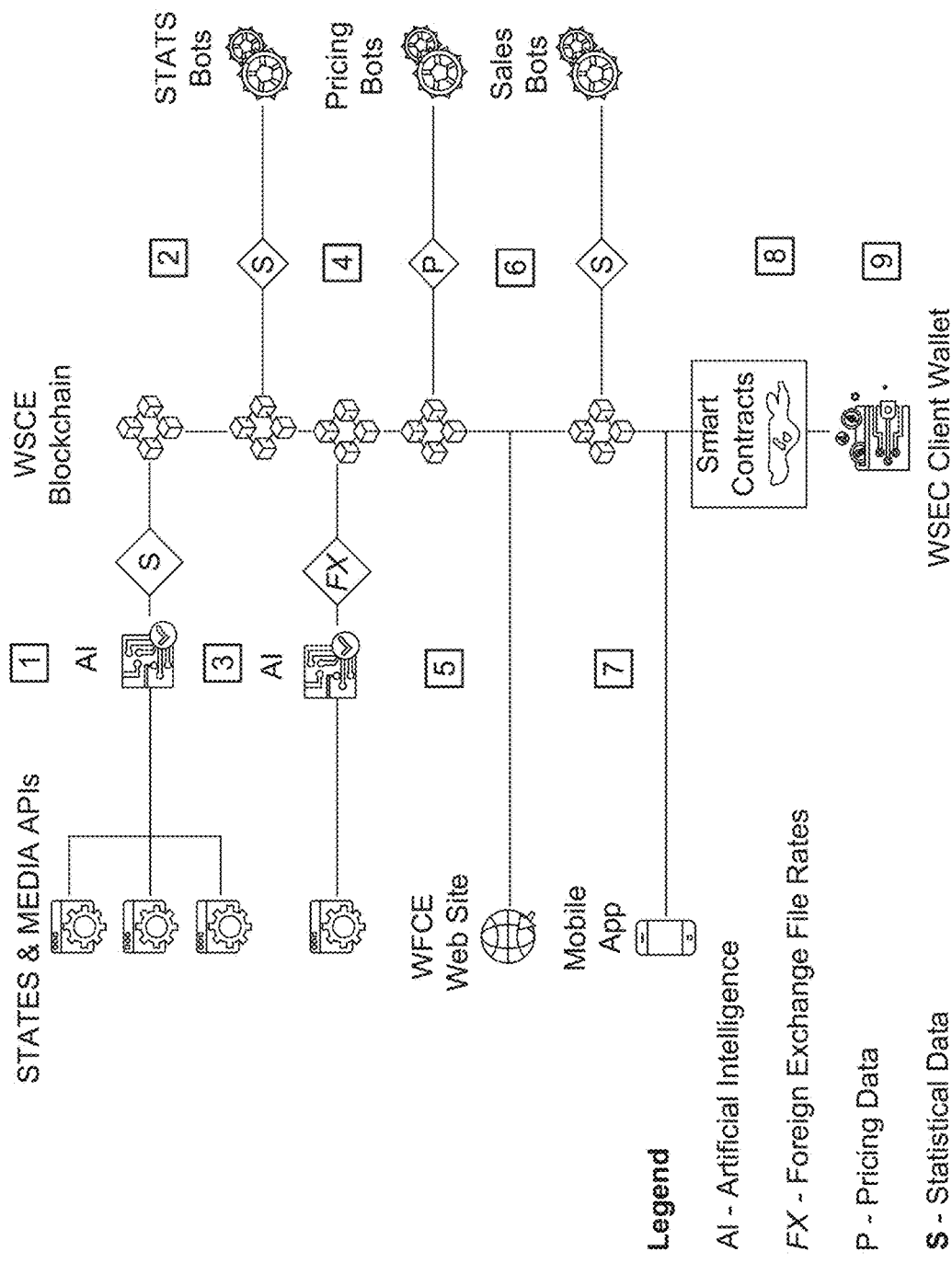
FIG. 20 shows a technology schematic of the system according to some embodiments.

FIG. 20 shows a technology schematic of the system according to some embodiments. In some embodiments, the instruction stored on one or more non-transitory computer readable media and executed by one or more computers and by one or more processors include a system and/or method for a technology workflow that includes one or more of the following steps according to some embodiments: (1), by the one or more processors, and verify statistics and related media from several different sources using a statistical AI cognitive module; once verified, send, by the one or more processors, the data to the WSCE Blockchain (aka WS-BLK). (2) analyze, by the one or more processors, the newly updated stats to the WS-BLK using one or more statistic bots. After the system update, all team points affected by the recent analysis, adjust, by the one or more processors, team points and submit it to the WS-BLK. (3) request, by the one or more processors, a foreign exchange (FX) request from FX APIs and verify the data periodically. Once verified, this is also sent to the WSBLK, by the one or more processors. (4) The pricing bots take over, adjusting, by the one or more processors, all affected teams by updating the token price based on the new statistical data and the FX information. Then, submit, by the one or more processors, the token price to the WCSE blockchain. (5) WFCE site manages user interactions via the system and the WSCE blockchain: clients buy and sell tokens, manage their clubs assets (online team wallet), and submit the request for processing. (6) Sales bots manage, by the one or more processors, sales created by users in the WSCE system. These bots complete or handle the entire sales process in some embodiments. Once completed, the results are sent, by the one or more processors, to the WSCE blockchain. (7) The mobile version of the WSCE application supports the functions supported by the website with some additional features to support security and KYC/user verification/confirmation. (8) The WSCE system also supports smart contracts and all of the conventional smart contract functionality the Blockchain community is familiar with functions like DAO, voting and so on. In addition to this, the system smart-contracts also support features that allow clients access to teams' stats, foreign exchange, and pricing; this feature of the WS-BLK is dependent on the WSCE downloadable client wallet. (9) The final component in the WSCE Blockchain architecture is the WSCE downloadable client wallet according to some embodiments. Here, clients have access to most of the core WSCE functions that are supported online, once connected to an active internet connection according to some embodiments.

In some embodiments, the wallet supports one or more online functions in offline mode. In some embodiments, data will only be available up to the last online network synchronization. In some embodiments, the WSCE downloadable client wallet also supports 3 wallet synchronization modes. Normal mode—keeps tracks all asset own by the client, financial data only according to some embodiments. Next, super mode with support of all the functions as normal mode plus syncs all the other financial data and statistical data as well according to some embodiments. Final, master mode supports all other functions of the other modes as well as media data synchronization according to some embodiments.

In some embodiments, the system includes a mobile application that offers one or more of the same functions that are available on the web application and some essential additions as well. In some embodiments, the instruction stored on one or more non-transitory computer readable media and executed by one or more computers and by one or more processors include a system and/or method for a mobile application that includes one or more of the following functionalities according to some embodiments: buy, sell, bid, withdrawal request, location verification, mobile KYC verification, mobile document verification, and/or two-factor authentication and verification.

In some embodiments, the system includes many security-related technologies to protect clients. In some embodiments, the instruction stored on one or more non-transitory computer readable media and executed by one or more computers and by one or more processors include a system and/or method for security that includes one or more of the following functionalities according to some embodiments: (1) multifactor authentication for sign in and large payments or suspicious transactions, where one or more types of multifactor authentication include one or more of: Voice security code verification; SMS, push and email messaging; Google Authenticator; WFCE App; biometrics; and SQRL authentication and or verification as non-limiting examples; (2) multilayer application security; (3) penetration testing; (4) network level security; (5) military-grade data encryption; and (6) AI and other proprietary methods.

In some embodiments, one or more aspects of the system support transparency. In some embodiments, the WFCE platform are transparent with every transaction. In some embodiments, all match results are according to a live data platform. In some embodiments, all clubs will have the same performance algorithm benchmark that was developed internally. In some embodiments, the only difference between clubs is the leagues that they participate in which vary in difficulty levels according to its regions, global distributions, and difficulty level by continents. In some embodiments, the system includes a FinCEN registered Company, Annual Audits (system and financials). In some embodiments, all public information available on the WSCE Blockchain. In some embodiments, the system is GDPR compliant.

In some embodiments, the system includes know you customer (KYC) functionality. In some embodiments, due to regulatory compliance, the system is configured to require reasonable amount of information on clients before permitting them to access the system. In some embodiments, this information includes at least some conventional data collected by most online portals and financial institutions. In some embodiments, clients may be asked to supply the system with one or more of the following and/or it may be collected while they attempt to use the system: a source of funds, proof of address, and government-issued ID (e.g., passport, driver license or tax card). In some embodiments, the system is configured to impose payment or transaction restrictions and/or system-wide country restrictions. Additionally, in some embodiments, the system is configured to ask clients to provide an active payment card to assist with the verification process. In some embodiments, the system uses this along with one or more other security systems and client verification processes to establish a solid client KYC profile.

Figure 21:
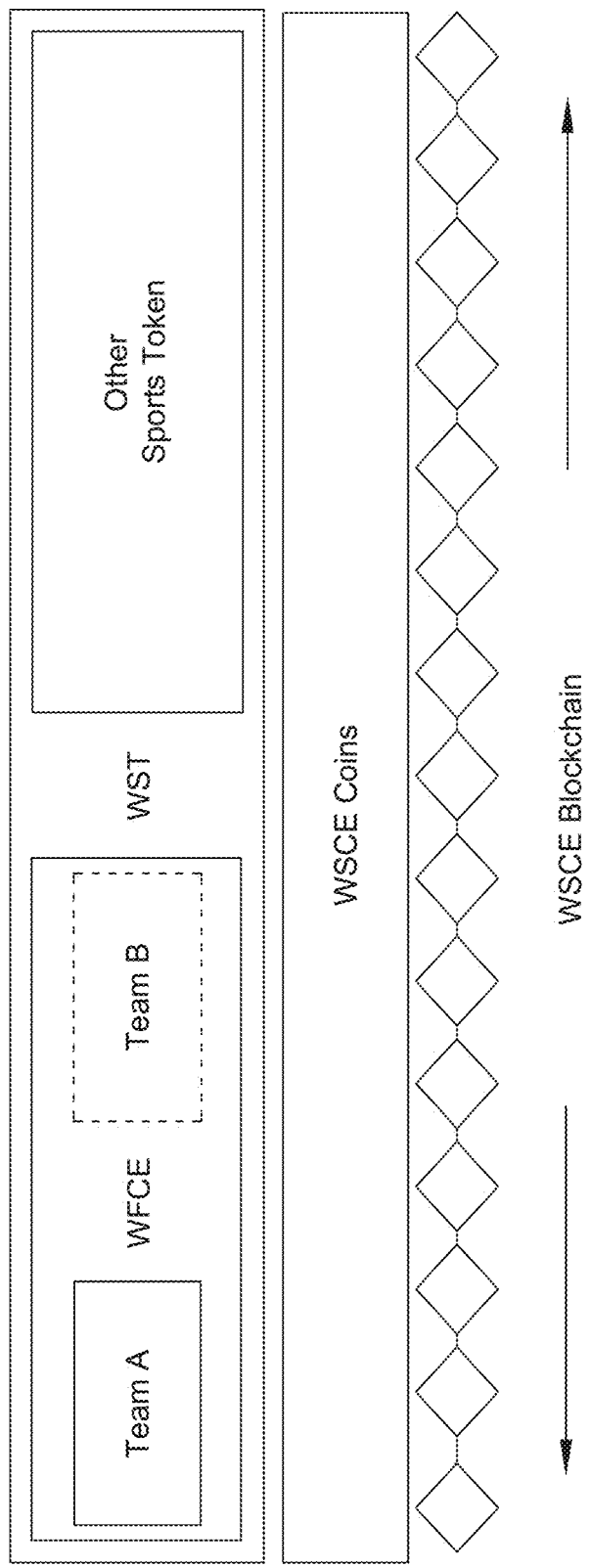
FIG. 21 shows a WSCE token types diagram according to some embodiments.

In some embodiments, the system's WSCE blockchain supports at least 2 token types, WSCE coins and WST (World Sport Tokens). In some embodiments, these tokens operate in a similar way to the Ethereum network, with Ether at the level 1 layer as the driving force behind the entire system and custom token operation at the layer 2 level. In some embodiments, the WSCE coin is a layer 1 token. In some embodiments, this token is the base cryptocurrency for the entire network and can be used to acquire any of the layer 2 tokens. In some embodiments, it can be obtained by mining or can be purchased from anyone on the network that own's WSCE coins. In some embodiments, all sport types token will contribute to the growth of the WSCE coin as it is the only layer 1 Token which drives the entire WSCE blockchain. In some embodiments, WST (World Sports Token) are layer 2 tokens that sit above the native WSCE tokens and are created to support different sports, teams, and clubs. In some embodiments, these tokens cannot be mined and have to be acquired from other WSCE blockchain users from buying, selling, or purchased directly from the system. FIG. 21 shows a WSCE token types diagram according to some embodiments.

Figure 22:
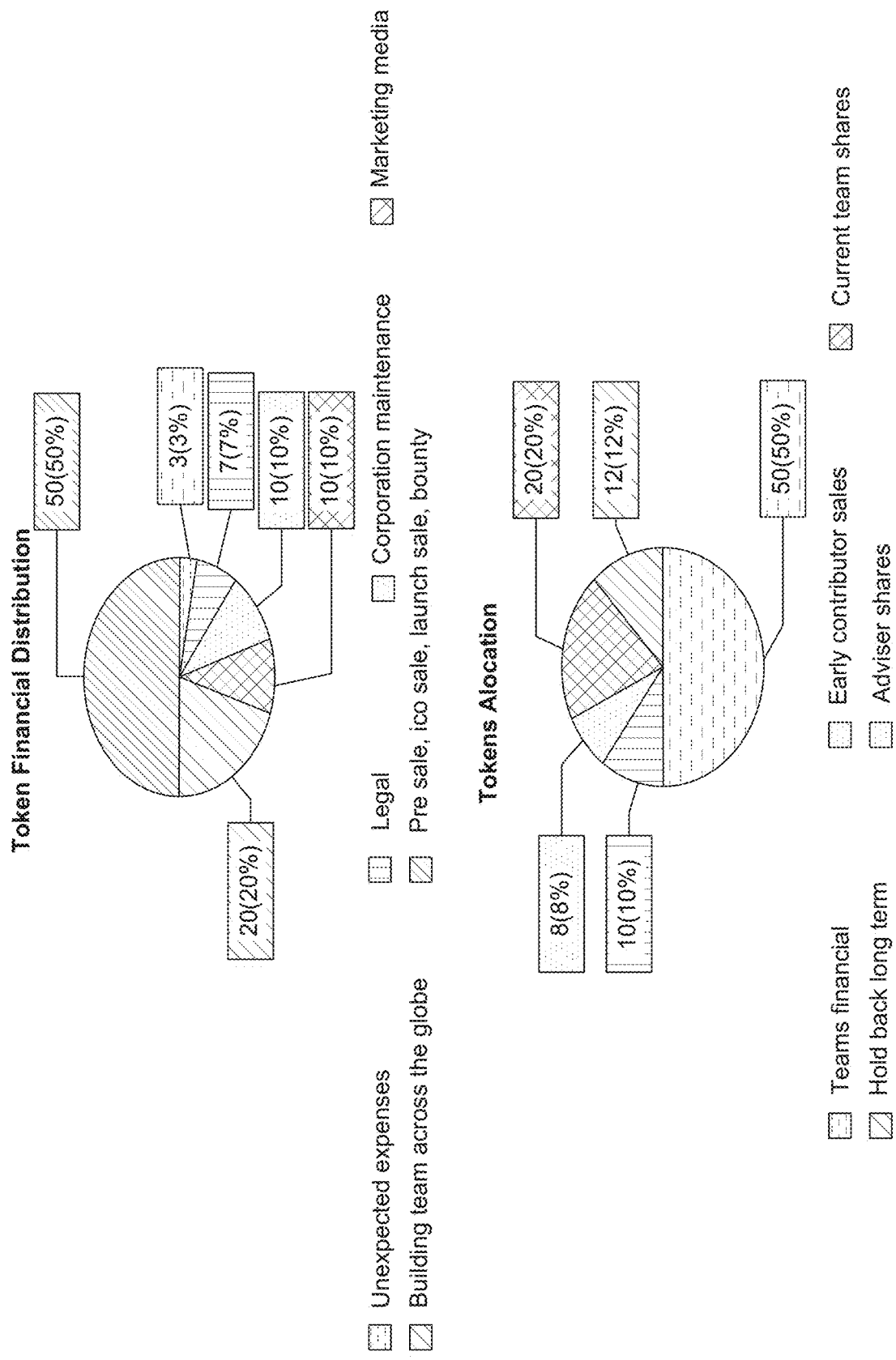
FIG. 22 shows token allocation and token financial distribution according to some embodiments.

In some non-limited embodiments, the system enables the WFCE to distribute 136 billion tokens in total. In some embodiments, tokens are evenly divided throughout the globe, including 95 countries and 2740 football teams. In some embodiments, each team receives 50 million tokens, and 50% are team reserved. FIG. 22 shows token allocation according to some embodiments.

FIG. 22 also depicts token financial distribution according to some embodiments. The chart shows an example distribution for how many percentages will go for marketing, PR, Media, how many will go for building the developer team, how many Global operations, legal expenses, mix and unexpected costs and reserve funds according to some embodiments.

Figure 23:
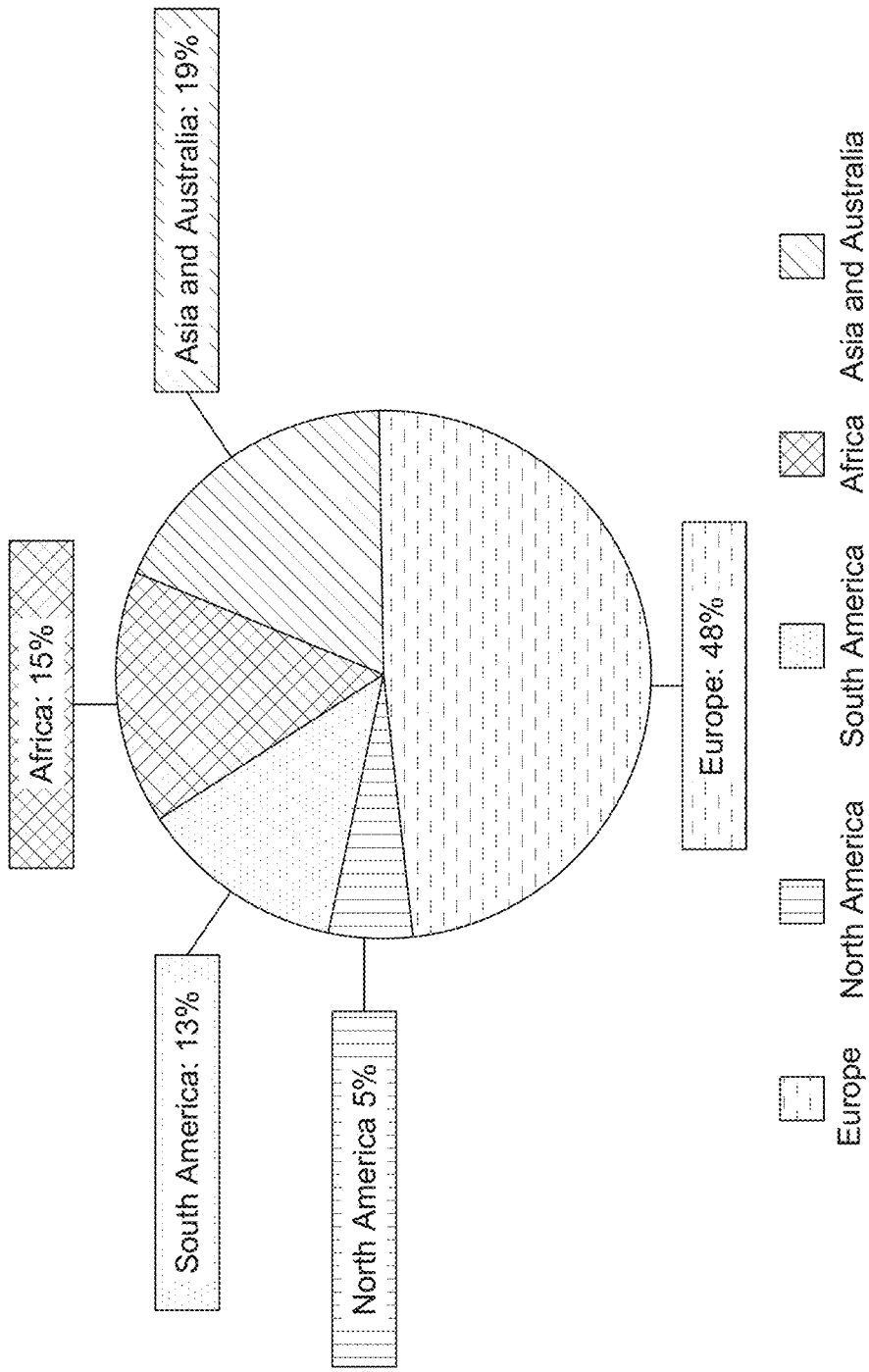
FIG. 23 shows an example token contribution per continent according to some embodiments.

FIG. 23 shows an example token contribution per continent according to some embodiments. In some embodiments, it is an even distribution for all the clubs, 50 Million tokens per club, where 25 million will be available to sell, and 25 million will stay on reserve. In some embodiments, the system concentrates on tokenizing only the clubs that are performing at the major leagues according to its countries, but it is understood that new tokens can be created for new clubs as interest and participation grows.

FIG. 24 shows a non-limiting example of a number of clubs, countries, and tokens assigned in the system for the European region according to some embodiments. In some embodiments, the system enables concentrating tokenizing only the clubs that are performing at the major leagues according to its countries Divisions A and B. In some embodiments, Europe has the most elite leagues in the world, a football superpower, and the system is configured to support this giant token distribution with over 1000 teams where supply and demand is the highest in all continents. A continent token distribution summary for Europe, according to some embodiments, includes: total amount of countries in Europe (44), total amount of teams in Europe (1,321), total amount of token in Europe (66,050,000,000 billion).

FIG. 25 shows a non-limiting example of a number of clubs, countries, and tokens assigned in the system for South America according to some embodiments. A continent token distribution summary for South America, according to some embodiments, includes: total amount of countries in South America (10), total amount of teams in South America (348), total amount of token in South America (17,400,000,000 billion).

FIG. 26 shows a non-limiting example of a number of clubs, countries, and tokens assigned in the system for Africa according to some embodiments. A continent token distribution summary for Africa, according to some embodiments, includes: total amount of countries in Africa (18), total amount of teams in Africa (414), total amount of token in Africa (20,700,000,000 billion).

FIG. 27 shows a non-limiting example of a number of clubs, countries, and tokens assigned in the system for Asia and Australia according to some embodiments. A continent token distribution summary for Asia and Australia, according to some embodiments, includes: total amount of countries in Asia (19), total amount of teams in Asia (514), total amount of token in Asia (25,700,000,000 Billion).

FIG. 28 shows a non-limiting example of a number of clubs, countries, and tokens assigned in the system for North America according to some embodiments. A continent token distribution summary for North America, according to some embodiments, includes: total amount of countries in North America (4), total amount of teams in North America (136), total amount of token in North America (6,800,000,000 Billion).

In some embodiments, the system is configured to take promotion into account when analyzing valuation. Based on their performance for the completed season the lowest division clubs are promoted to the higher division for the next season. In some embodiments, if the team is coming from a secondary division, the opportunity for a better token investment performance will be higher as the team will be promoted to an elite division and the token's value will go up according to its performance. Usually, it will be 2 to 4 new teams that will be moved to the new division every year, from over 90 countries with a possibility of 200 to 400 new clubs according to some embodiments.

In some embodiments, if a team is coming from a league that has not yet been entered in the system, system is configured to enable the new coins to go on a presale schedule before the new season. In some embodiments, an investor's database will have the privilege to purchase a new token on presale price. In some embodiments, this creates more investment possibility every year. In some embodiments, if all coins not sold at presale offer, the system enables the remaining coins to be purchased at an Initial Coin Offering (ICO) price, (but higher than its first offer price). In some embodiments, the system enables the current active members to have the first offer before launched to the public before the season starts.

In some embodiments, the worst-ranked team(s) in the higher division is relegated to the lower division for the next season. In some leagues and countries, approximately 2 to 4 teams are be relegated to lower divisions. In some embodiments, teams that exchange between levels 1 and 2 and that will increase the opportunity for buyers to buy new tokens from division 2 at a lower rate and also tokens from division 1 that got relegated at a lower price. In some embodiments, with a league difficulty levels league, division 2 coin metric system will have a lower points scale in the leagues, and this will create an opportunity for new uprising teams to increase their value at its best when reaching the elite or division 1 league, champions leagues, cups, and state tournaments, according to its country league regulation.

In some embodiments, the system includes investment token protection (iITP) to protect investor's opportunities. In some embodiments, the system enables the WFCE to create escrow accounts around the world to enable transactions, and secure investors need with an intention to assure a successful application launch. In some embodiments, the system enables the WFCE to hold back 20% of investments to utilize for marketing campaigns and company operations. In some embodiments, the system enables the remaining 80% to be held in escrow accounts. In some embodiments, the system enables the previously invested funds that are in the escrow accounts to be released back to its original investors if WSCE/WFCE does not comply with the agreement made by parties (investors) and entities. In some embodiments, to be able to utilize iITP investors must reach the minimum investment requirement which is 1,000,000.00 USD.

Figure 29:
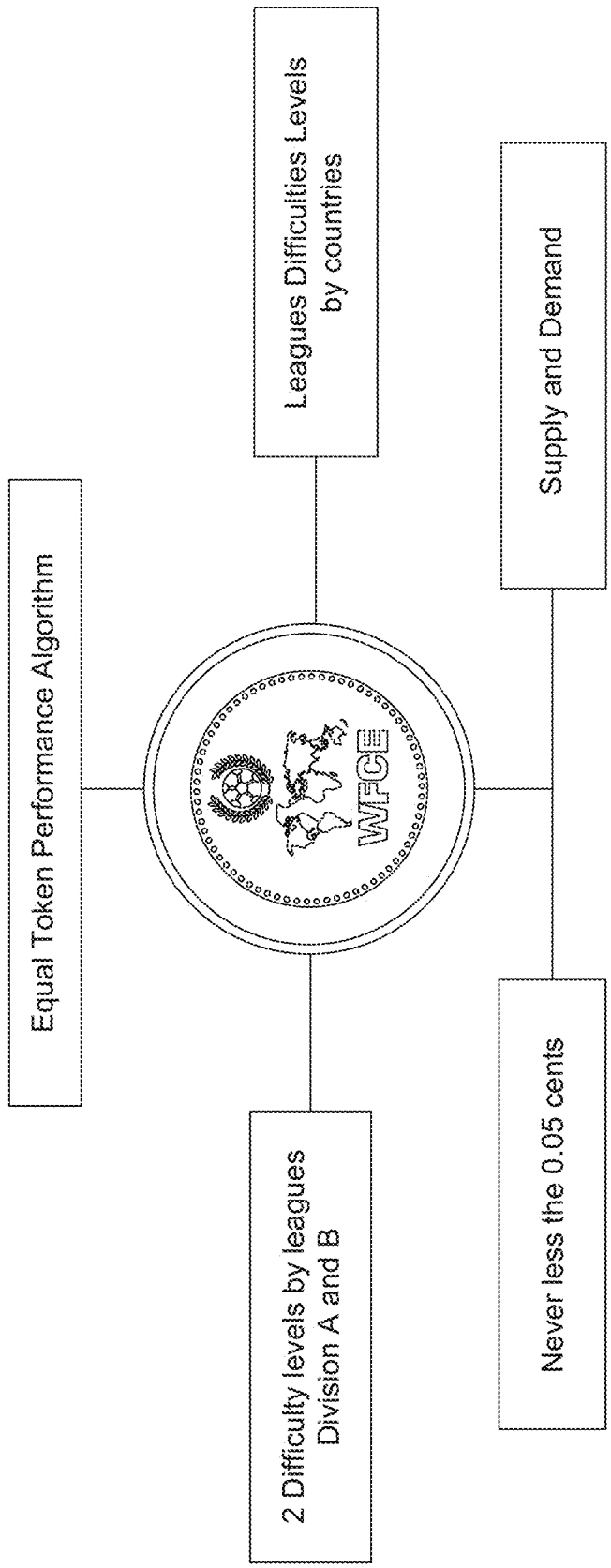
FIG. 29 depicts 5 factors that impact a token's performance according to some embodiments.

FIG. 29 depicts 5 factors that impact a token's performance according to some embodiments. In some embodiments, by integrating one or more of the 5 factors as parameters into the system's valuation algorithm, the system is unique in that it is based on blockchain technology, but the value of system tokens will fluctuate according to the teams matches in the leagues and cups through the year. In some embodiments, according to team winning/losing/draw performance, the token price will change by the algorithm with the support of live data. In some embodiments, factors that effect a token's valuation include weighting by one or more of: an equal token performance algorithm, difficulty level by league division, league difficulty by country, a lowest evaluation of $0.05, and supply and demand.

In some embodiments, with a limited amount of 50 million tokens per club and over 4 billion football fans, WFCE tokens will be the most valuable sports token sale in the world. In some embodiments, the system's supply and demand algorithm uses multiple mathematical vectors to produce a unique value for each team. In some embodiments, this includes a standard supply and demand formula. In some embodiments, based on their performance game by game, each country will have its difficult level by state leagues, national league, and international and intercontinental league difficulties. In some embodiments, the impact on their results match by match will determinate the value of the token. In some embodiments, some of the clubs that do not have a high performance throughout the season will be relegated to a lower division. In some embodiments, this process will occur every year. In some embodiments, a club token value can never be less than 0.05 cents. In some embodiments, the only way for a Token to lose its complete value will be a club extinction from all the leagues. FIG. 30 shows a token league difficulty summary according to some embodiments.

FIG. 31 represents a payment workflow according to some embodiments. In some embodiments, the instructions stored on one or more non-transitory computer readable media and executed by one or more computers and by one or more processors include a system and/or method for a payment workflow that includes one or more of the following steps: (1) a user completes the checkout process by depositing one of the main supported cryptocurrencies on the system by sending it to a specific address. (2) The transaction is received by the WSCE cloud system and recorded to the WSCE blockchain. (3) Funds are sent to the WSCE online wallet and recorded to the WSCE blockchain. (4) the system completed the pending sale by finalizing the transaction and transferring the requested team tokens to the user WSCE Online wallet and records it to the WSCE blockchain. (5) user is provided the option of one or more of: (a) leaving the team tokens in their online wallet; (b) sending it to their WSCE client downloaded wallet (c) selling the tokens and converting it fiat (e.g., via Ripple Network) to arrive in their bank account (d) selling the tokens and converting to any of the supported cryptocurrencies and send them to an external wallet; (e) selling the tokens and converting to WSCE coin which can be stored in their online WSCE Wallet or WSCE client downloaded wallet. In some embodiments, all transactions are recorded to the WSCE blockchain.

FIG. 32 illustrates a sale workflow according to some embodiments. In some embodiments, the instructions stored on one or more non-transitory computer readable media and executed by one or more computers and by one or more processors include a system and/or method for a sale workflow that includes one or more of the following steps: (1) a user puts team tokens or WSCE coins up for sale; (2) The system escrows the requested user assets that they would like to sell; (3) The system creates a priority 1 sale request depending on the type of sale the user would like to conduct; (4) The system completes the pending sale request by finalizing the transaction and transferring the requested assets to the user WSCE online wallet in the requested payout type; (5) user is provided the option of: (a) leaving the newly acquired funds in their online wallet; (b) sending it to their WSCE client downloaded wallet; (c) convert the funds to fiat (e.g., via Ripple Network) to arrive in their bank account; (d) convert the funds to any of the supported cryptocurrencies and send them to an external wallet; (e) convert the funds to WSCE coin which can be stored in their online WSCE Wallet or WSCE client downloaded wallet. In some embodiments, all transactions are recorded to the WSCE Blockchain.

Figure 33:
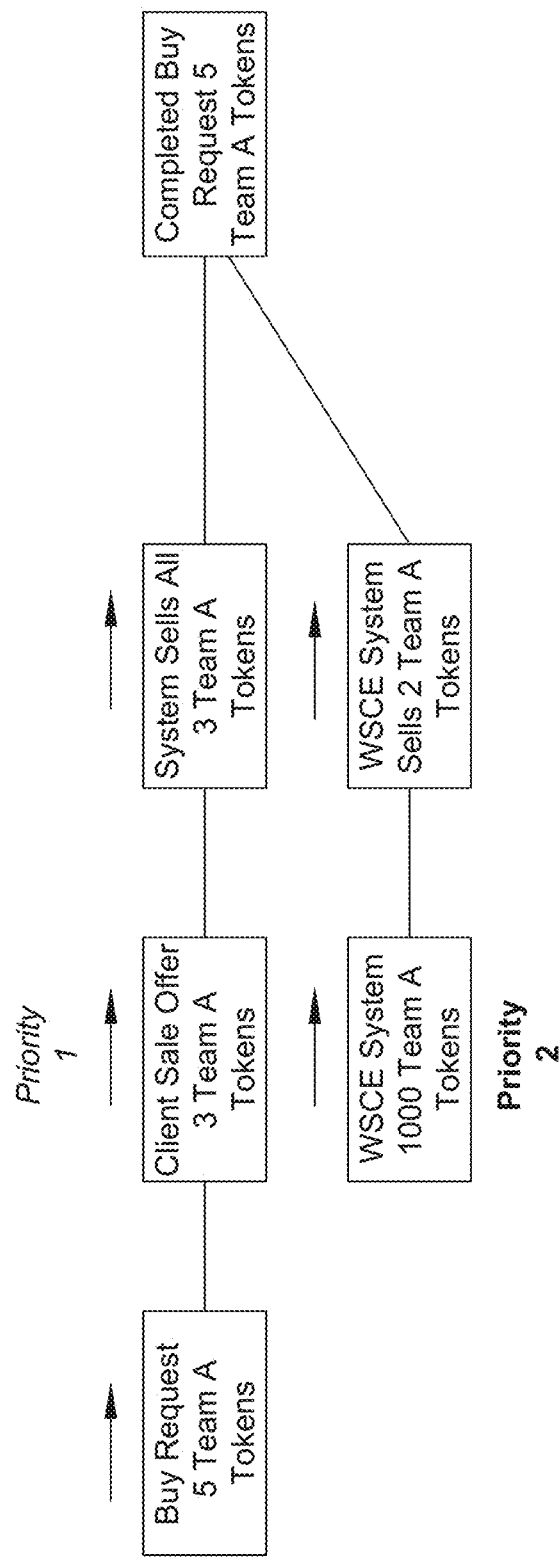
FIG. 33 represents flowchart of a priority 1 sale request.

FIG. 33 represents flowchart of a priority 1 sale request. In some embodiments, the system will automatically create a priority 1 sale request item. Any incoming requests to buy team tokens, the system will sell the user sale items that are available as a priority 1 sale request item before any WSCE asset for sale.

FIG. 34 shows computer implemented instructions for a non-limiting example cart checkout process according to some embodiments. In some embodiments, in step 1, the user is going through the first phase of the cart checkout process. In some embodiments, for each team they have in the shopping cart, one or more of a: quantity, amount, and total is displayed. In some embodiments, the token quantity can be changed in this phase. In some embodiments, in step 2, the user selects the option to make a payment for tokens. In some embodiments, the system supports one or more of Bitcoin, Bitcoin Cash, Ethereum, and Litecoin. In some embodiments, on Step 3, the user gets an address which they need to use when making payment. In some embodiments, the user needs to complete the transaction in the next 50 minutes. In some embodiments, after the transaction is completed, the tokens will automatically be transferred to his account. In some embodiments, the Tokens then will be displayed on the dashboard under the My Team's section. In some embodiments, after the user confirms the transaction, he receives a successful message at the end of the completed purchase.

Figure 36:
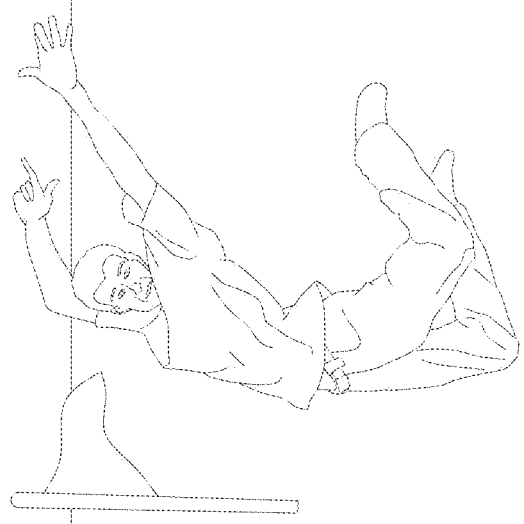
FIG. 36 shows non-limiting example of a successful message at the end of the completed purchase according to some embodiments.

FIG. 35 shows a non-limiting example display by the system for a payment request according to some embodiments. FIG. 36 shows non-limiting example of a successful message at the end of the completed purchase according to some embodiments.

In some embodiments, the system is configured to sell tokens. In some embodiments, the system includes multiple options to sell tokens, two of which include public sale and private sale. In some embodiments, public sale is the faster way of selling tokens. In some embodiments, in this option a user not allowed to change the token price. In some embodiments, the system is configured to sell these tokens under the current token price. In some embodiments, a user only sets the number of tokens to sell and specifies when the sale ends. A private sale can be a long way of selling tokens according to some embodiments. In some embodiments, the system is configured to enable a user to set a token price higher than the current market token price. In some embodiments, to sell tokens under private sale, the system is configured to enable a user to set the sale end date and number of tokens to sell.

FIG. 37 shows a sell token display according to some embodiments. In some embodiments, once sold, users have the option to leave the resulting proceeds from the sales in the WSCE online wallet and buy more tokens immediately or in the future. In some embodiments, withdrawing the funds in any of the major for four supported cryptocurrencies (Bitcoin, Bitcoin cash, Ethereum, or Litecoin) is enabled by the system for direct withdrawal. In some embodiments, the system is configured to convert funds to other cryptocurrencies as a conversion withdrawal.

In some embodiments, the system includes a bidding option. In some embodiments, the system enables users to bid for tokens from specified clubs. In response, the system enables the token owner to decide if they are willing to sell at the requested bidding price.

Figure 38:
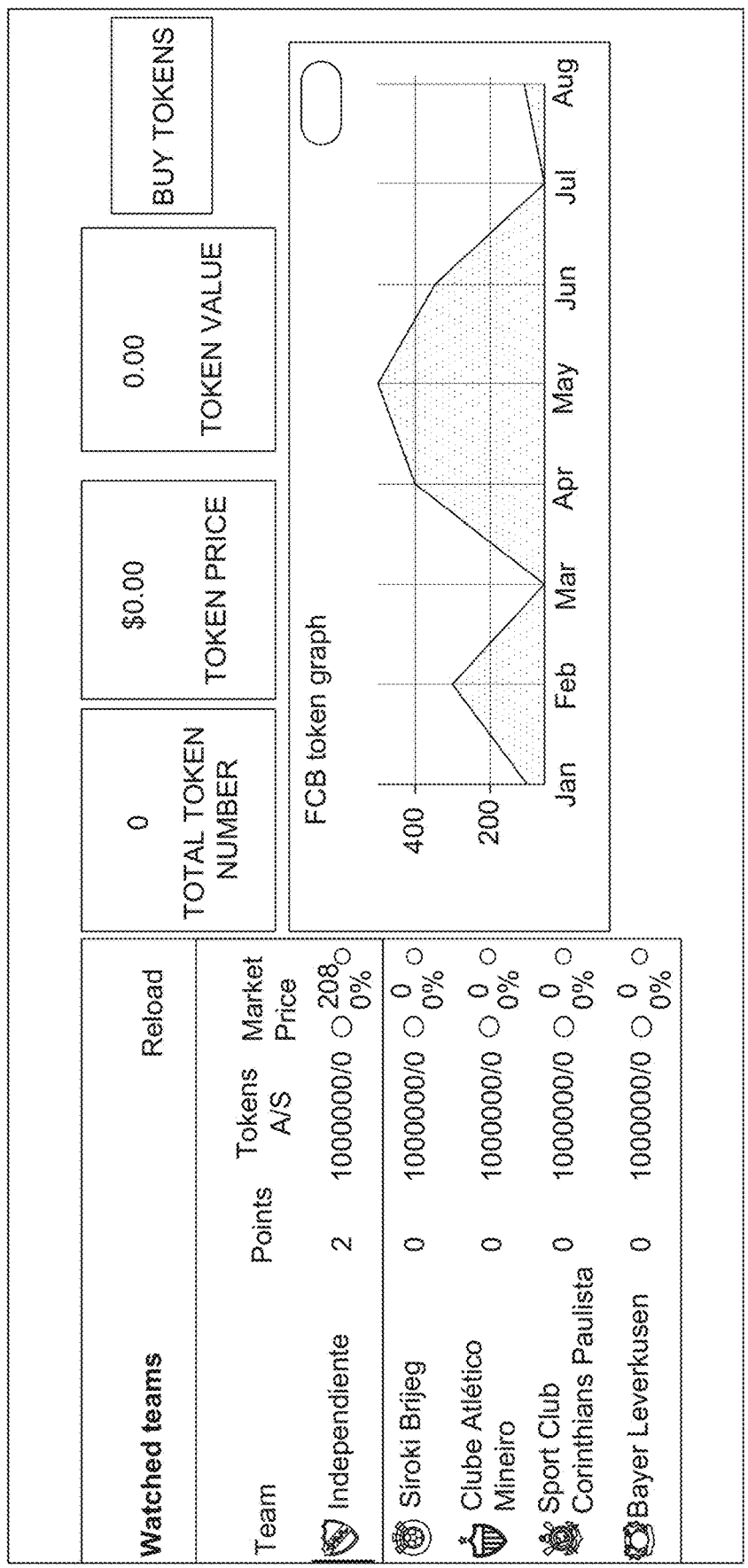
FIG. 38 shows a watched team display portion of the system according to some embodiments.
Figure 39:
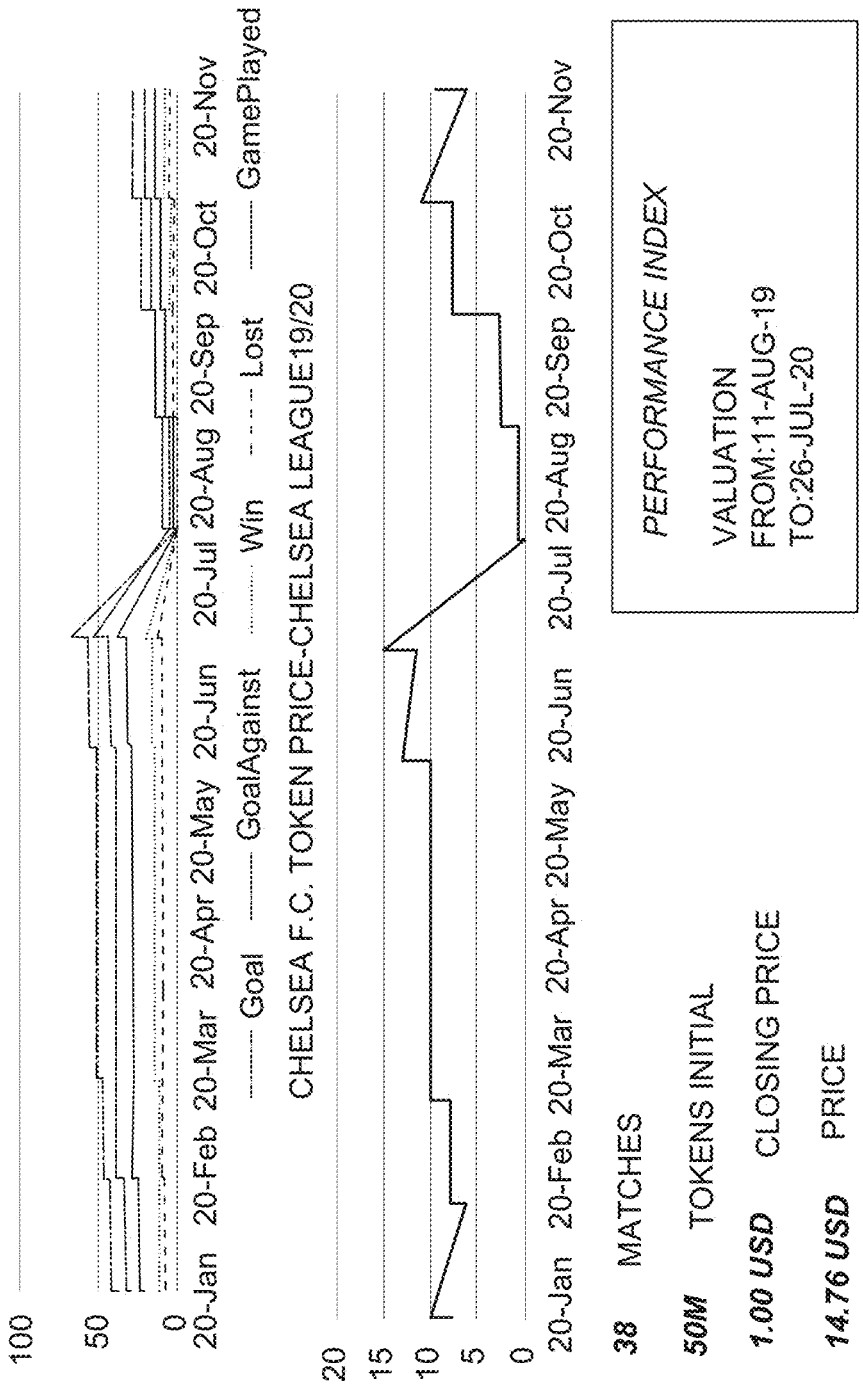
FIG. 39 shows a simulated performance index according to some embodiments.
Figure 40:
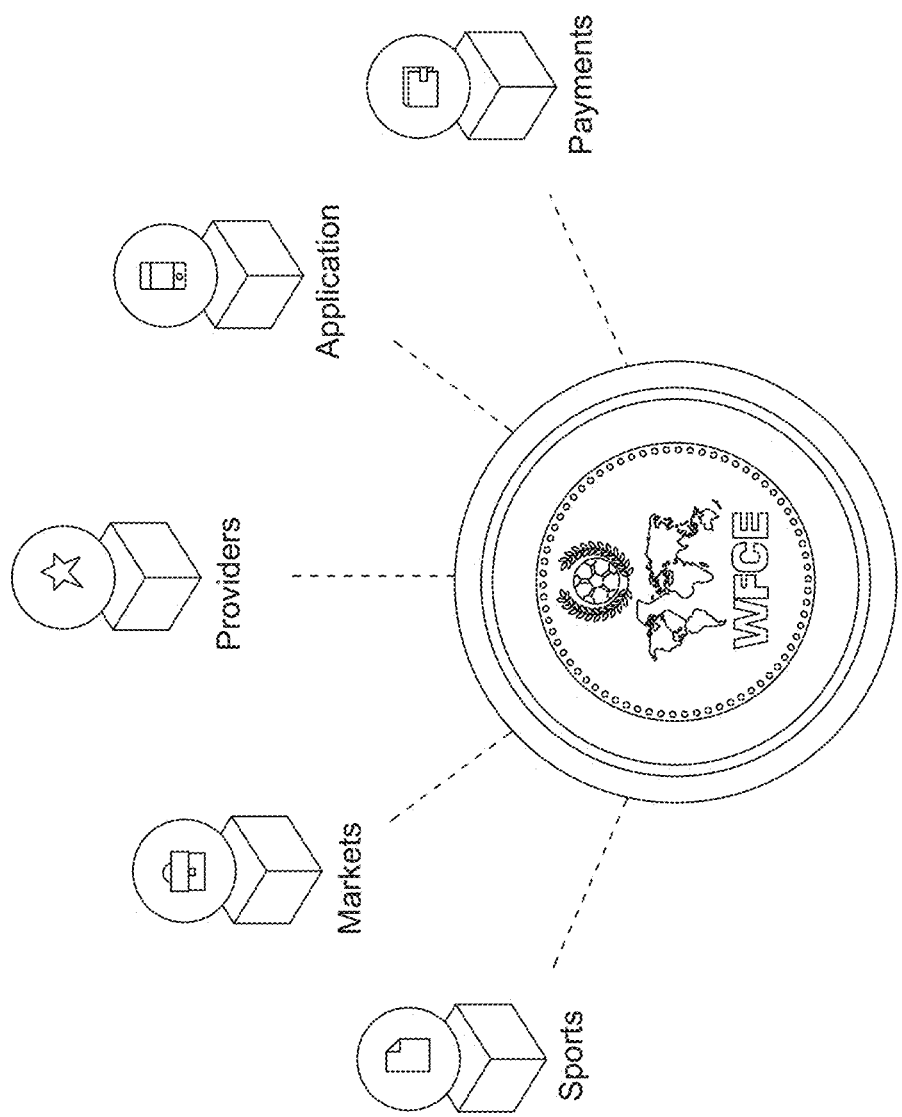
FIG. 40 shows a WSCE coin/token application diagram according to some embodiments.
Figure 46:
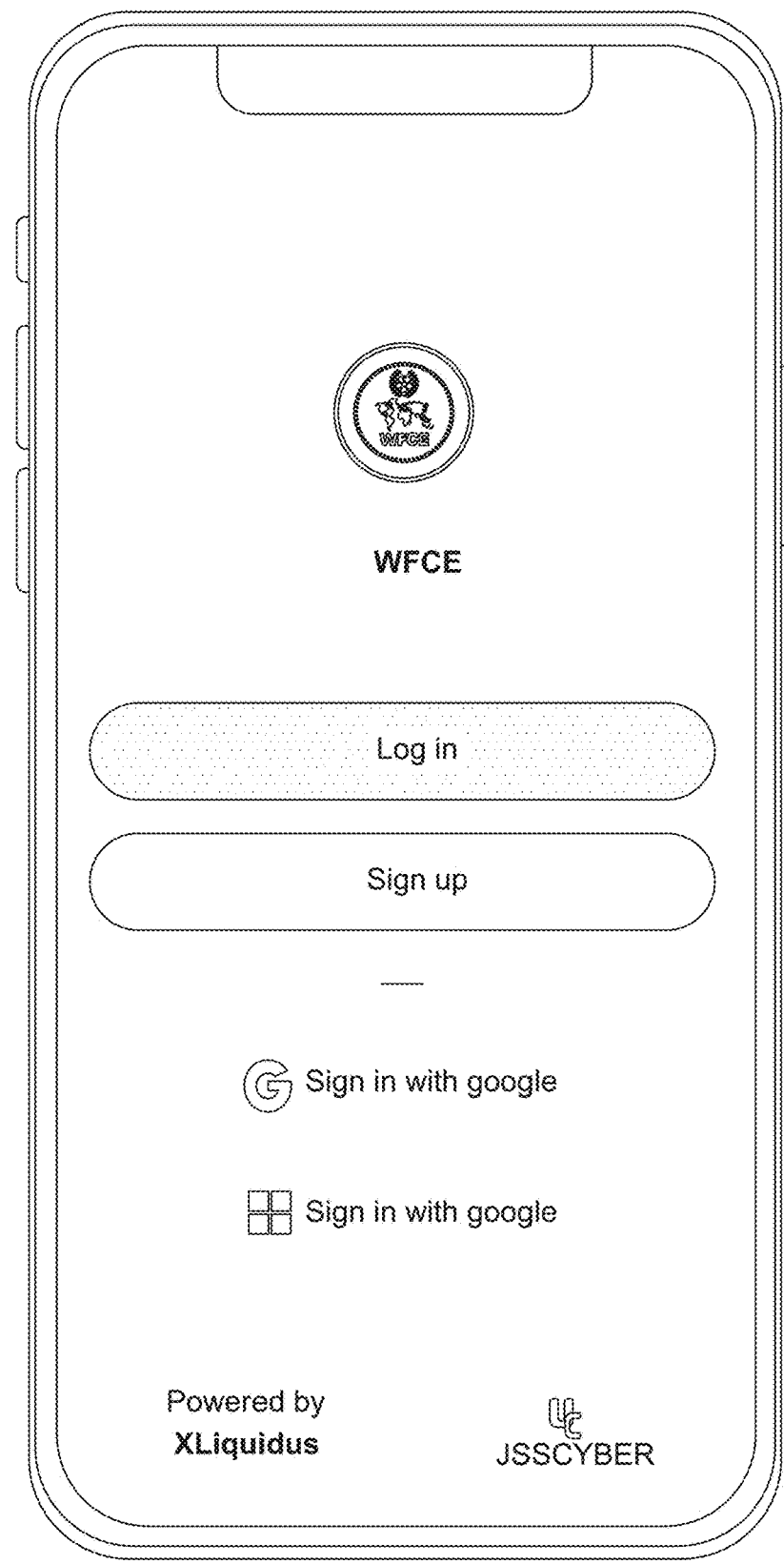
FIGS. 46-69 show various system mobile interfaces according to some embodiments.
Figure 47:
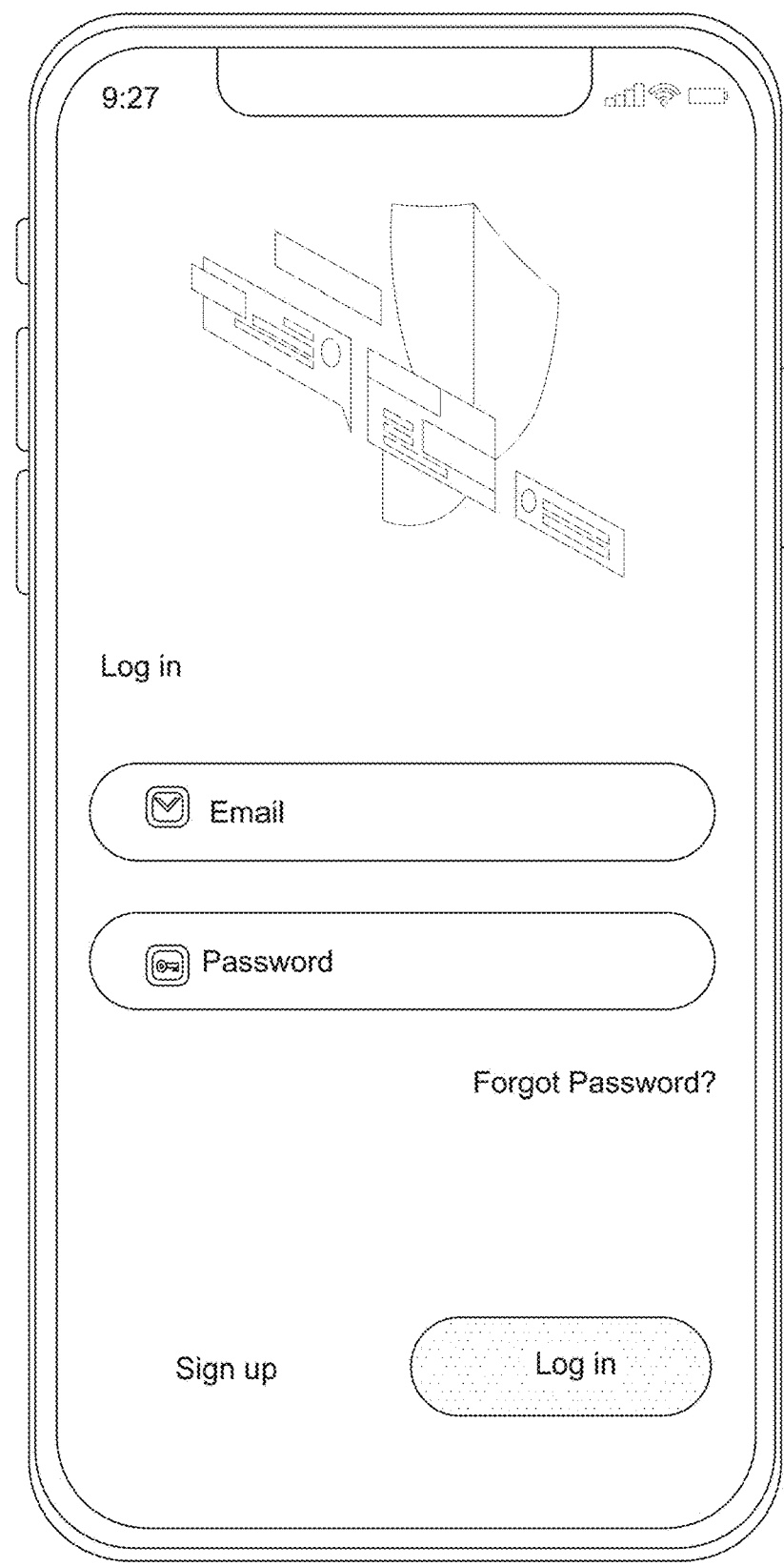
Figure 48:
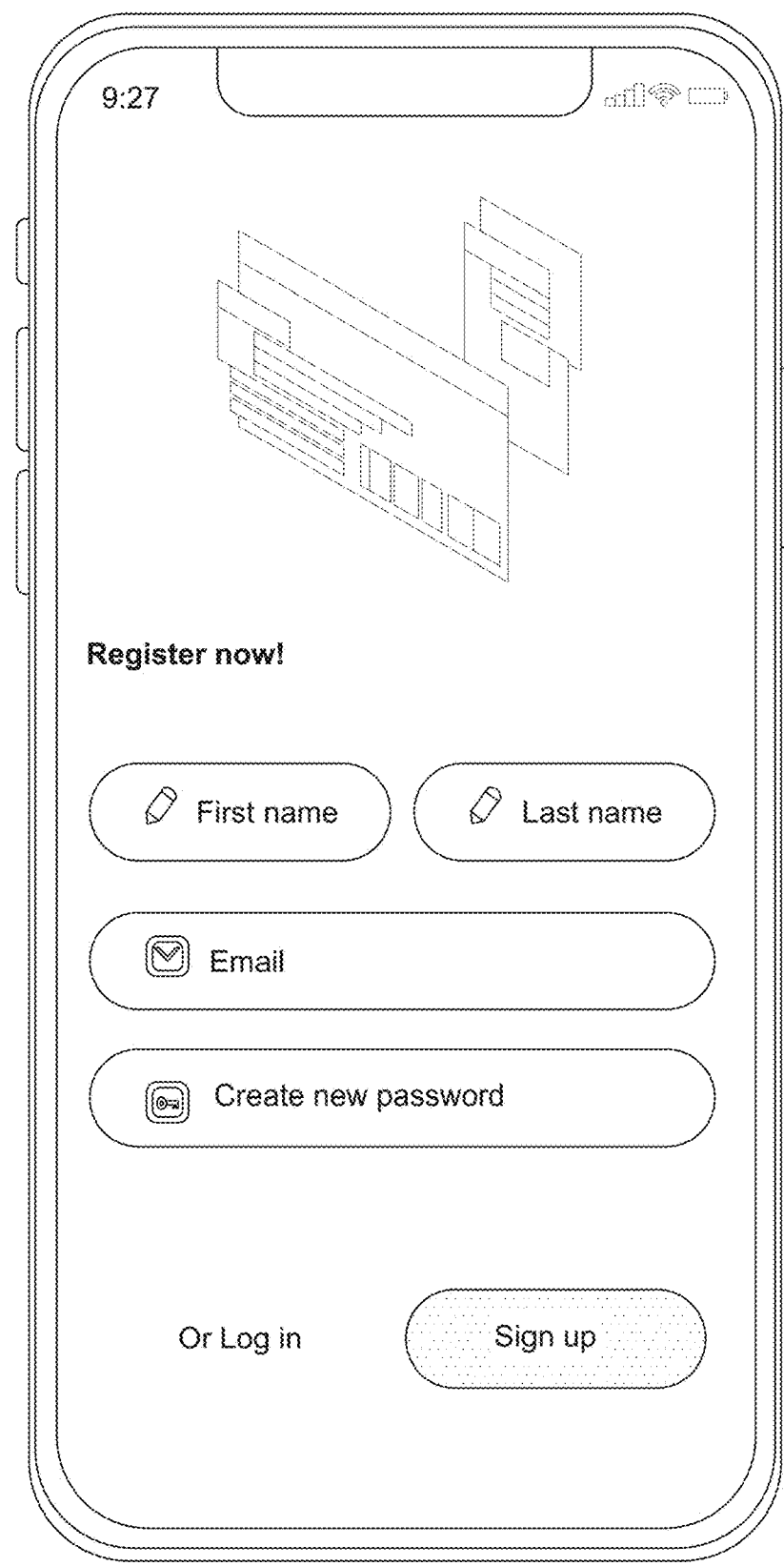
Figure 49:
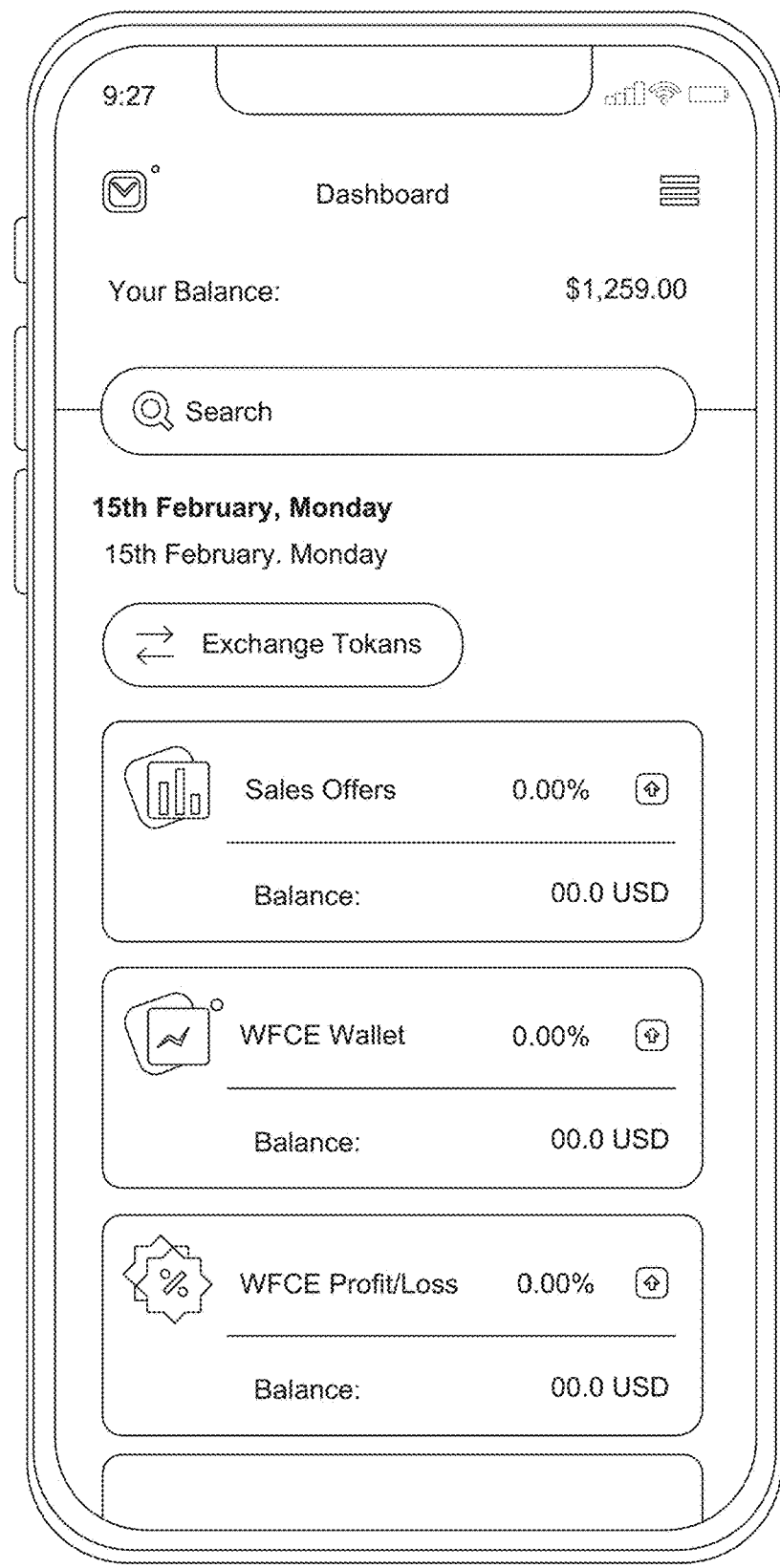
Figure 50:
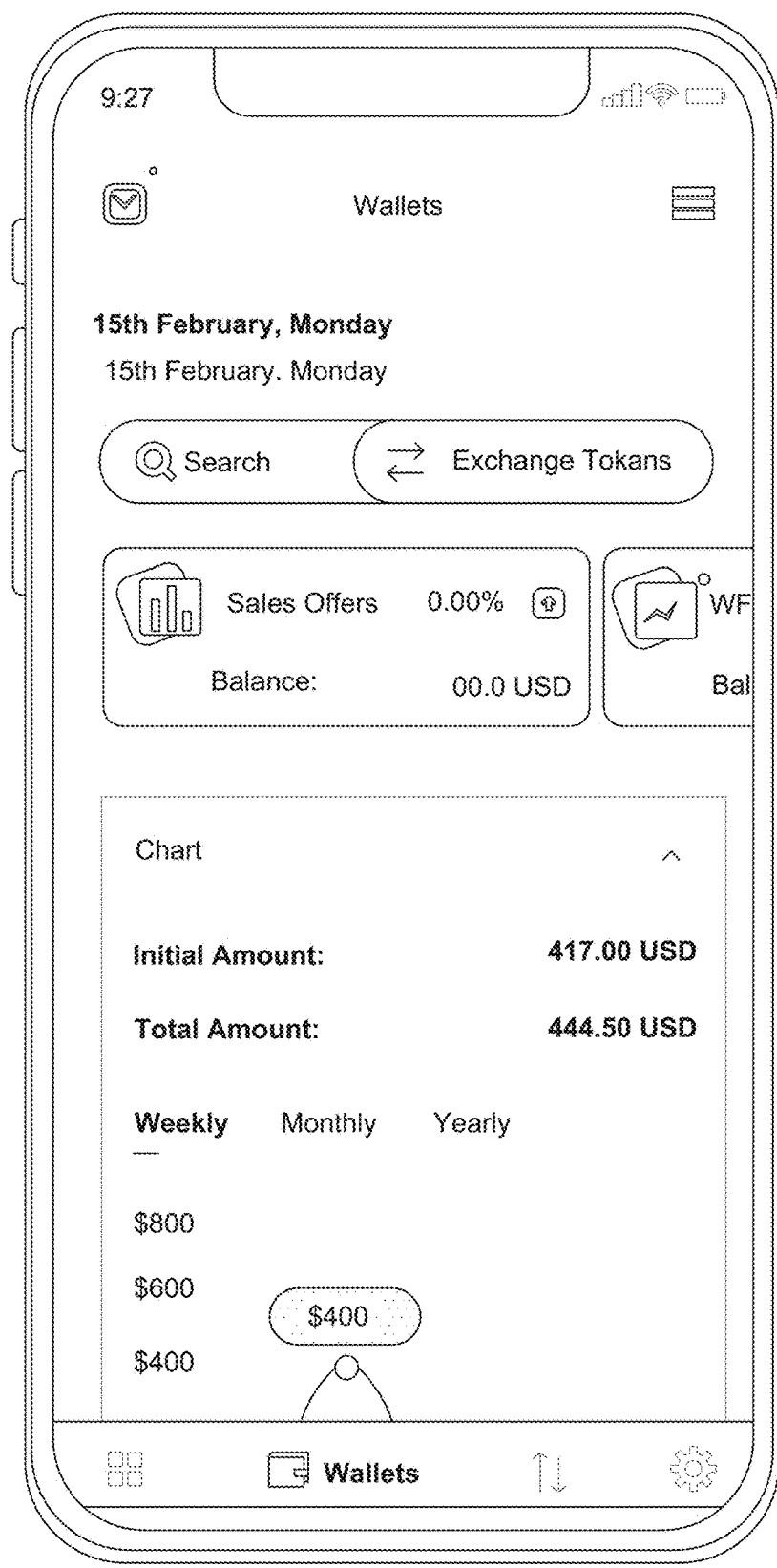
Figure 51:
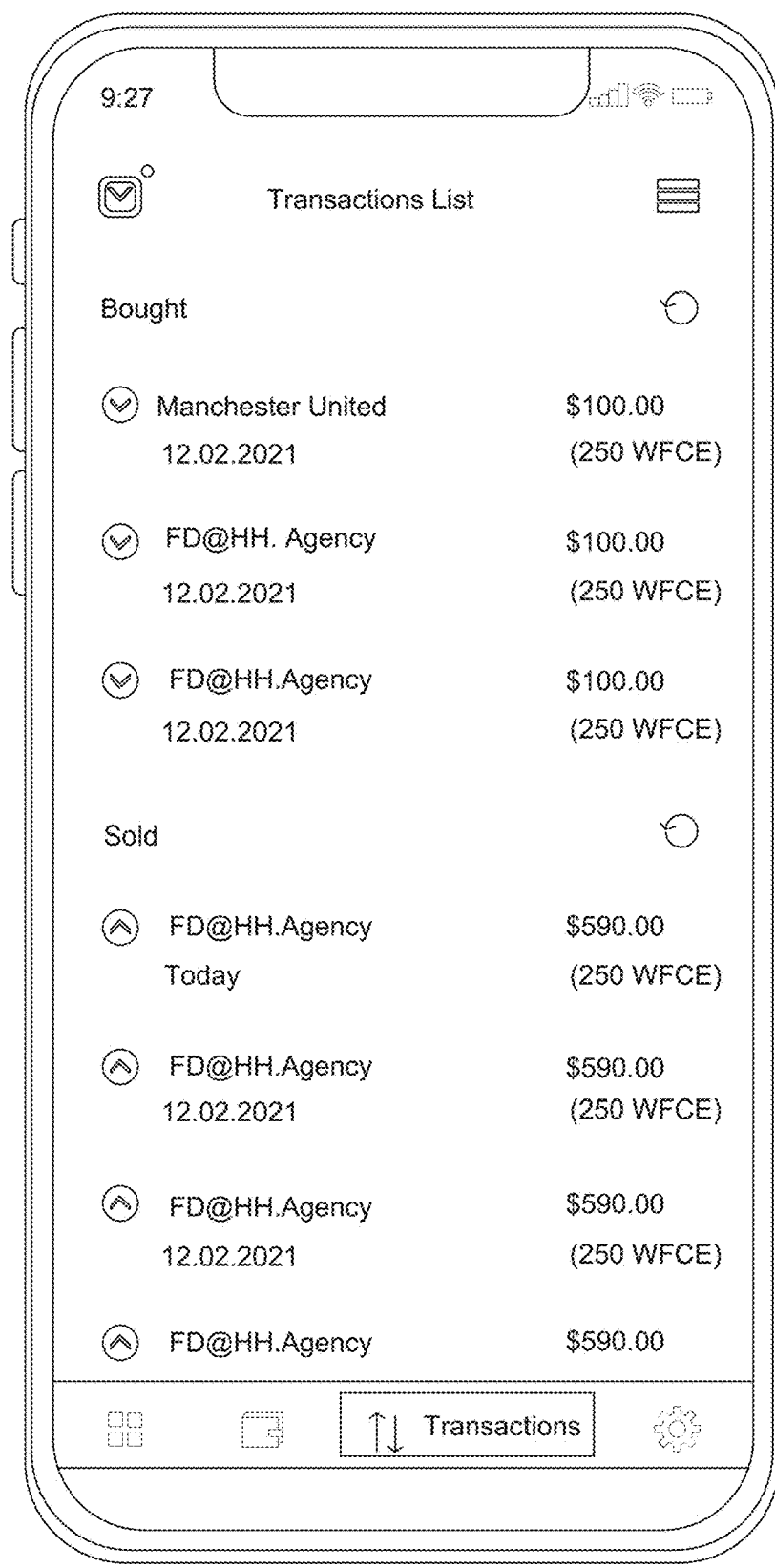
Figure 52:
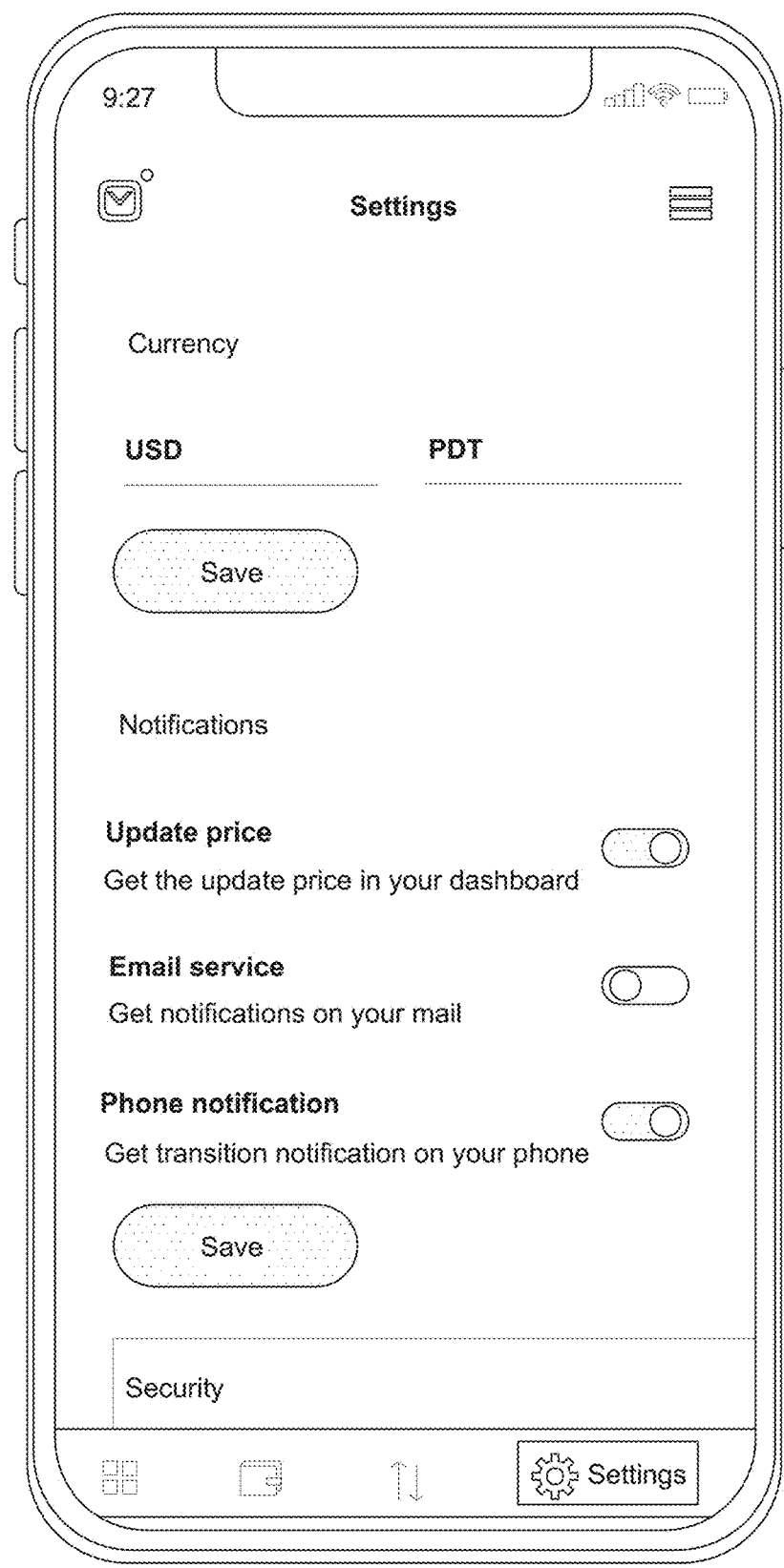
Figure 53:
Figure 54:
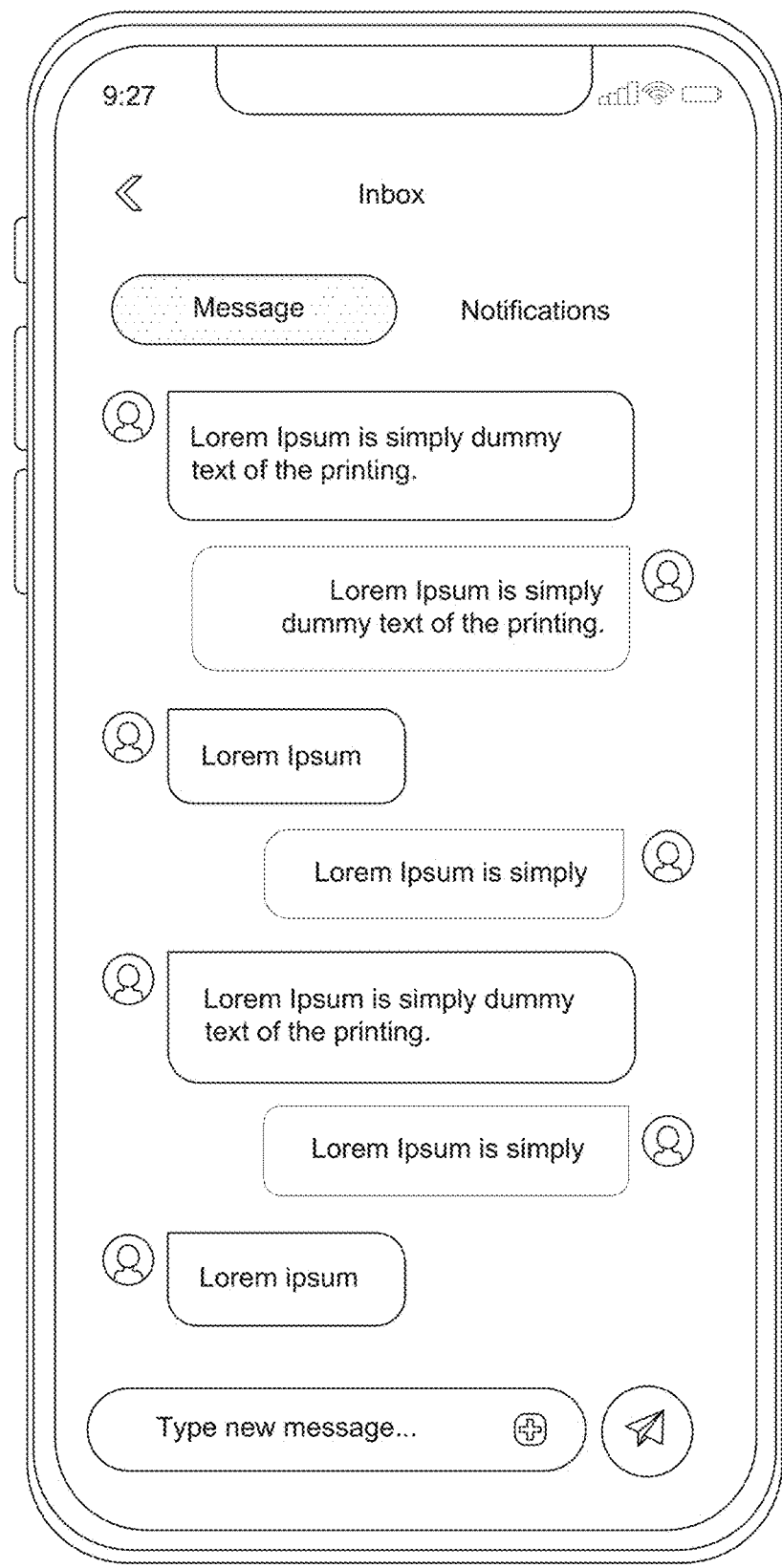
Figure 55:
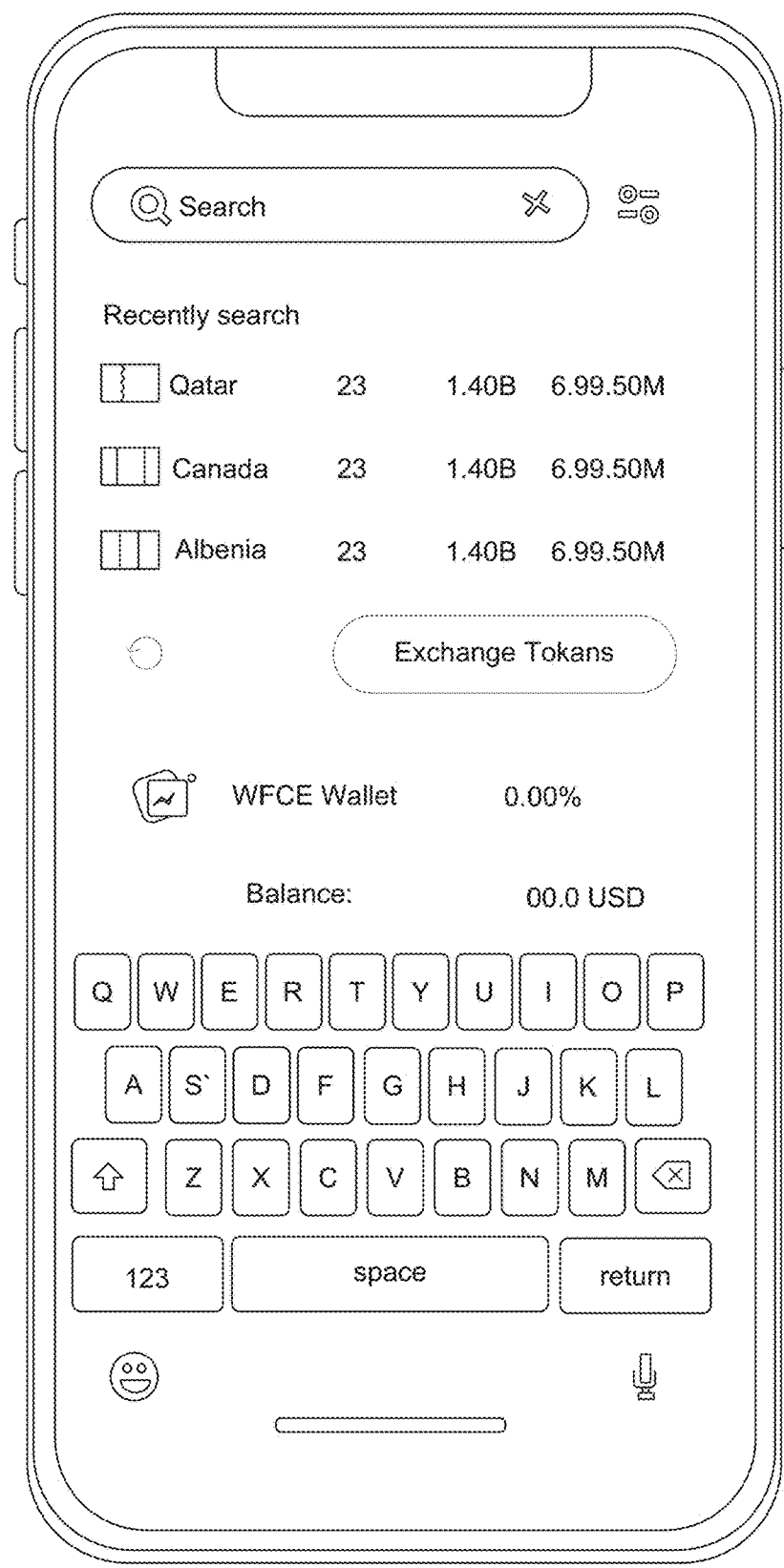
Figure 56:
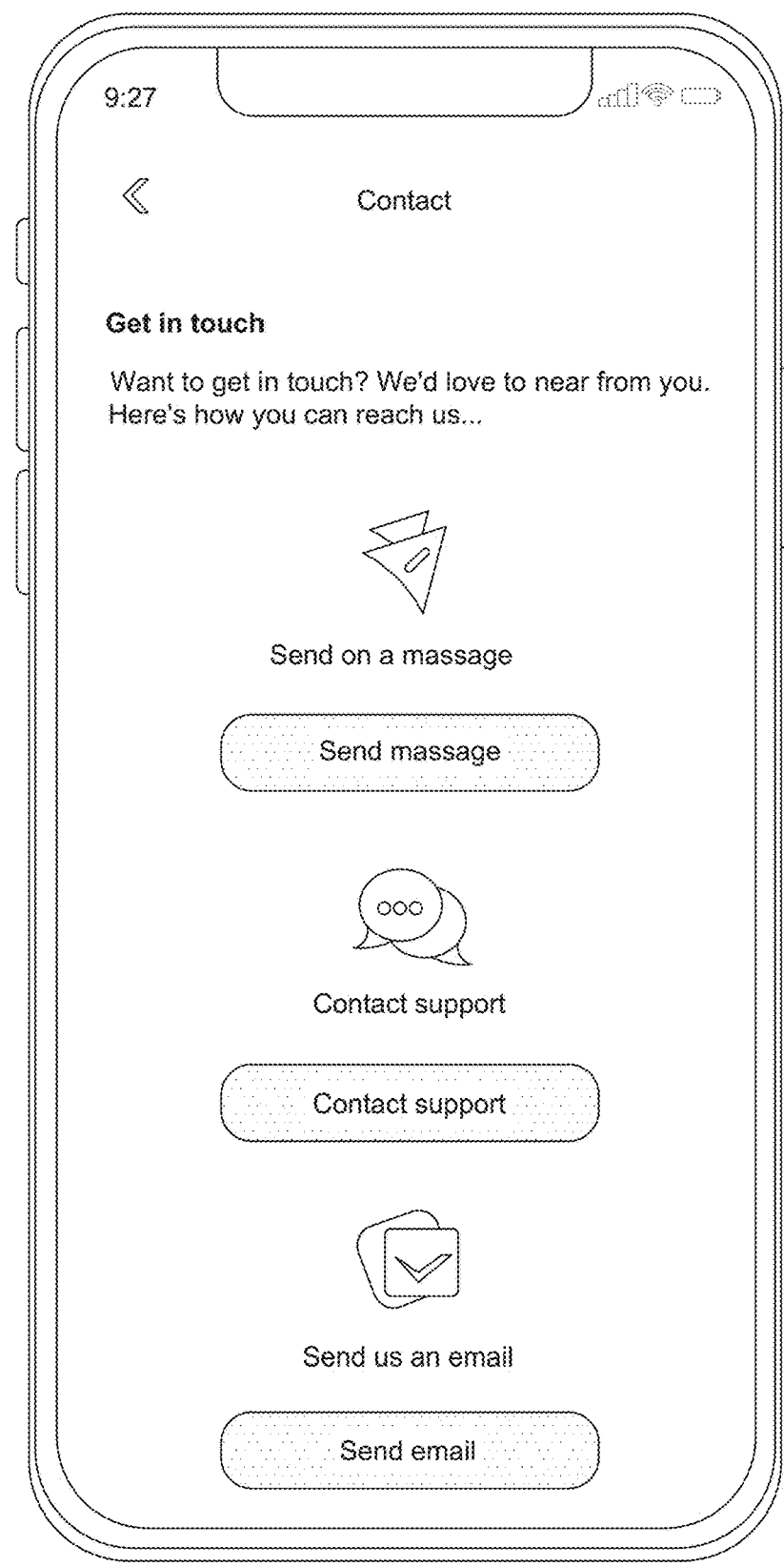
Figure 57:
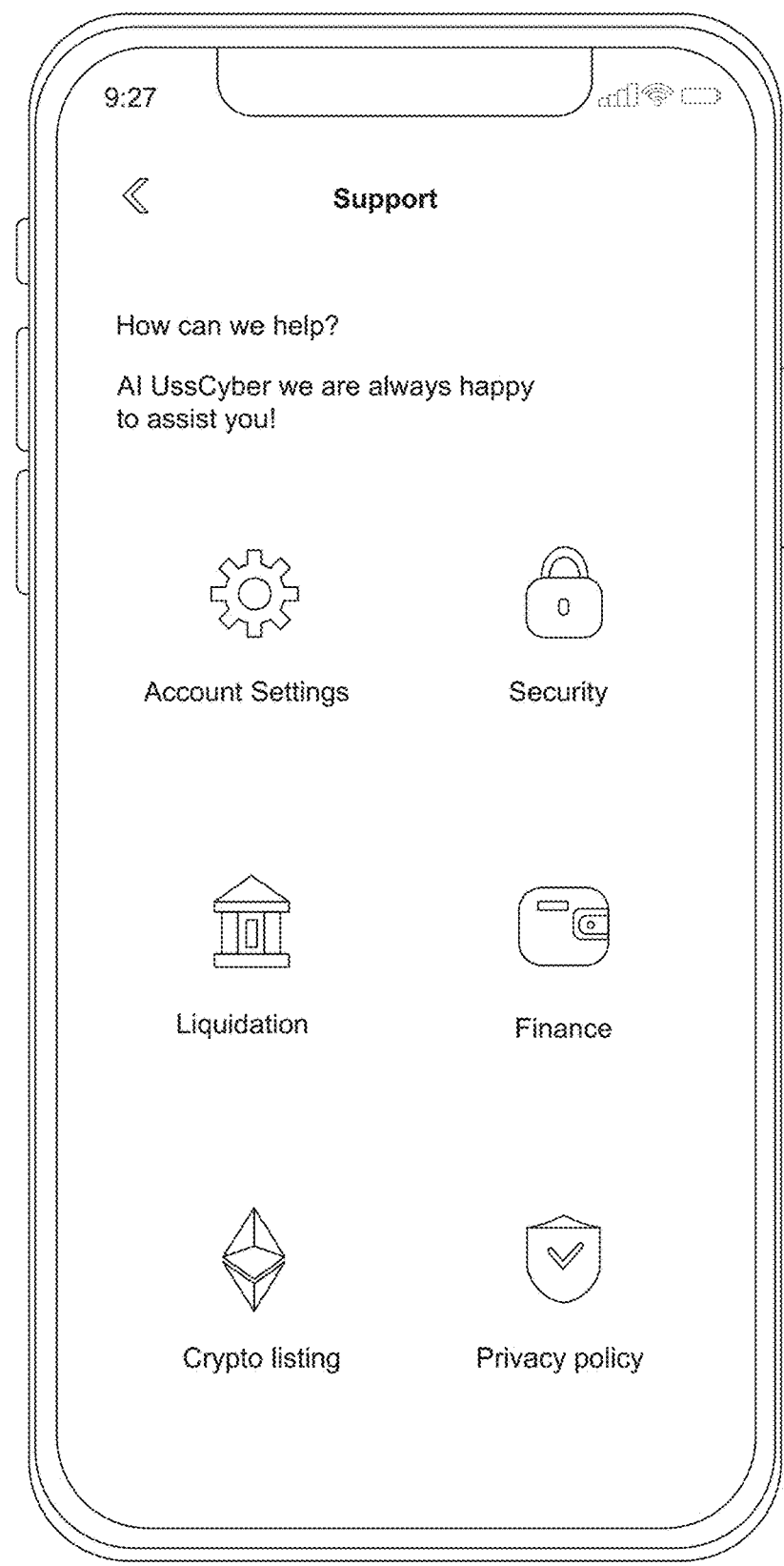
Figure 58:
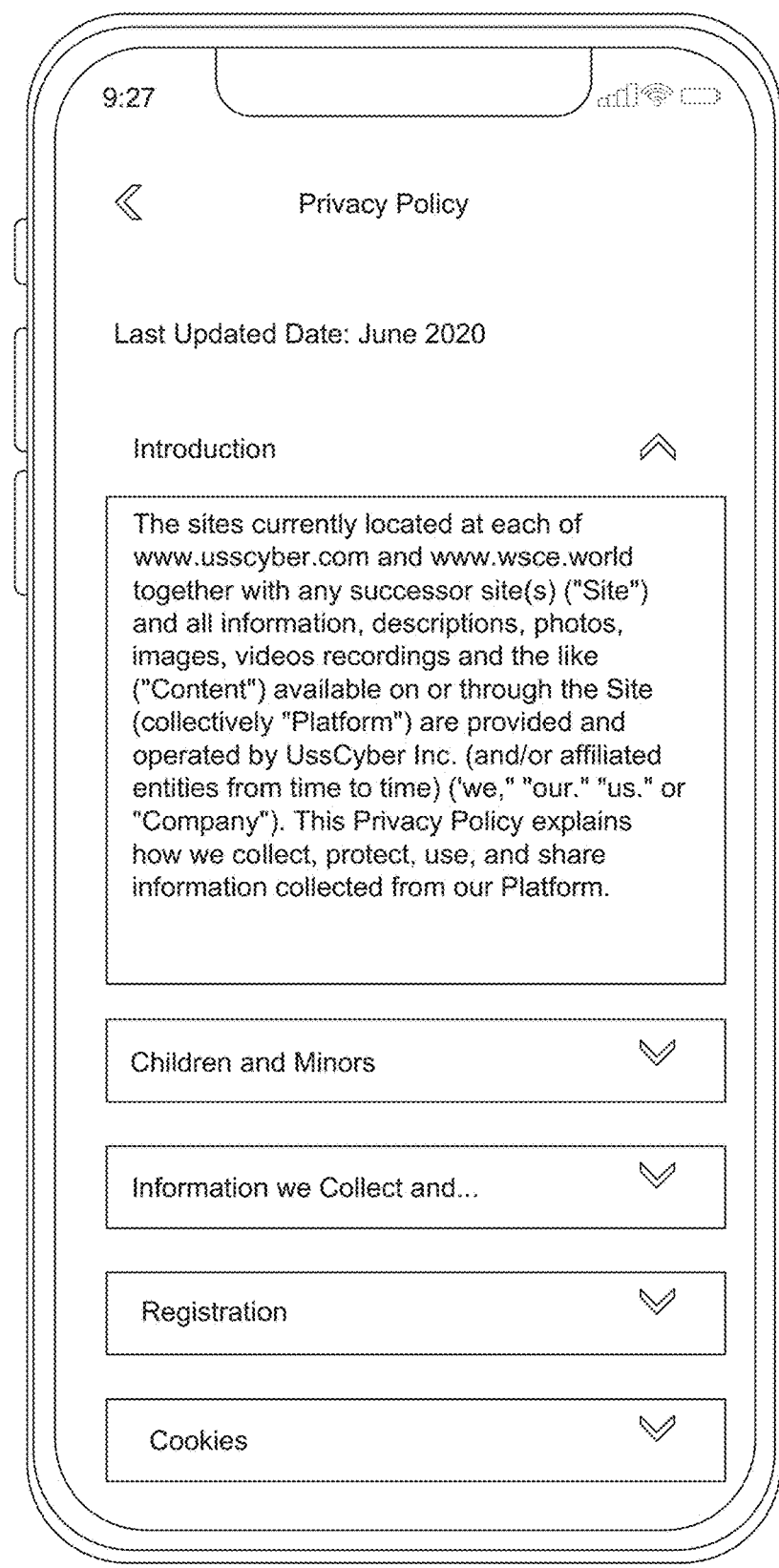
Figure 59:
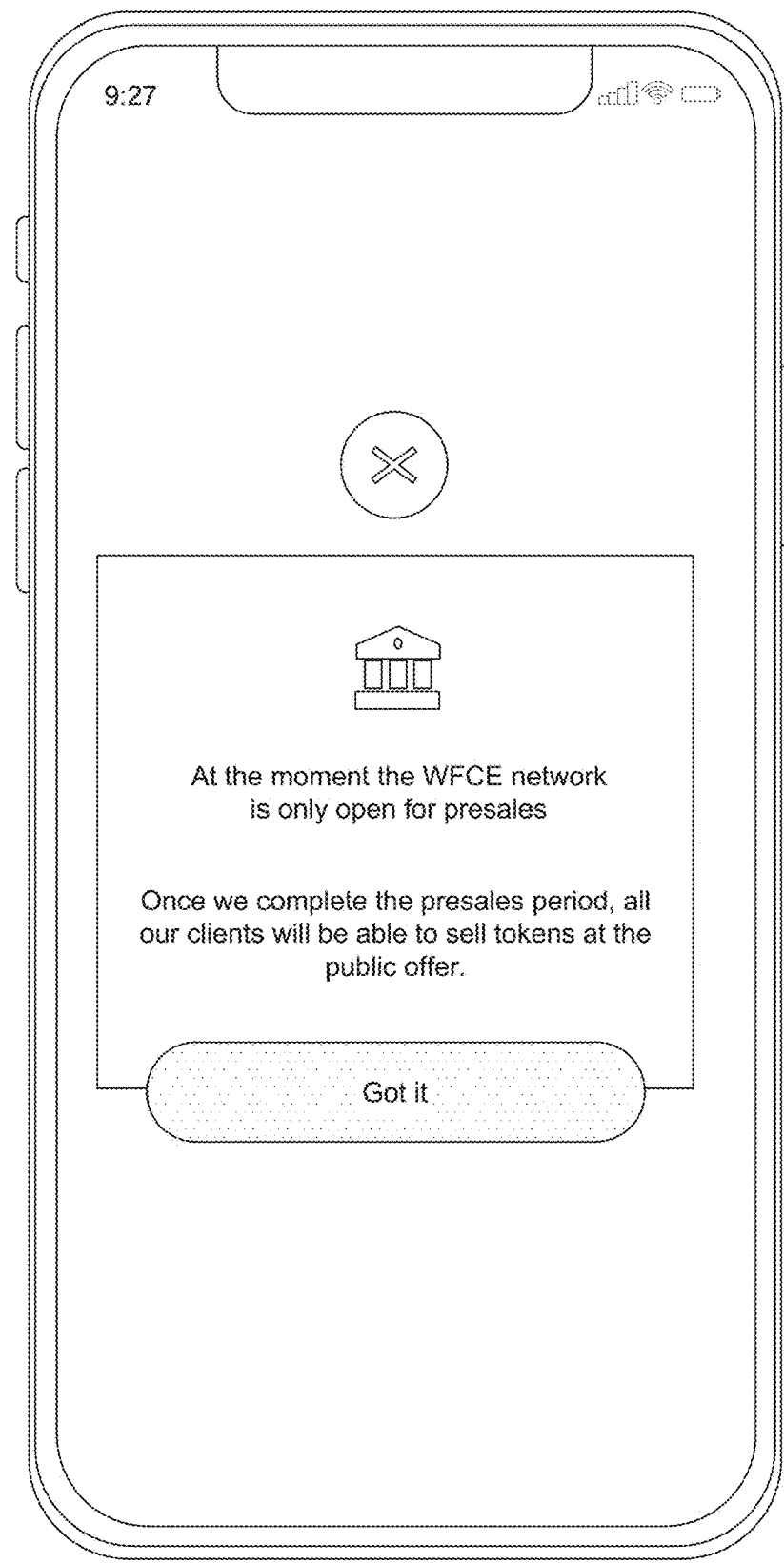
Figure 60:
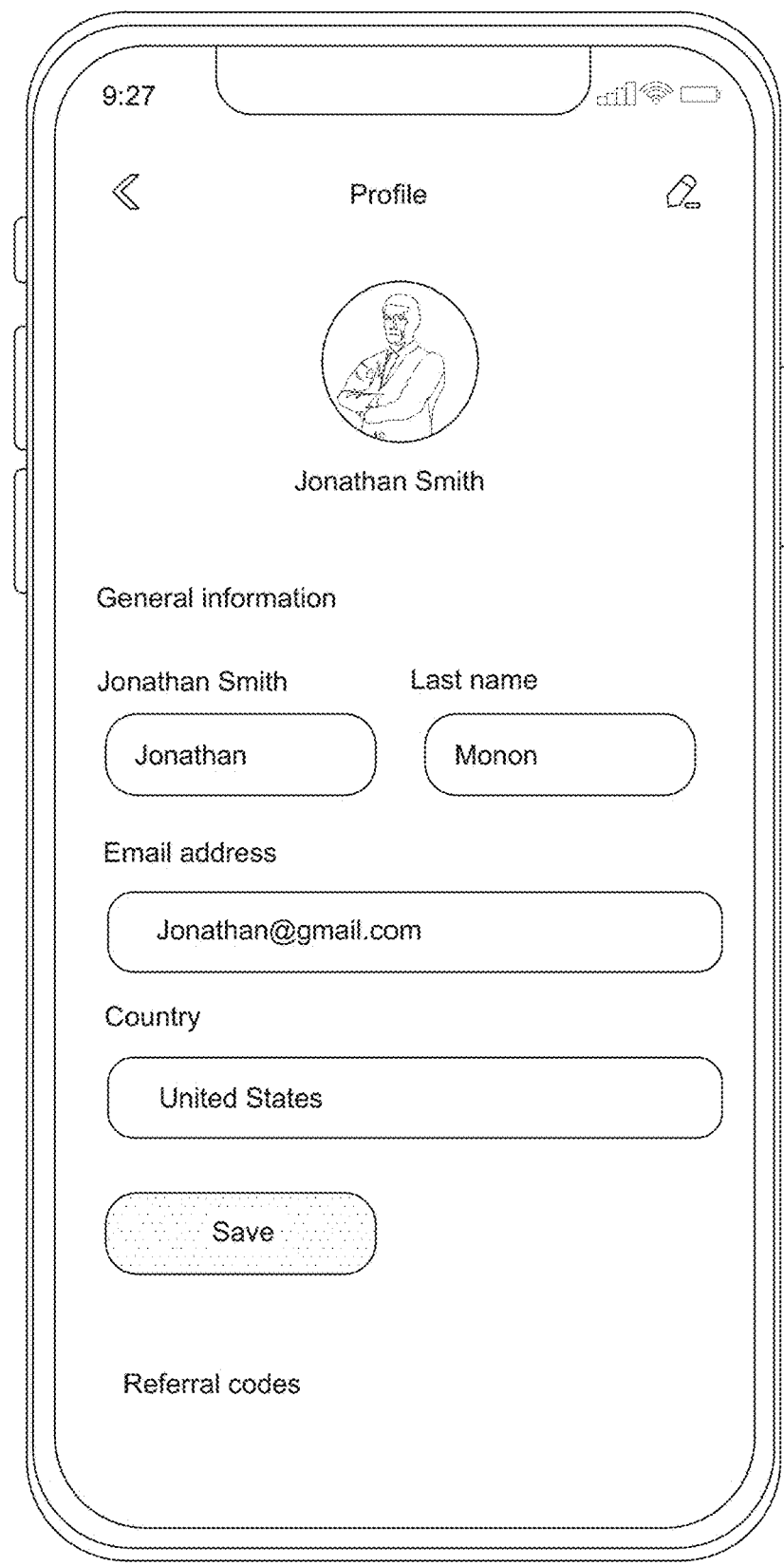
Figure 61:
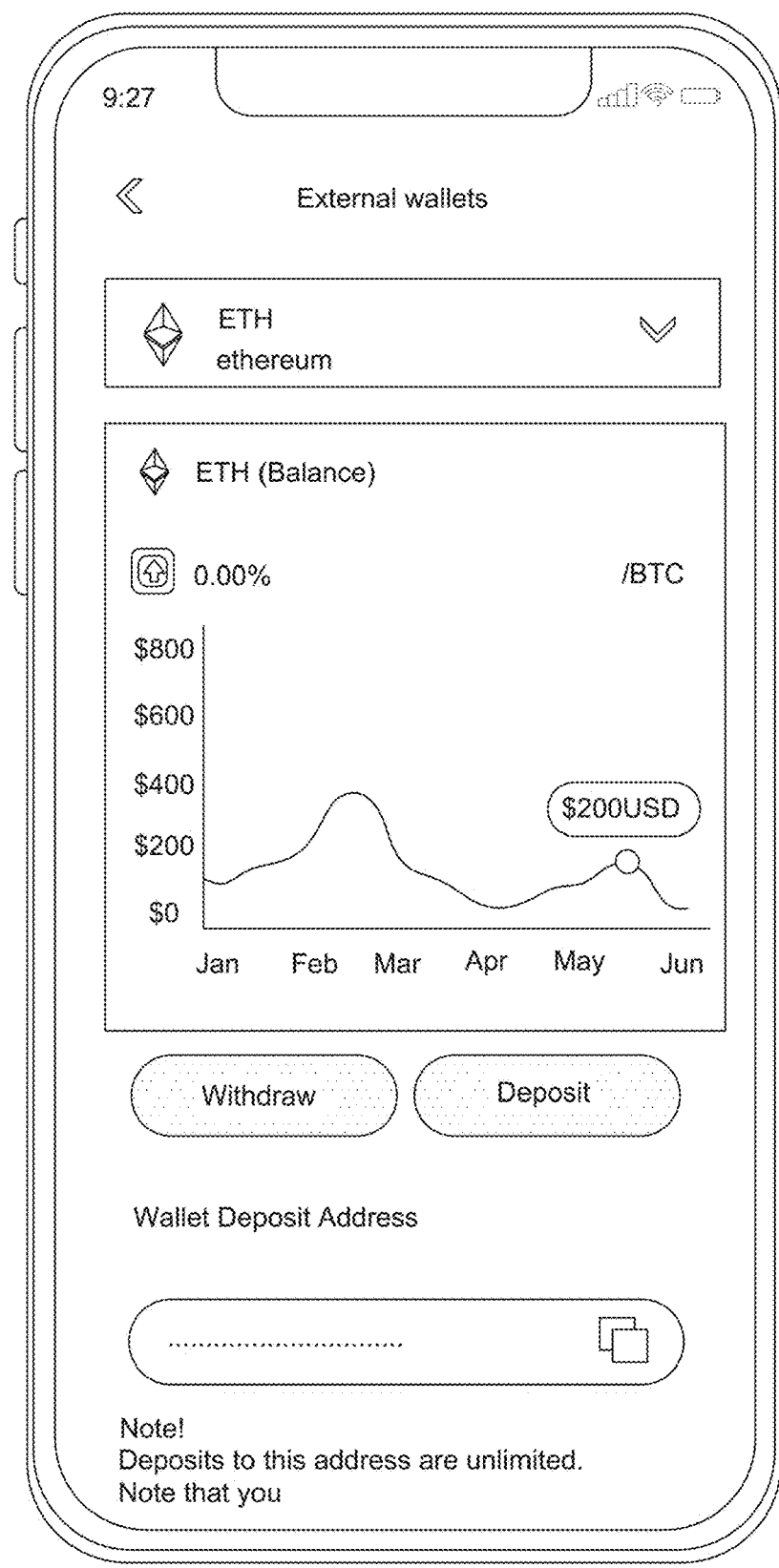
Figure 62:
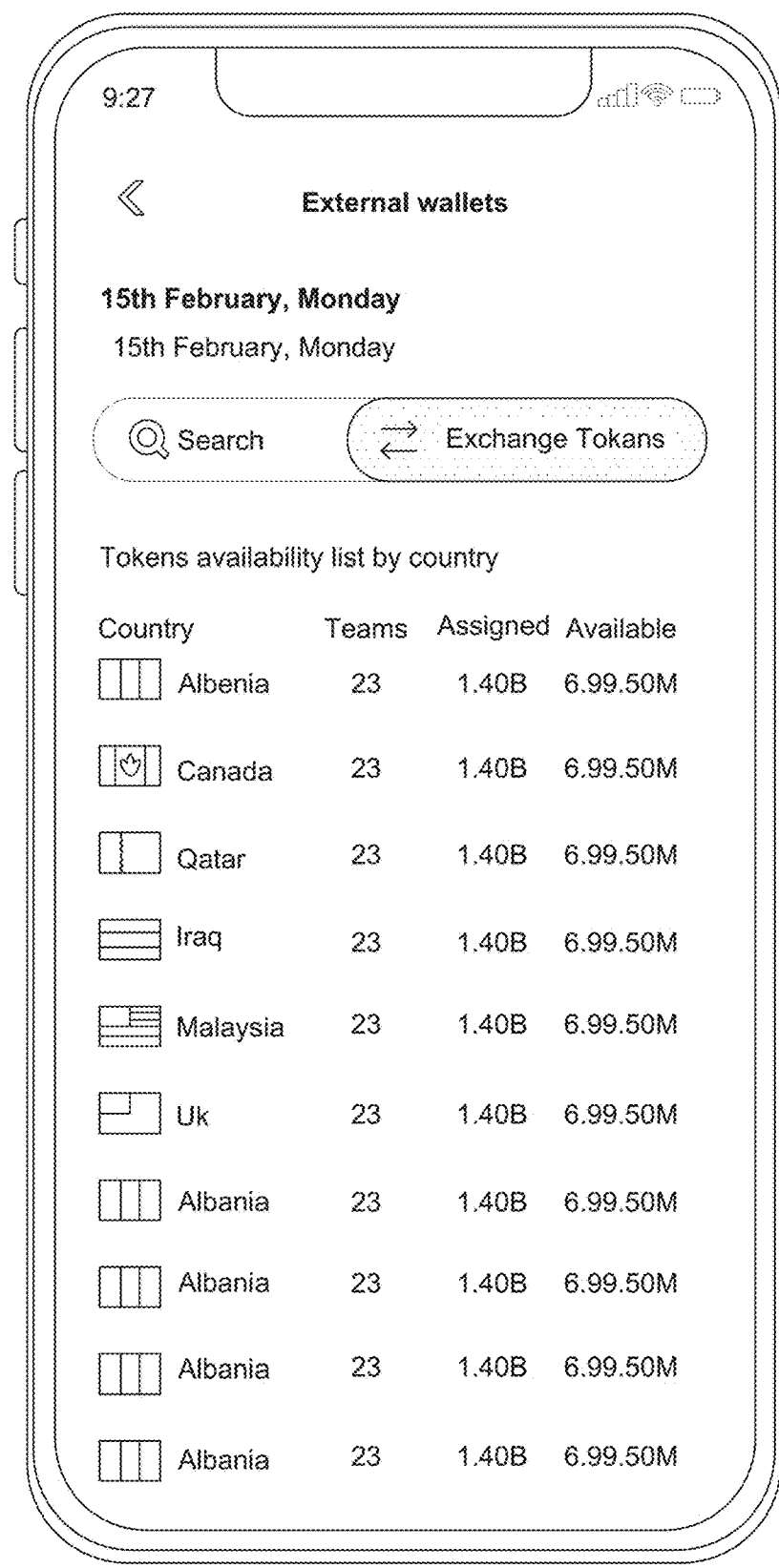
Figure 63:
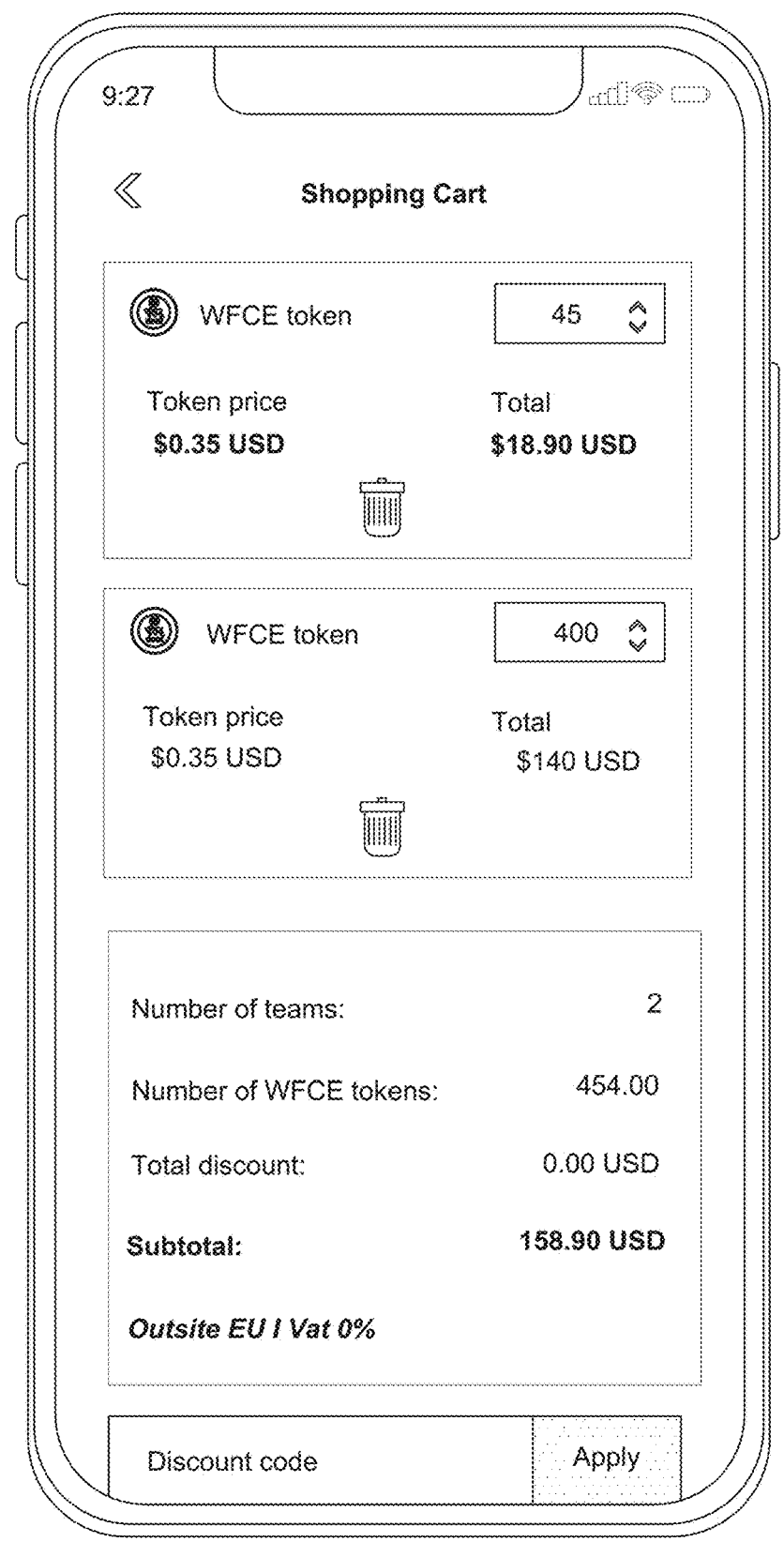
Figure 64:
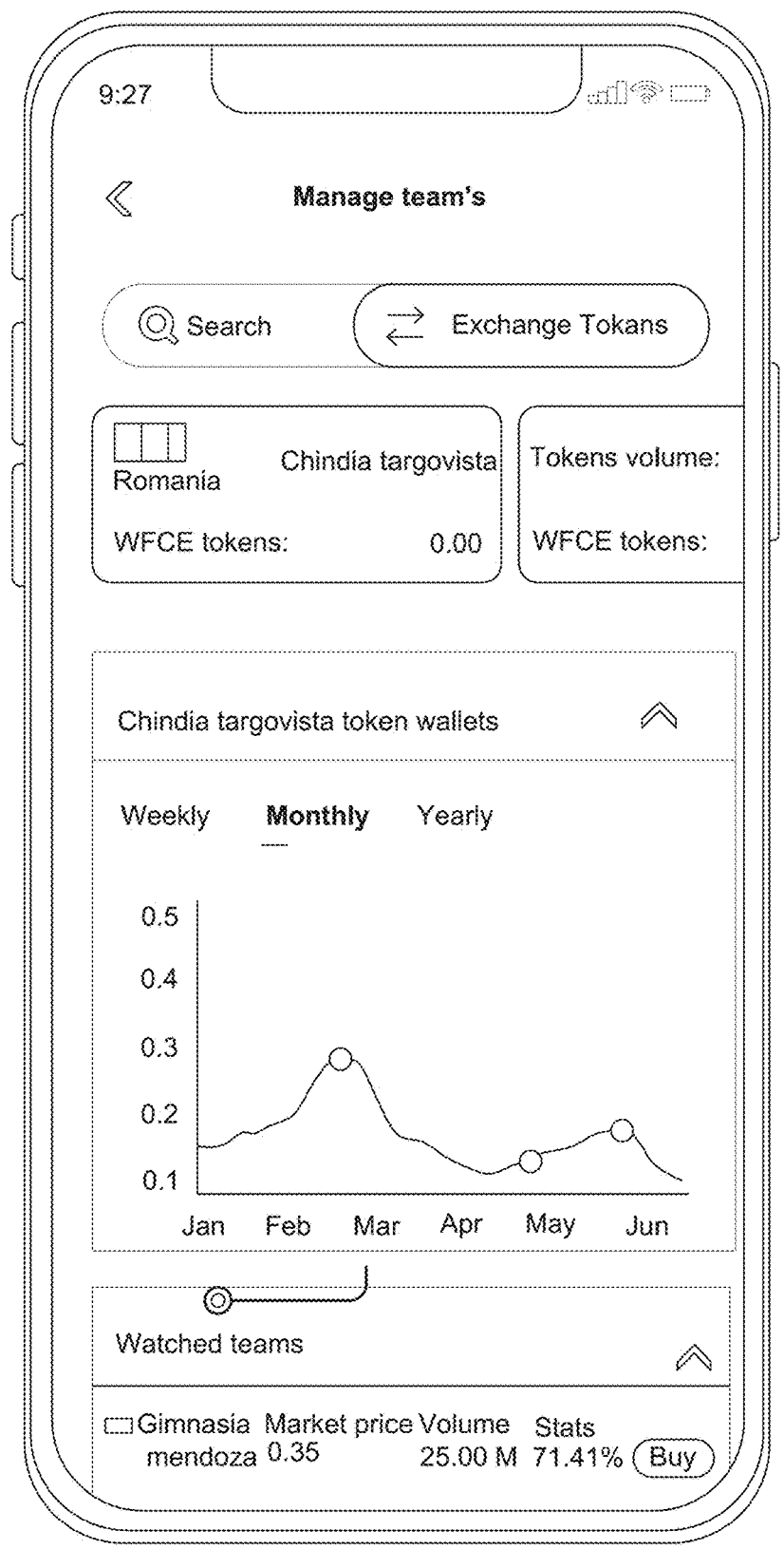
Figure 65:
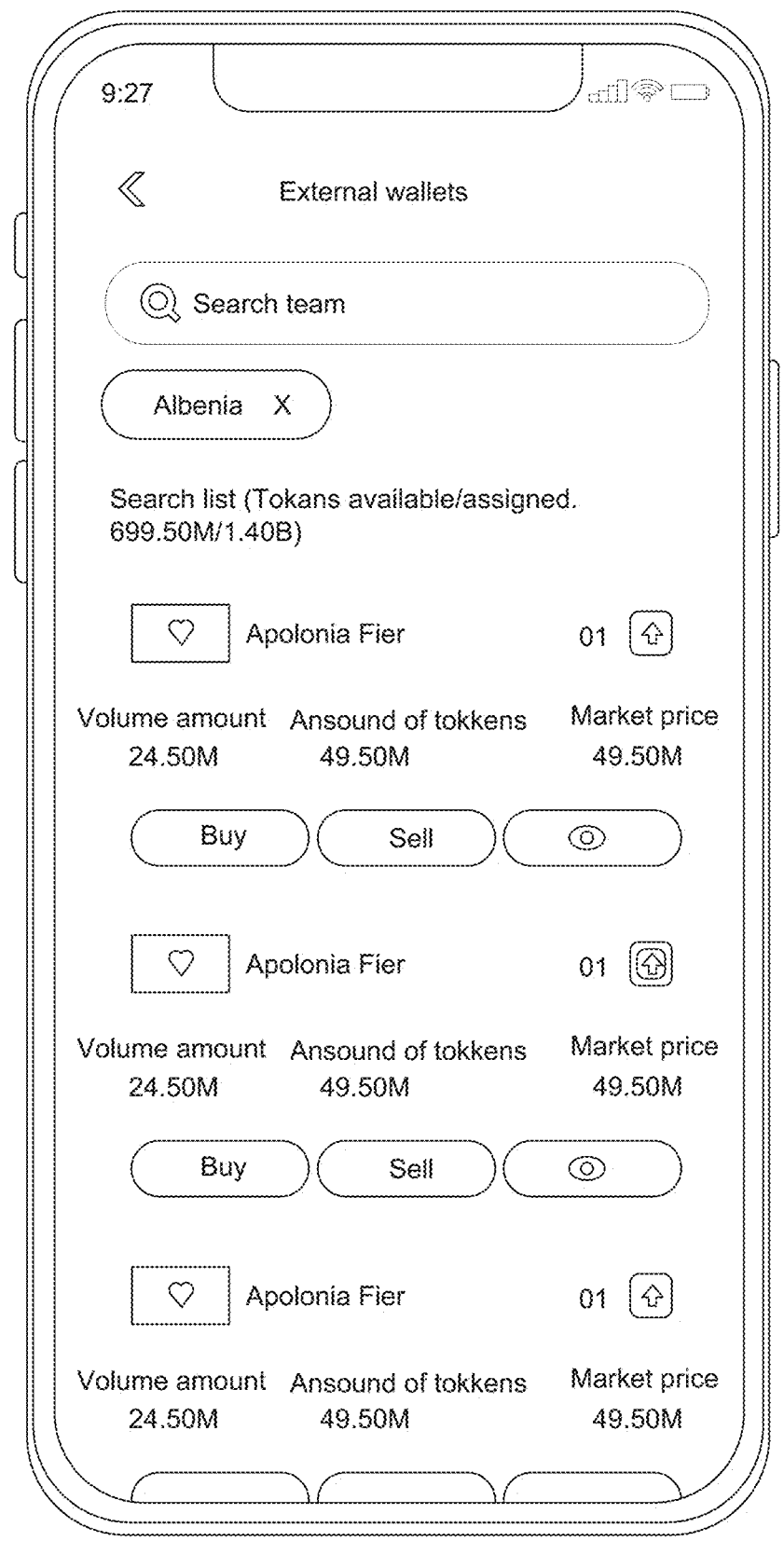
Figure 66:
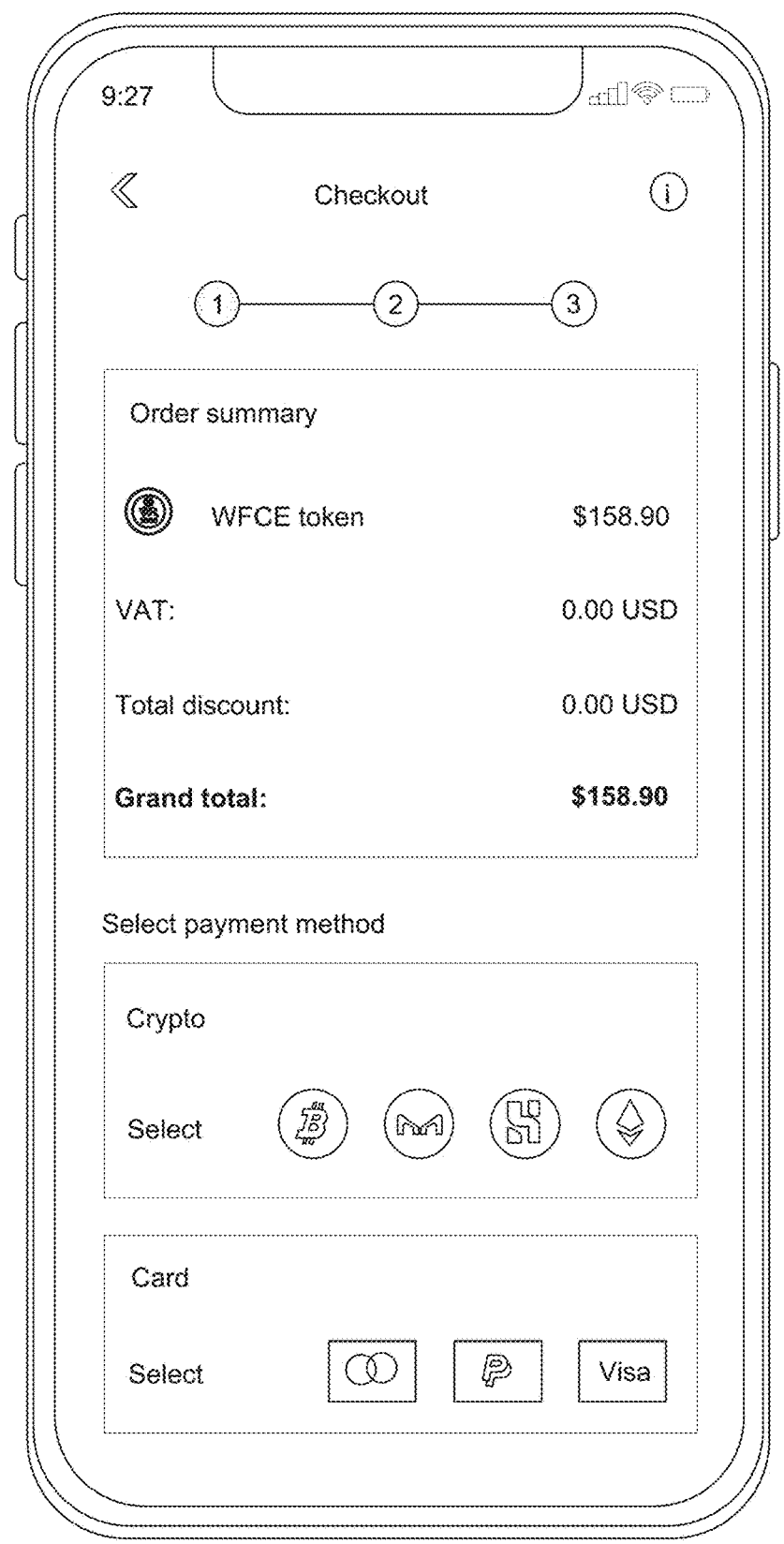
Figure 67:
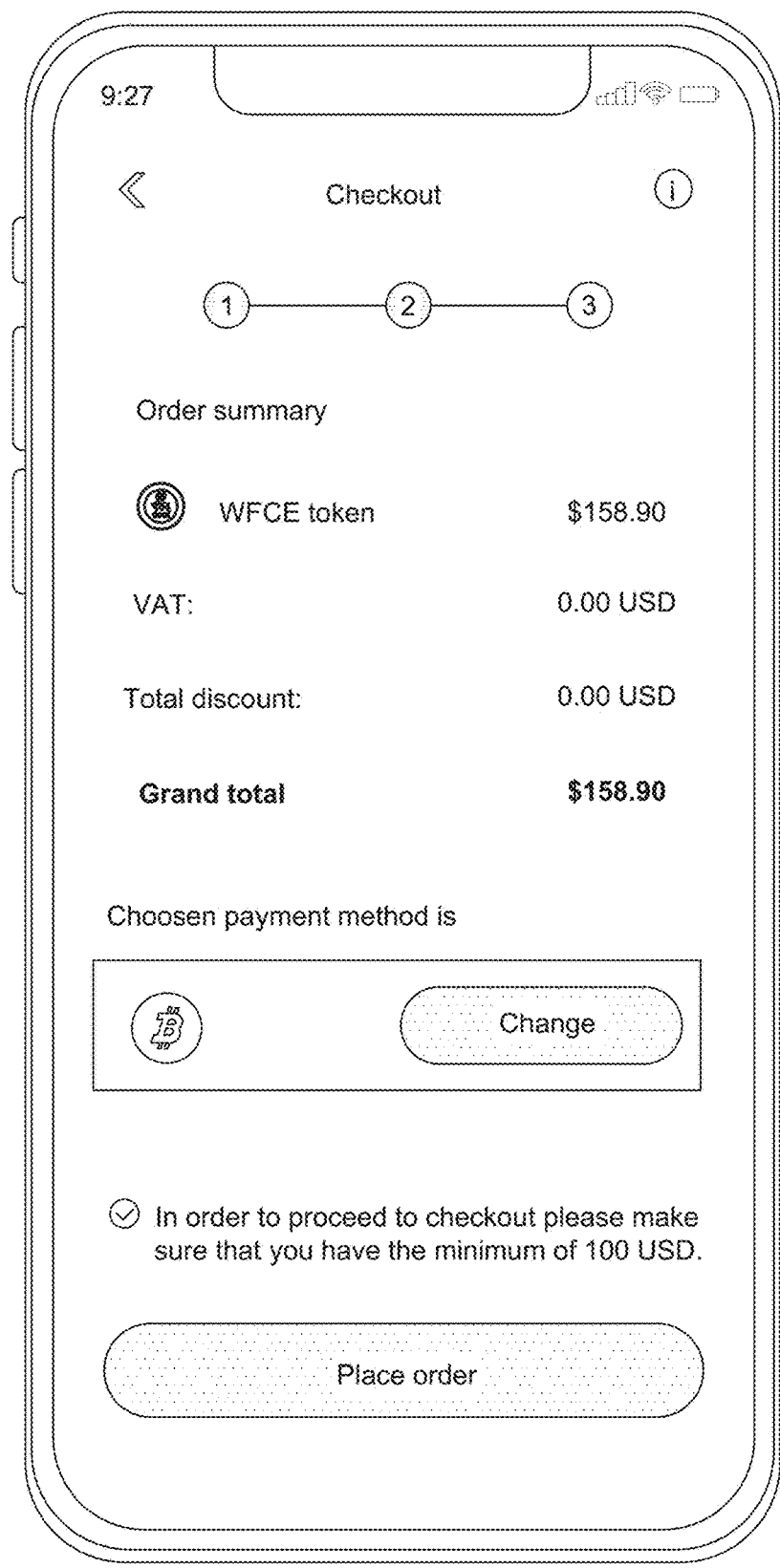
Figure 68:
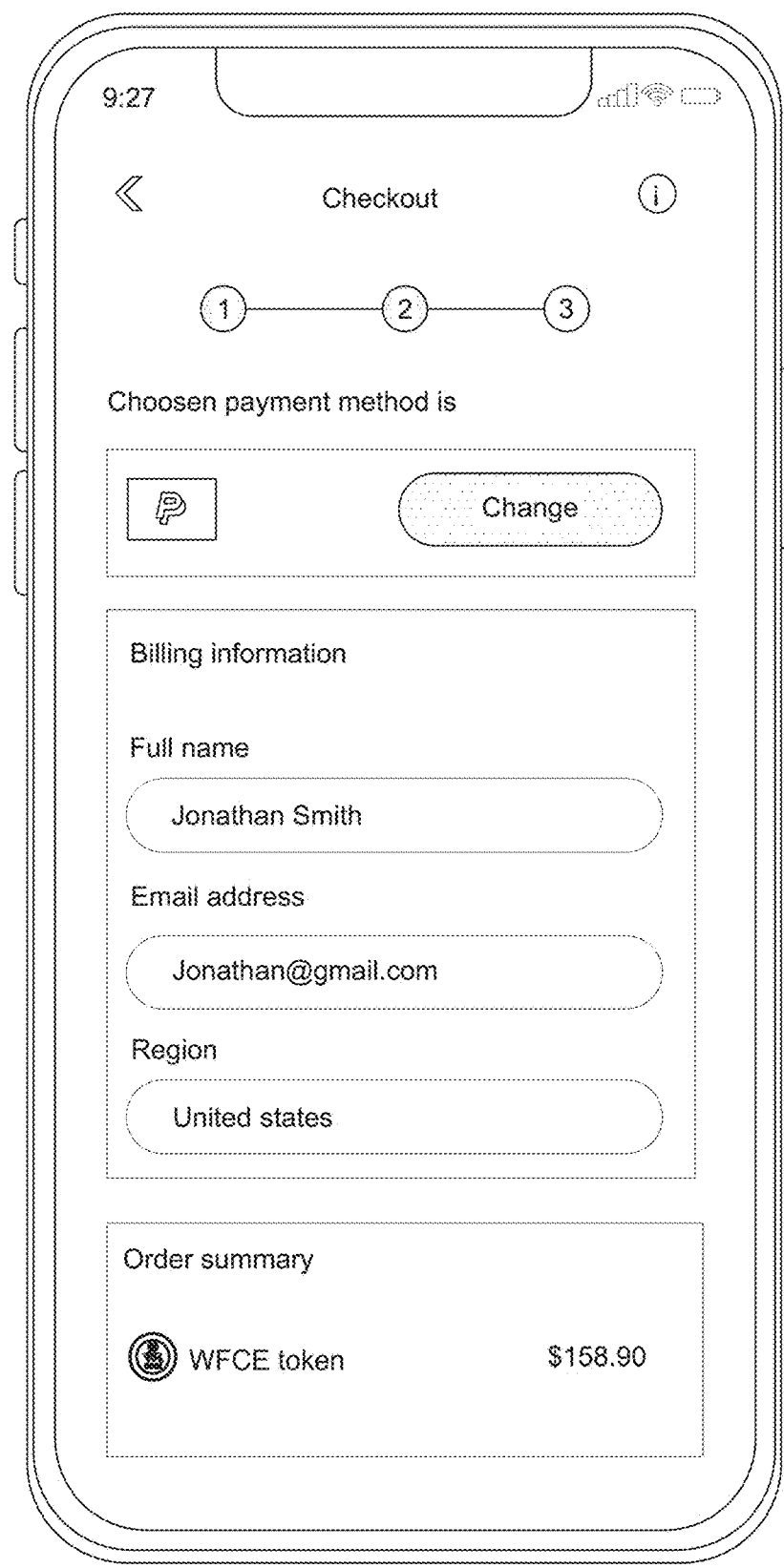
Figure 69:
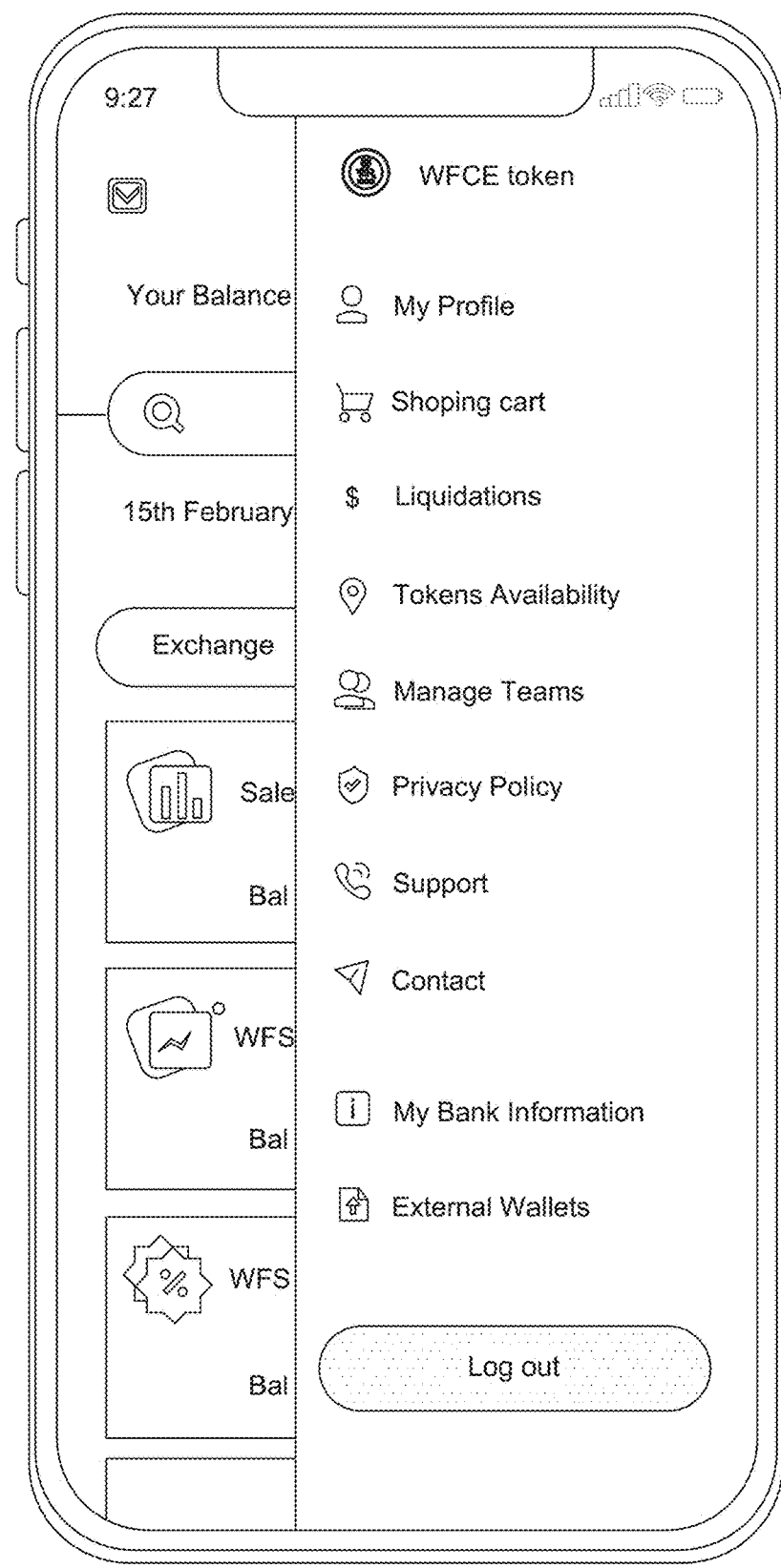
Figure 70:
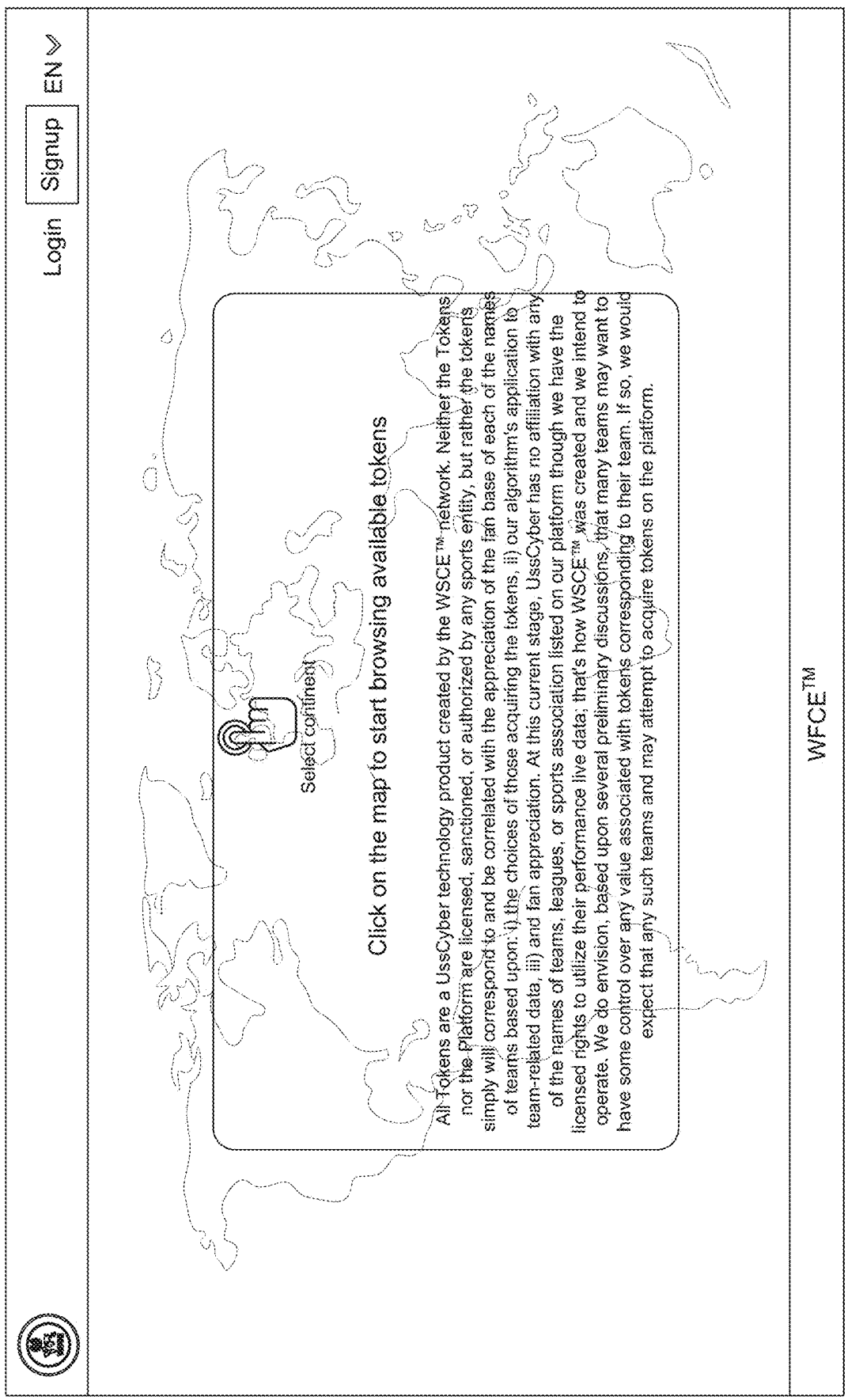
Figure 71:
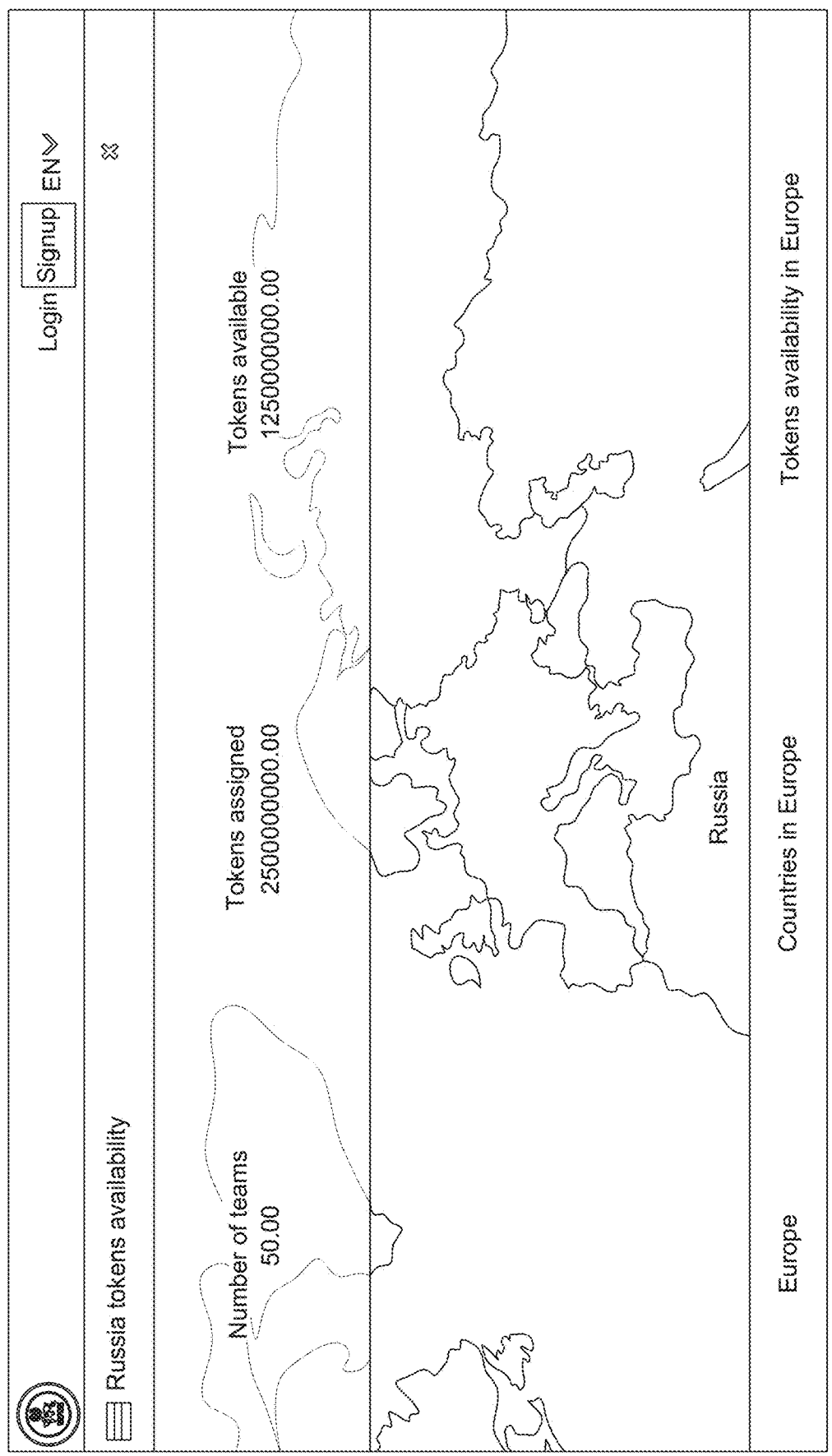
Figure 72:
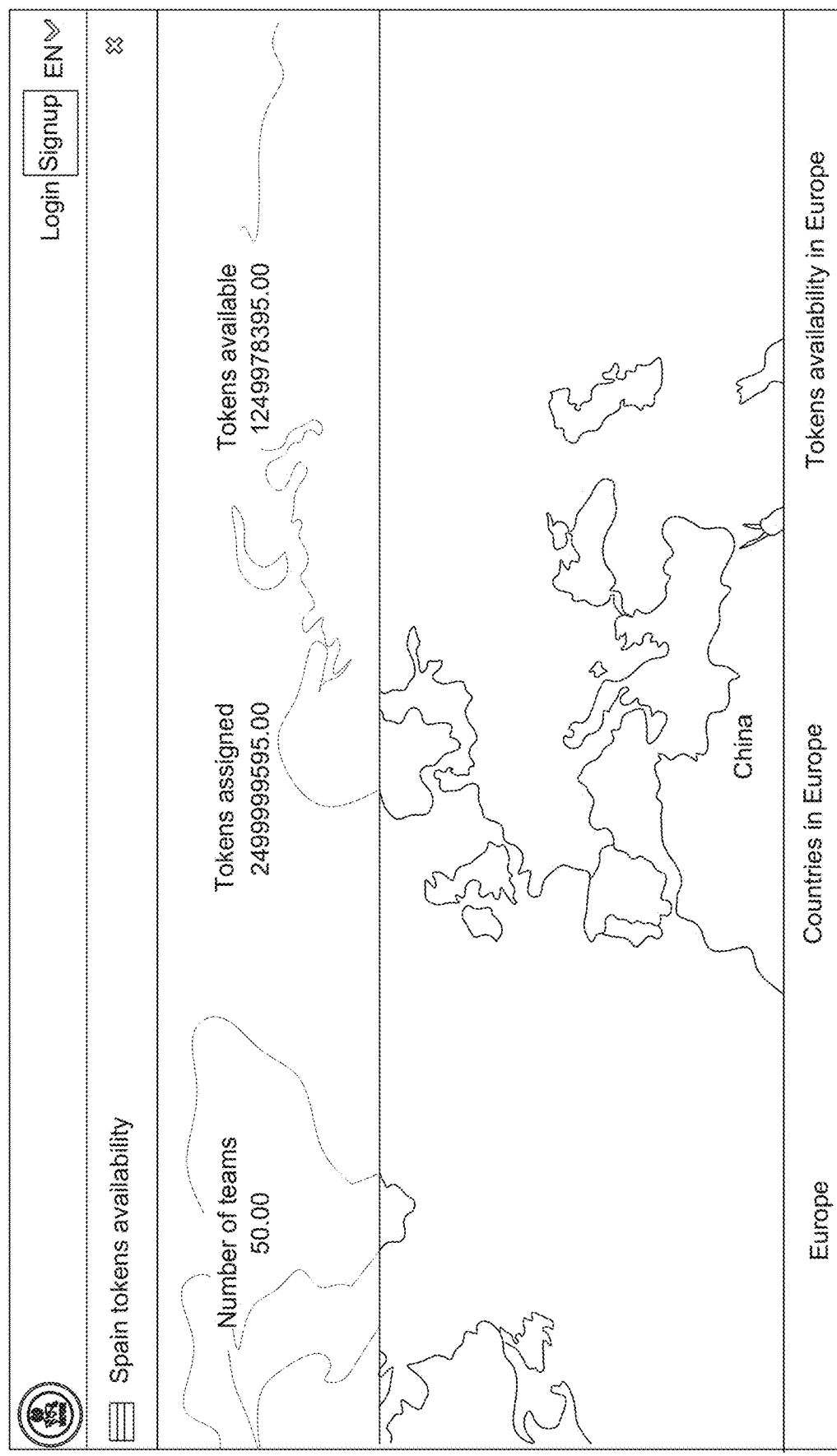

FIG. 38 shows a watched team display portion of the system according to some embodiments. In some embodiments, in the watched teams section previously selected teams are displayed. In some embodiments, under this section, the system enables a user to monitor the token prices for the chosen teams. In some embodiments, data shown is one or more of: the club name, current league points, token assigned/sold and market price; total token number; token price; token value.

In some embodiments, the system includes mining. In some embodiments, the system allows mining to all that are willing to participate. Although this is the case, in some embodiments, no direct mining access is granted to the system. In some embodiments, WSCE will authorize mining contracts with the top crypto mining companies in the world, where users of the system can sign up to mine WSCE coins. In some embodiments, participant members will be contributing to most of the mining power of the entire WSCE network. In some embodiments, to mine users are required to have a WSCE Wallet, a valid WSCE account either directly or a proxy account managed by one of our contracted mining companies, and/or a valid email address. In some embodiments, mining will be based on the POW algorithm similar to the bitcoin mining framework. In some embodiments, successful mining results in the reward of WSCE coins given to the miner(s). In some embodiments, this will be the same across all sports. In some embodiments, this will contribute to the stabilization of our base crypto currency and incentivize the mining community to keep active. With WSCE coins, miners can either sell, convert to other cryptocurrencies or use WSCE coins to purchase any WST (World Sports Token) on the system network.

In some embodiments, the instructions include a system and/or method for direct deposit with token purchase that includes one or more of the following steps: (1) receive, by the one or more processors, client deposits from one or more of the following payment types: crypto deposit, credit or debit card, XL token (Stable coin), and one or more conventional electronic payment systems; (2) approve, by the one or more processors, the client deposits and store the client deposits in the client's blockchain account; (3) debit, by the one or more processors, fees from the blockchain account; (4) send, by the one or more processors, a communication (any notification or communication described herein is executed using one or more conventional communication methods such as GUI display, email, and/or text unless otherwise specified) that the transaction is complete; (5) generate, by the one or more processors, a shopping user interface configured to enable clients to add team tokens to an electronic shopping cart; (6) generate, by the one or more processors, a confirmation and order completion interface to enable the client to complete the checkout process; (7) generate, by the one or more processors, a wallet section interface that enables the client to choose a wallet as a payment option; (8) verify, by the one or more processors, that all required information to process the transaction is present and okay to process; (9) transfer, by the one or more processors, the total authorized amount of tokenized assets from the client's operational account to a shared escrow account; (10) debit, by the one or more processors, fees from the shared escrow account; (11) debit, by the one or more processors, team token cost from the shared escrow account; (12) credit, by the one or more processors, a revenue account; (13) transfer, by the one or more processors, team tokens from one or more of (a) system team wallet address to the client's operational account, and (b) public sell offers (e.g., seller's escrow account) to buyer's operational account; (14) notify, by the one or more processors, the seller of the token sale; (15) debit, by the one or more processors, the revenue account for the seller's portion of the sale less fees; (16) credit, by the one or more processors, the seller account with proceeds from the sale; (17) notify, by the one or more processors, the client that the transaction is complete.

In some embodiments, the instructions stored on the one or more non-transitory computer readable media include a system and/or method for interactive deposit with purchase that cause the one or more computers to implement one or more of the steps of: (1) adding, by the one or more processors, team tokens to a system shopping cart using a web interface or mobile device; (2) confirm, by the one or more processors, the order and enable the client to complete the checkout process; (3) receive, by the one or more processors, a payment option, where the payment option is one or more of (a) a card, (b) crypto currency, (c) XL Stable Coin, and (d) an WSCE Wallet. It is understood that any reference to an WSCE wallet is or any company specific limitation is also a reference to the generic equivalent, e.g., "digital wallet," "crypto coin" and that using the generic version of specific examples are acceptable for the purposes of defining the metes and bounds of the system in its broadest sense.

If the client chooses a card as the payment option, the one or more non-transitory computer readable media, in some embodiments, executes instructions that cause the one or more computers to implement one or more of the following steps of: (1) send, by the one or more processors, a verification code (e.g., a one-time pass code that expires in 15 minutes) to a client's communication account (e.g., email, text) to unlock the card payment function; (2) receive, by the one or more processors, credit card info (e.g., card number, expiration date, name, address, and/or CVV) into a payment processor. In some embodiments, if the payment is not successful, the instructions include one or more of (a) displaying a notification of an unsuccessful transaction, (b) enabling the client to correct the issue, (c) retrying the transaction, and (d) canceling the transaction. If the payment is successful, the instructions further cause the one or more computers to implement one or more steps of: (3) verify, by the one or more processors, that the payment was successful; (4) notify, by the one or more processors, the client that the transaction was approved and that the order is being processed; (5) deposit, by the one or more processors, the assets (minted or transferred) to the client's blockchain account once the deposit is approved from the card processor; (6)

transfer, by the one or more processors, the total authorized amount of tokenized assets from the client's operation account to the shared escrow account; (7) debit, by the one or more processors, fees from the shared escrow account; (8) debit, by the one or more processors, team token cost from shared escrow account; (9) credit, by the one or more processors, the revenue account; (10) transfer, by the one or more processors, the team tokens from one or more of (a) the system team wallet address to the client's operational account and (b) the public sell offers (client's escrow account) to the client's operational account; (11) notify, by the one or more processors, the seller of the token sale; (12) debit, by the one or more processors, the revenue account for the seller's portion of the sale less fees; (13) credit, by the one or more processors, the seller account with proceeds from the sale; (14) notify, by the one or more processors, the client that the transition is completed.

If the client chooses a crypto currency as the payment option, the one or more non-transitory computer readable media, in some embodiments, executes instructions that cause the one or more computers to implement one or more of the following steps of: (1) receive, by the one or more processors, the client's crypto currency type selection (e.g., Bitcoin, Ethereum, Litecoin, USDC); (2) display, by the one or more processors, instructions for the client to send the payment to a one-time crypto address to complete the transaction within an allotted time (e.g., 50 minutes) and cancel, by the one or more processors, the transaction if not completed within the allotted time; (4) if completed in the allotted time, verify, by the one or more processors, the request and process was completed successfully; (5) verify, by the one or more processors, the deposit is present in the blockchain and trigger a continuation of the process; (6) notify, by the one or more processors, the client that the transaction was approved; (7) communicate, by the one or more processors, that the order is being processed; (8) deposit, by the one or more processors, the assets (minted or transferred) to the client's blockchain account; (9) transfer, by the one or more processors, the total authorized amount of tokenized assets from the client's operational account to the shared escrow account; (10) debit, by the one or more processors, team token cost from the shared escrow account; (11) credit, by the one or more processors, the revenue account; (12) transfer, by the one or more processors, the team tokens from one or more of (a) the system team wallet address to the client's operational account and (b) the public sell offers (client's escrow account) to the client's operational account; (13) notify, by the one or more processors, the seller of the token sale; (14) debit, by the one or more processors, the revenue account for the seller's portion of the sale less fees; (15) credit, by the one or more processors, the seller account with proceeds from the sale; (16) notify, by the one or more processors, the client that the transition is completed.

If the client chooses the XL Stable Coin and WSCE Wallet as the payment option, the one or more non-transitory computer readable media, in some embodiments, executes instructions that cause the one or more computers to implement one or more of the following steps of: (1) notify, by the one or more processors, the client of the fees and exchange rate; (2) verify, by the one or more processors, the request and process if valid; (3) notify, by the one or more processors, the client that the transaction was approved; (4) notify, by the one or more processors, that the order has been processed; (5) transfer, by the one or more processors, the total authorized amount of tokenized assets from the client's operational account to the shared escrow account; (6) debit, by the one or more processors, fees from the shared escrow account; (7) debit, by the one or more processors, the team token cost from the shared escrow account; (8) credit, by the one or more processors, the revenue account; (9) transfer, by the one or more processors, the team tokens from one or more of (a) the system team wallet address to the client's operational account and (b) the public sell offers (client's escrow account) to the client's operational account; (10) notify, by the one or more processors, the seller of the token sale; (11) debit, by the one or more processors, the revenue account for the seller's portion of the sale less fees; (12) credit, by the one or more processors, the seller account with proceeds from the sale; (13) notify, by the one or more processors, the client that the transition is completed.

Some embodiments of the system are directed to a computer implemented system and/or method of creating and executing a public sale, where the client wants to sell owned tokens automatically at the current market price. For public sale, the one or more non-transitory computer readable media, in some embodiments, executes instructions that cause the one or more computers to implement one or more of the following steps of: (1) receive, by the one or more processors, one or more of an expiration date, team token identification, and the amount being sold; (2) notify, by the one or more processors, the client of feed and/or any other related charges; (3) receive, by the one or more processors, a confirmation from the client; (4) verify, by the one or more processors, that the request is valid and process the request if valid; (5) notify, by the one or more processors, the client that the request is approved; (6) notify, by the one or more processors, that the request has been queued on the global market for automated sale; (7) transfer, by the one or more processors, the tokens to the clients escrow account; where whatever number of tokens are left from the public listing is transferred back to the client's operation account automatically when the expiration date has been reached.

In some embodiments, the instructions include a system and/or method for buying a public offer. In some embodiments, when other clients select tokens to buy on the public market, any tokens listed using the Public Sale option will be automatically sold instead of system (e.g., UssCyber/WFCE) owned tokens. In some embodiments, the instructions include on one or more of the following steps: (1) receive, by the one or more processors, client deposits from one or more of the following payment types: crypto deposit, credit or debit card, XL token (Stable coin), and one or more conventional electronic payment systems; (2) approve, by the one or more processors, the client deposits and store the client deposits in the client's blockchain account; (3) debit, by the one or more processors, fees from the blockchain account; (4) send, by the one or more processors, a communication that the transaction is complete; (5) generate, by the one or more processors, a shopping user interface configured to enable clients to add team tokens to an electronic shopping cart; (6) generate, by the one or more processors, a confirmation and order completion interface to enable the client to complete the checkout process; (7) generate, by the one or more processors, a wallet section interface that enables the client to choose a wallet as a payment option; (8) verify, by the one or more processors, that all required information to process the transaction is present and okay to process; (9) transfer, by the one or more processors, the total authorized amount of tokenized assets from the client's operational account to a shared escrow account; (10) debit, by the one or more processors, fees from the shared escrow account; (11) debit, by the one or more processors, team token cost from the shared escrow account;

(12) credit, by the one or more processors, a revenue account; (13) transfer, by the one or more processors, team tokens from one or more of (a) system team wallet address to the client's operational account, and (b) public sell offers (e.g., seller's escrow account) to buyer's operational account; (14) notify, by the one or more processors, the seller of the token sale; (15) debit, by the one or more processors, the revenue account for the seller's portion of the sale less fees; (16) credit, by the one or more processors, the seller account with proceeds from the sale; (17) notify, by the one or more processors, the client that the transaction is complete.

Some embodiments of the system are directed to a computer implemented system and/or method of creating and executing a private sale offer, where the client wants to sell owned tokens for a specific price. For private sale, the one or more non-transitory computer readable media, in some embodiments, executes instructions that cause the one or more computers to implement one or more of the following steps of: (1) receive, by the one or more processors, one or more of an expiration date, team token identification, and the asking price; (2) notify, by the one or more processors, the client of feed and/or any other related charges; (3) receive, by the one or more processors, a confirmation from the client; (4) verify, by the one or more processors, that the request is valid and process the request if valid; (5) notify, by the one or more processors, the client that the request is approved; (6) notify, by the one or more processors, that the request has been listed on the global market; (7) transfer, by the one or more processors, the tokens to the clients escrow account; where whatever number of tokens are left from the public listing is transferred back to the client's operation account automatically when the expiration date has been reached.

Some embodiments of the system are directed to a computer implemented system and/or method of creating and executing buying a private offer, where the client wants to buy owned tokens for a specific price. For buying a private offer, the one or more non-transitory computer readable media, in some embodiments, executes instructions that cause the one or more computers to implement one or more of the following steps of: (1) display, by the one or more processors, the one or more private sale offers on a graphical user interface (GUI), the GUI comprising a search feature that enables a client to search for a specific offer; (2) receive, by the one or more processors, a client selection of at least one of the one or more private sale offers; (3) generate, by the one or more processors, a shopping on the GUI configured to enable clients to add team tokens to an electronic shopping cart; (4) receive, by the one or more processors, an asset selection (e.g., XL Stable Coin or another asset from the WSCE Wallet) from the client; (5) notify, by the one or more processors, the client of fees and/or any other related charges; (6) receive, by the one or more processors, a confirmation request from the client; (7) verify, by the one or more processors, that the deposit is present on the blockchain and continue if verified; (8) determine, by the one or more processors, that the system execution was successful; (9) notify, by the one or more processors, the client that the transaction was approved; (10) send, by the one or more processors, a communication that the order has been processed; (11) deposit, by the one or more processors, the assets (minted or transferred) to the client's blockchain account once the deposit is approved; (12) transfer, by the one or more processors, the total authorized amount of tokenized assets from the client's operational account to a shared escrow account; (13) debit, by the one or more processors, fees from the buyer's shared escrow account; (14) credit, by the one or more processors, a revenue account and then seller's account; (15) transfer, by the one or more processors, team tokens from seller's escrow account to buyer's account; (16) notify, by the one or more processors, the buyer that the transaction is completed via email; (17) notify, by the one or more processors, the seller via email of the token sale.

Some embodiments of the system are directed to a computer implemented system and/or method of creating and executing a public bid offer to buy, where the client wants to buy tokens for a specific price and/or team. For a public bid offer to buy, the one or more non-transitory computer readable media, in some embodiments, executes instructions that cause the one or more computers to implement one or more of the following steps of: (1) receive, by the one or more processors, one or more of a bid, an expiration date, and a team token selection, and an amount the client is willing to pay; (2) notify, by the one or more processors, the client of fees and other related charges; (3) receive, by the one or more processors, a confirmation request from the client; (4) verify, by the one or more processors, that the request has been received and processed; (5) notify, by the one or more processors, the client that the request has been listed on the global market as an open bid to buy tokens; (6) notify, by the one or more processors, token owners of new offer; (7) transfer, by the one or more processors, assets to be sold from the buyer's blockchain account to the buyer's escrow account to pay for the sale; (8) transfer, by the one or more processors, the tokens back to the client's blockchain account if the offer expires.

Some embodiments of the system are directed to a computer implemented system and/or method of liquidation (WFCE Exchange and XL Mobile App), where the client wants to transfer assets to a different account. For a liquidation, the one or more non-transitory computer readable media, in some embodiments, executes instructions that cause the one or more computers to implement one or more of the following steps of: (1) receive, by the one or more processors, assets to the digital wallet (e.g., XLiquidus Wallet) from an exchange (e.g., WFCE Exchange) using the web or mobile interface; (2) receive, by the one or more processors, a request to open the digital wallet; (3) receive, by the one or more processors, a withdrawal option from the client, where the withdrawal option is a payout to one or more of a bank account (e.g., wire transfer, ACH or similar), an external crypto address, and PIX (Brazil only); (4) verify, by the one or more processors, that a KYC has been completed, wherein if the KYC is not completed, the user is notified that KYC will be required to complete the transfer and will be requested at the end of the process, or wherein the KYC has been completed, the system is configured to resume the normal process.

If the payout is to a bank account, in some embodiment, the instructions include one or more of the following steps of: (1) receive, by the one or more processors, all required bank account information (all except client name and clients address in some embodiments); (2) send, by the one or more processors, information relating to all fees, exchange rates (if applicable) and transfer time to convert crypto assets to fiat and the estimated time that the transfer will take; (3) receive, by the one or more processors, a confirmation from the client; (4) verify, by the one or more processors, the request and process if okay; (5) convert, by the one or more processors, the crypto assets to fiat (the system burns tokens and allots fiat to complete this transaction in some embodiments); (6) send, by the one or more processors, a notification to complete a valid KYC information request to the client if one has not been received; (7) create, by the one or more processors, a transfer request with the clients name and address on file; (8) notify, by the one or more processors, the client with details for the transaction and status; (9) direct, by the one or more processors, the client to a completed screen and display completed details and reference number (transaction is completed at this point); (10) generate, by the one or more processors, a transaction history screen and/or pending section on a GUI in response to a status check from the client; (11) notify, by the one or more processors, the client of any changes to the request.

If the payout is to an external crypto account, in some embodiment, the instructions include one or more of the following steps of: (1) receive, by the one or more processors, all required information on the client's external address where they would like to send the withdrawal; (2) send, by the one or more processors, information relating to all fees, exchange rates (if applicable) and transfer time to send the crypto assets to the external address; (3) receive, by the one or more processors, a confirmation from the client; (4) verify, by the one or more processors, the request and process the request if okay; (5) convert, by the one or more processors, the crypto assets to external crypto (the system burns tokens and allots desired crypto to complete this transaction in some embodiments); (6) send, by the one or more processors, a notification to complete a valid KYC information request to the client if one has not been received; (7) send, by the one or more processors, the external crypto to the external crypto address; (8) notify, by the one or more processors, the client with details of the transaction and status; (9) direct, by the one or more processors, the client to a completed screen and display completed details and blockchain reference number (transaction is completed at this point); (10) generate, by the one or more processors, a transaction history screen and/or pending section on a GUI in response to a status check from the client; (11) notify, by the one or more processors, the client that the transaction is completed once the minimum amount of blockchain confirmations is achieved.

If the payout is to PIX (Central Bank of Brazil), in some embodiment, the instructions include one or more of the following steps of: (1) receive, by the one or more processors, all required PIX account information (all except client name and clients address in some embodiments); (2) send, by the one or more processors, information relating to all fees, exchange rates (if applicable) and transfer time to convert crypto assets to fiat and the estimated time that the transfer will take; (3) receive, by the one or more processors, a confirmation from the client; (4) verify, by the one or more processors, the request and process the request if okay; (5) convert, by the one or more processors, the crypto assets (e.g., XLBR) to BRL (the system burns tokens and allots fiat to complete this transaction in some embodiments); (6) send, by the one or more processors, a notification to complete a valid KYC information request to the client if one has not been received; (7) create, by the one or more processors, a transfer request with the clients name and address on file; (8) notify, by the one or more processors, the client with details for the transaction and status; (9) direct, by the one or more processors, the client to a completed screen and display completed details and reference number (transaction is completed at this point in some embodiments); (10) generate, by the one or more processors, a transaction history screen and/or pending section on a GUI in response to a status check from the client; (11) notify, by the one or more processors, the client of any changes to the request.

Figure 74:
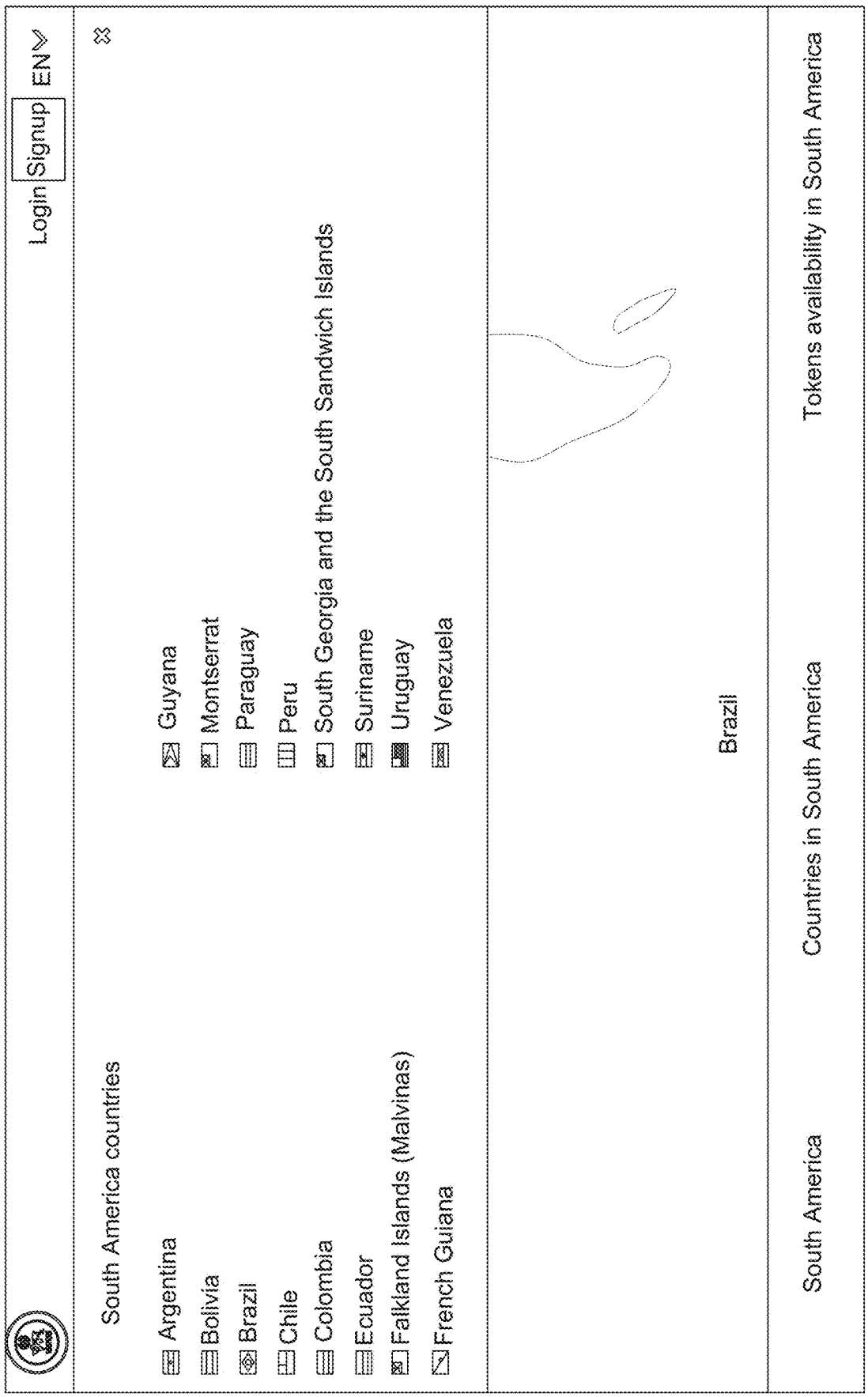
Figure 75:
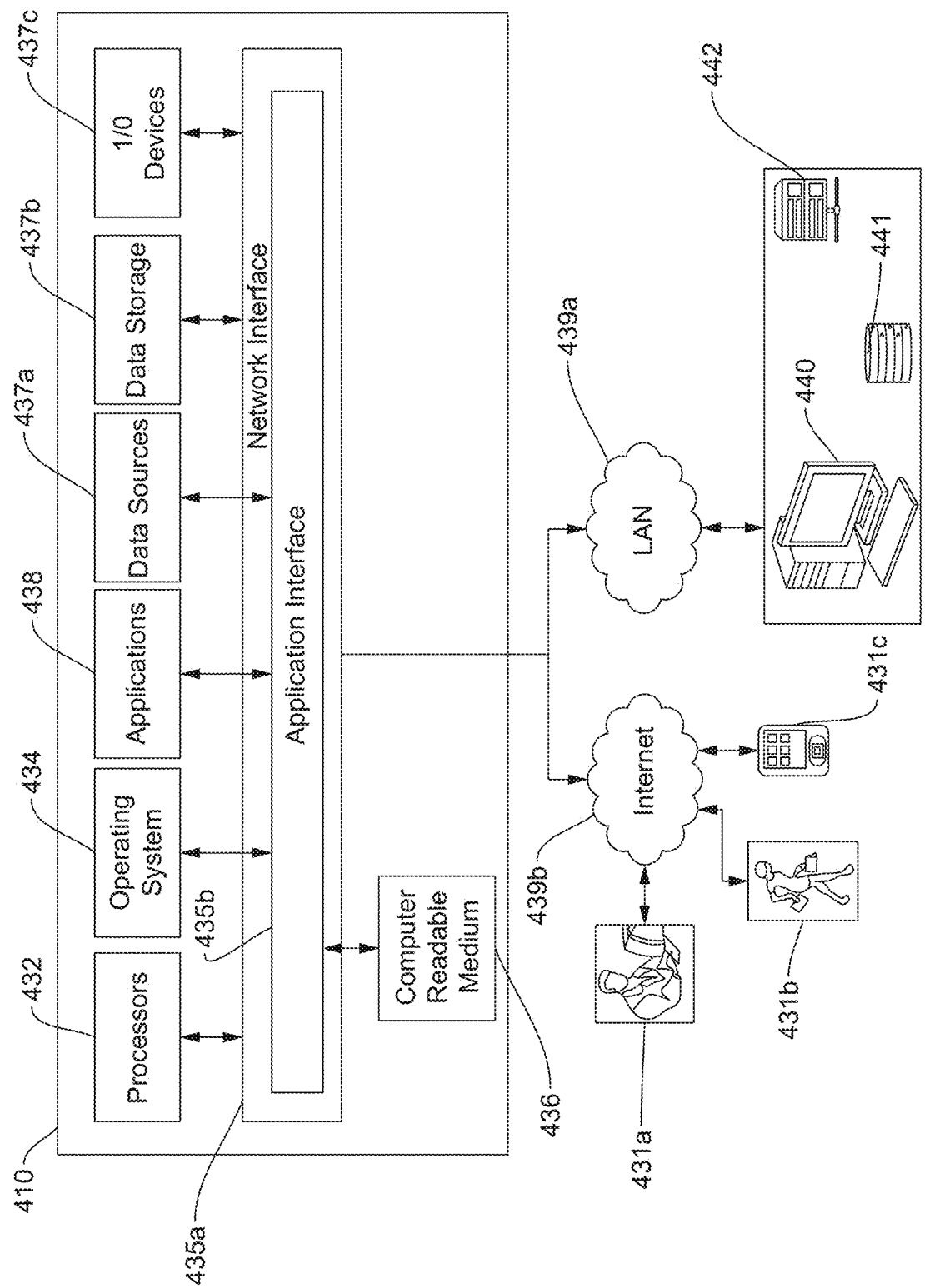
FIG. 75 illustrates a computer system 410 enabling or comprising the systems and methods in accordance with some embodiments of the system.

FIG. 74 illustrates a computer system 410 enabling or comprising the system and methods in accordance with some embodiments. In some embodiments, the computer system 410 can operate and/or process computer-executable code of one or more software modules of the aforementioned system and method. Further, in some embodiments, the computer system 410 can operate and/or display information within one or more graphical user interfaces (e.g., HMIs) integrated with or coupled to the system.

In some embodiments, the computer system 410 can comprise at least one processor 432. In some embodiments, the at least one processor 432 can reside in, or coupled to, one or more conventional server platforms (not shown). In some embodiments, the computer system 410 can include a network interface 435a and an application interface 435b coupled to the least one processor 432 capable of processing at least one operating system 434. Further, in some embodiments, the interfaces 435a, 435b coupled to at least one processor 432 can be configured to process one or more of the software modules (e.g., such as enterprise applications 438). In some embodiments, the software application modules 438 can include server-based software and can operate to host at least one user account and/or at least one client account, and operate to transfer data between one or more of these accounts using the at least one processor 432.

In some embodiments, the system is directed to a cloud-based artificial intelligence (AI) enabled quantum proof blockchain platform (the "blockchain platform"). In some embodiments, the system blockchain platform includes a blockchain built on traditional blockchain technology. In some embodiments, the traditional blockchain technology includes Bitcoin® as a non-limiting example. In some embodiments, the quantum proof blockchain includes modularity, where one or more platform components operate as an independent micro services so that the system can always be easily upgraded to keep up to date with the best technology available with a focus on reliability, scalability, security, and speed. In some embodiments, the modularity enables the system to achieve record breaking speeds where one million transactions a minute are achievable at a minimum setting. In some embodiments, the blockchain platform is configured to be integrated with other cloud systems, APIs, fintech, and other blockchains.

In some embodiments, non-limiting features of the blockchain platform include one or more of: a future performance algorithm; quantum resilience—encryption and quantum proofing; a data management system; a contract management system; external network tethering; blockchain industries (channels); node governance; blockchain explorer; malicious threat+fraud detection/monitoring with AI; regulatory compliance; identity verification with AI proof of address biometric analyst document screening; chargeback integration and automated fintech integration; universal wallet for all supported tokens; high speed transactions (60 M tph base); a mobile wallet; a global marketplace; tokenization; sNFT (smart NFT) and augmented sNFT; automatic assignment and membership; data sovereignty; decentralized organizations/functions; and blockchain services.

In some embodiments, non-limiting examples of blockchain industries (channels) include one or more of: sports, financial, sustainability, industrial, services, medical, technology, commodities, energy, and agriculture. In some embodiments, non-limiting examples of decentralized organizations/functions include one or more of: decentralized mining; decentralized utilities; decentralized shipping; decentralized manufacturing; a decentralized gig economy+ AI (GIGA economy); decentralized KYC service; a decentralized health care platform; decentralized advance medical care (AI+ mixed/AR and digital twins); decentralized data monetization; decentralized research and development; ESG investments; a decentralized tokenized carbon credits company; and a decentralized energy cooperative. In some embodiments, non-limiting examples of blockchain services includes one or more of: BaaS—Blockchain as a Service; TaaS—Tokenization as a Service; a Managed Blockchain Instance; and a White Label Project Service.

In some embodiments, the blockchain platform includes quantum resilience. In some embodiments, quantum resilience protects the blockchain encryption system from cracking methods by modern computer systems and the proliferation of quantum computers/services and AI. In some embodiments, the blockchain platform includes quantum event detection. In some embodiments, quantum event detection is for where the current encryption protocol on the network is at risk of being broken. In some embodiments, one or more ways this could happen includes detection in annual security testing, an advisory from a security team, and/or official notification from one of the international standard security boards.

In some embodiments, the blockchain platform includes a collection of microsystems including a variable encryption protocol platform subsystem built as a modular component. In some embodiments, the variable encryption protocol platform is configured to secure the blockchain platform. In some embodiments, variable encryption protocol platform is configured to track and enforce the network standards for encryption and/or replace the encryption protocols on the network.

In some embodiments, the blockchain platform includes a network encryption standard. In some embodiments, the network encryption standard is assigned by the variable encryption protocol system. In some embodiments, clients are allowed to use multiple variations of encryption as long as it is within the in-band boundary. In some embodiments, if it is beyond the in-band boundary range, the action will automatically be rejected.

In some embodiments, the blockchain platform includes a quantum shift (encryption paradigm shift). In some embodiments, a quantum shift is configured to be triggered where an event occurs where current network encryption is determined to be at risk of being broken. In some embodiments, two types of quantum shifts include a sub-quantum event and a quantum event. In some embodiments, a sub-quantum event is where the current blockchain encryption protocol as used in classical computing needs to be upgraded. In some embodiments, a quantum event operates on the same principle but on the quantum level. In some embodiments, the blockchain platform includes a quantum trigger. In some embodiments, both events would then trigger a quantum trigger causing the entire blockchain platform network to upgrade its security.

Figure 76:
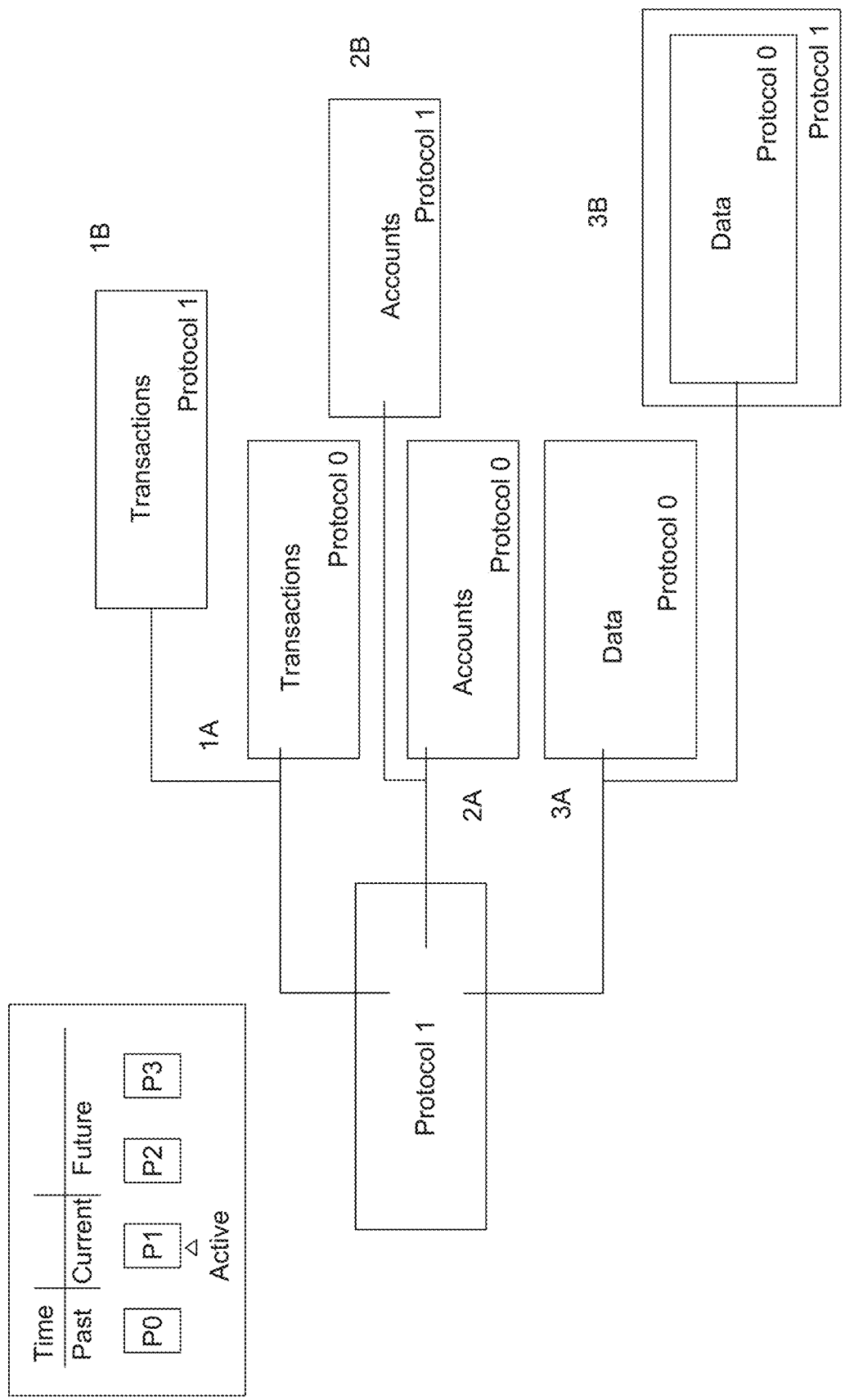
FIG. 76 illustrates a normalization flow to resolve network compliance portion of the encryption compliance workflow according to some embodiments.
Figure 77:
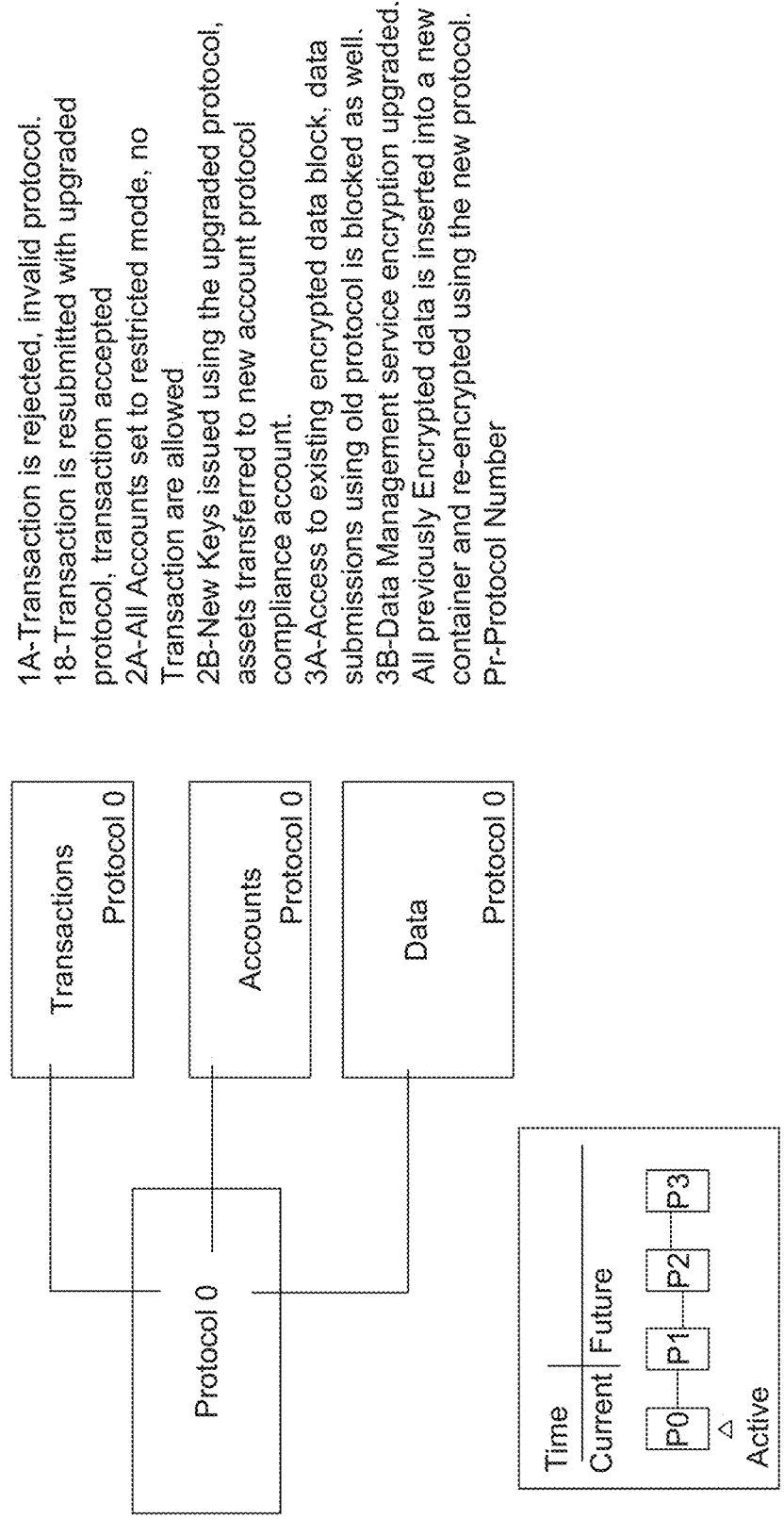
FIG. 77 depicts a full network protocol compliance portion of the of the encryption compliance workflow according to some embodiments.

In some embodiments, a quantum trigger is configured to cause all blockchain accounts, data, and smart contracts to lock and then upgrade to the next available encryption protocol set by the network. In some embodiments, this can happen all at once or over time depending on the threat level. In some embodiments, for system blockchain accounts, any pending transactions involving the previously deprecated encryption protocols will be rejected. In some embodiments, new keys are issued to the account and a request sent by the system to the client to resubmit the transaction using an updated protocol. In some embodiments, smart contracts use a similar process to upgrade security, depending on the risk level. In some embodiments, the upgrading of the security keys is executed right before the next execution or can be triggered for immediate upgrade by the contract management system. In some embodiments, with private data, the previously encrypted data using the deprecated protocol is re-secured by inserting it into a new encrypted container using the upgraded encryption protocol. In some embodiments, any active transaction or block being validated that is determined to be invalid will automatically be rejected by the networks deprecated protocol function. In some embodiments, in other to resume normal operations, the client or service will need to be protocol compliant. FIG. 76 illustrates a normalization flow to resolve network compliance portion of the encryption compliance workflow according to some embodiments. FIG. 77 depicts a full network protocol compliance portion of the of the encryption compliance workflow according to some embodiments.

In some embodiments, the blockchain platform includes a node data management module. In some embodiments, node data management module is configured to manage at least some data across the blockchain platform network. In some embodiments, the node data management module is configured to automatically categorize data into two types: public data, which the public and view; and private data, with the access managed by the system and the two parties involved in the initial transaction. In some embodiments, the system is configured to notify a counterpart that the data in the transaction has been shared with additional members or access has been modified upon any modification to the access policy by the initiating parties.

In some embodiments, the data management node feature is configured to store one or more of transactional data, block data, algorithmic data, information added to a transaction, sNFT images, legal records, and medical records. In some embodiments, the data management node module is configured to assist in keeping the size of the data stored on the blockchain to the smallest possible size by use of an automatic archive module. In some embodiments, the automatic archive module is configured to send and retrieve historical data. In some embodiments, a block signature reference includes where data from a node (i.e., client) is compiled into a block of transactions and is sent to the data management system to be stored along with its signature. In some embodiments, any node in the system that wants to verify the data will make a request to the data management system for the original reference block (original data, and the signature). In some embodiments, the data management module will validate the data, create a new block with the validated data, and send the validated virtual reference block to local storage and/or cloud storage. In some embodiments, this reduces the size of the active data on the live network, only keeping the necessary data in a hot state.

In some embodiments, the system comprises a data sharing and access module. In some embodiments, all data is shared on the blockchain between the two parties conducting the transaction and can be access at any time. In some embodiments, the data is also available in censored format that can be accessed by system administrators and/or regulators. In some embodiments, the system is configured to enable regulators to make formal request for uncensored data to a system administrator in cases where it is in the best interest of the public. In some embodiments, HIPAA, CCPA and GDPR rules apply.

In some embodiments, the data sharing module subsystem is configured to support several transaction data types, document storage, and monetization of user's data on the network as DDC—Decentralized Data Company where users agree to monetize their data and the system will automatically list the user's collective data for sale on the network. In some embodiments, the system is configured to enable decentralized clients (nodes) to download a copy of the data as long as it is not restricted. In some embodiments, the requested data is automatically stored locally, accessible on the client's local node. In some embodiments, data properties can be configured to enforce data sovereignty.

Figure 78:
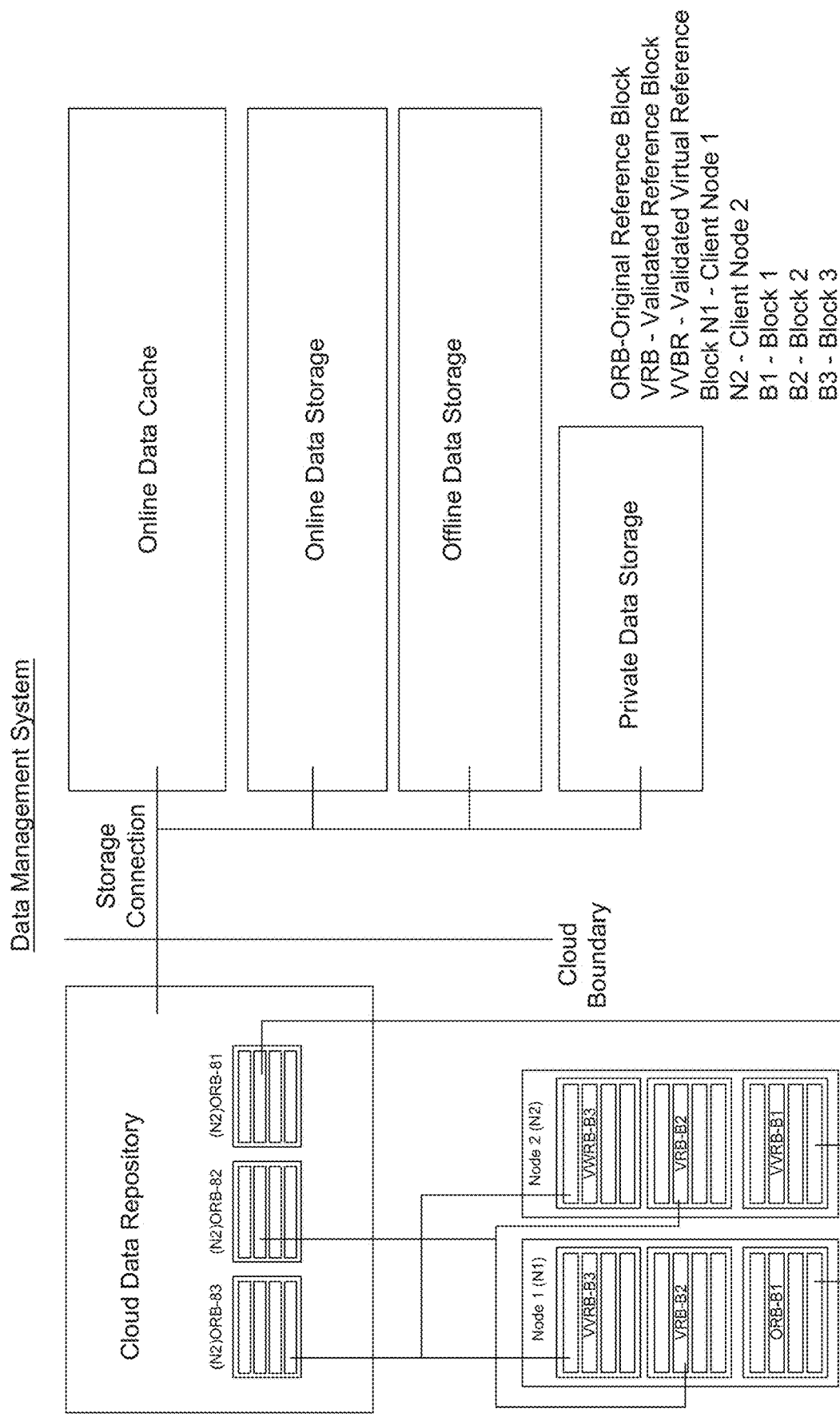
FIG. 78 illustrates a schematic overview of the data management system according to some embodiments.

In some embodiments, data types include one or more of augmented sNFT, sNFT, Block, medical records, legal documents, information, original reference block, and validated reference block, as non-limiting examples. In some embodiments, node types (Related to Data Management) include one or more of a transaction data node, a validator, a public data repository, and a core data repository (system administrator only or authorized vendor). In some embodiments, blocks are made up of standard blockchain transactions or a transaction reference. In some embodiments, a transaction reference includes a unique identifier which is stored on a public data repository node or a core data repository that can be retrieved by any party with the appropriate access. In some embodiments, there can only be one type for transaction on a block. FIG. 78 illustrates a schematic overview of the data management system according to some embodiments.

In some embodiments, the system blockchain platform includes a contract management module. In some embodiments, the contract management module is configured to govern one or more activities involving a smart contract life cycle and is configured to monitor a contract throughout its lifetime of operation. In some embodiments, the core contract system is configured to disabled or force the deployed contract to force-update to the newest version available. In some embodiments, contract management module is configured to maintain the health of all contracts and their executability.

In some embodiments, the contract management module includes an override. In some embodiments, the contract management module is configured to execute an override where the system requires two of three approvals from (1) the network host and/or administrator, such as the company providing the service, (2) the relevant regulator, and/or (3) the collective clients affected by the contract.

In some embodiments, the blockchain platform includes author/reviewer monetization. In some embodiments, the system is configured to enable contract authors and reviewers to earn monetary rewards each time a contract is executed. In some embodiments, contract execution reward also applies if a contract is inherited as a part of a large collective contract. In some embodiments, to qualify for monetization, contract source code needs to be publicly available and licensed for to be used by the public. In some embodiments, monetization approval will be an authorized member of an administrator contract team. A non-limiting example of contract rewards according to some embodiments includes author 60%, reviewer 20%, administrator (system host) 20%, inheritance 30%.

In some embodiments, the blockchain platform includes blockchain inheritance. In some embodiments, a system administrator is allowed to integrate public contracts into the system network. In some embodiments, all integrated contracts once executed will produce monetary rewards to the contract developers.

In some embodiments, the blockchain platform includes contract repositories. In some embodiments, one or more public contracts are stored on a code hosting platform (e.g., GitHub) with MIT or other suitable license for public use. In some embodiments, internal contracts are hosted on private repositories.

In some embodiments, the blockchain platform includes a contract health management module. In some embodiments, the contract health management module is configured to check the state and version of all deployed contracts. In some embodiments, if a contract is not in a runnable state and in danger of missing an execution, the system will automatically redeploy a healthy version of that contract and execute the previously missed execution if it was missed. In some embodiments, if a contract is out of date, the system will force the contract to update before it's next execution.

In some embodiments, the blockchain platform includes contract funding. In some embodiments, one or more smart contracts generated by the system come with reserved funds allocation. In some embodiments, the contract creator can deposit funds to the contract account in certain cases at the moment of deployment and/or depending on the type of contract.

In some embodiments, the blockchain platform includes a term contracts deposit. In some embodiments, one or more network wallets and contracts that support funding can earn income from the term contracts deposit. In some embodiments, these features give network clients the ability to earn income from the term contract deposits. In some embodiments, the term contract can be applied to any extra funds on a contract or to any token directly with a monetary value (stablecoins or supported cryptocurrency). In some embodiments, these term contracts allow clients to earn a fixed percentage for locking-in assets on the blockchain for a fixed amount of time.

In some embodiments, the blockchain network includes network mimics which includes contracts applied to an inherited network to preserve the most important features.

In some embodiments, the blockchain network includes a simple escrow service. In some embodiments, one or more customers on the network are assigned an escrow account. In some embodiments, the simple escrow service allows assets to be placed on hold until the contractual obligations are met thereafter. In some embodiments, the assets will either be transferred to the contractual party or returned to the original client address. In some embodiments, the attached escrow account is shared between the client and the system. In some embodiments, this account is owned by the system and clients have no control over it, just read only access.

In some embodiments, the blockchain platform includes external network tethering. In some embodiments, the system is configured to host foreign blockchains by tethering them as basic nodes. In some embodiments, this gives the network some unique abilities that are available automatically. In some embodiments, some of these features include asset capture, asset tokenization, auto asset management, fully transparency on cross network transactions, and network inheritance.

In some embodiments, the network inheritance is one of the most unique features of external network tethering. In some embodiments, once enabled, after the occurrence of a quantum shift, one or more available assets from the external network are captured, and its feature preserved by enabling the network mimic contract function. In some embodiments, this protects the customers and markets of the inherited network by enabling it to run a more secure platform in a captured state. In some embodiments, assets imported from the external network are locked and are replaced by internal tokens that represent the imported assets.

In some embodiments, the blockchain platform includes regulatory nodes. In some embodiments, a regulatory node includes a special node that is assigned to financial regulators. In some embodiments, they get direct access to the data shipped to the blockchain explorers. In some embodiments, it also gives them case management, a direct request channel for valid queries, and the ability to manage who can access the system in a regulatory capacity.

In some embodiments, the system includes artificial intelligence (AI) assisted functions. In some embodiments, AI assisted functions are used heavily across the network for KYC, data and behavior analysis, and threat detection. In some embodiments, this feature is used with the blockchain industries, enabling clients to use AI-enabled functions with their work and smart contracts.

In some embodiments, the system includes a future performance algorithm. In some embodiments, the future performance algorithm includes a unique measurement system that analyzes an entities performance by leveraging modern technology along with AI. In some embodiments, the future performance algorithm consumes data (e.g. KPIs) from several sources to help formulate an opinion.

In some embodiments, once the data is consumed and analyzed, the first stage in the process is to generate an automated opinion. In some embodiments, this is done by executing an assessment of each piece of data ingested by the system and evaluating it with the KPI engine. In some embodiments, the KPI engine then attaches a KPI opinion value to it. Next, in some embodiments, the performance algorithm will request a live snapshot from market analysis metrics, thereafter, evaluating the market data and also attributing a KPI value to each market indicator. In some embodiments, once completed it issues a market opinion. In some embodiments, this is packaged together to send to the pricing engine as a collective opinion. In some embodiments, the pricing engine then, receives the collective opinion and makes a final review and triggers a price update to the asset on the entire network.

Figure 79:
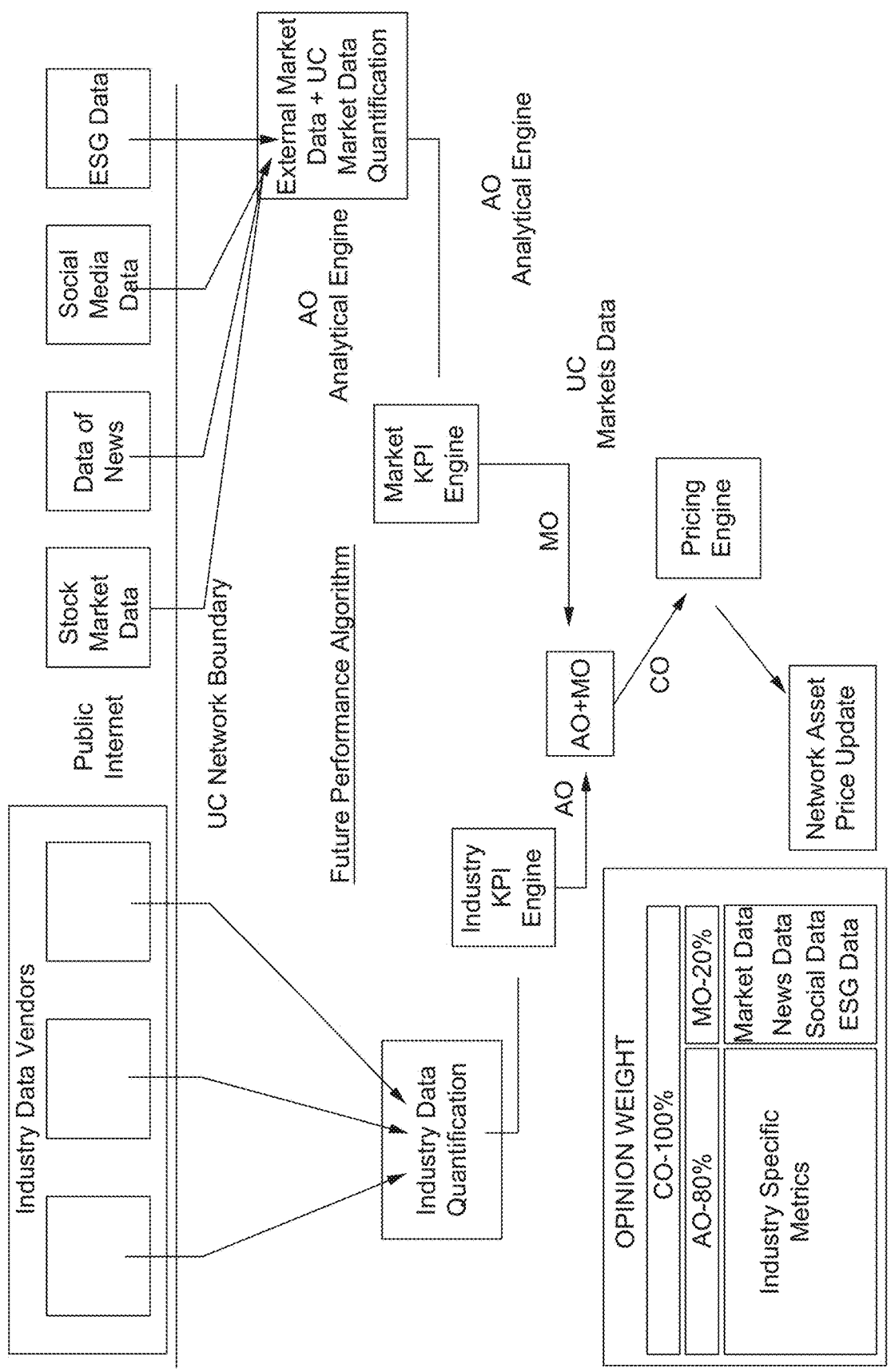
FIG. 79 shows an overview of the future performance algorithm according to some embodiments.

In some embodiments, an Automated Opinion (AO) includes KPI values derived from live performance data. In some embodiments, Market Opinion (MO) includes KPI values derived from live market data. In some embodiments, a Collective Opinion (CO) includes KPI values derived from analyzing Market Opinion data and Automated Opinion data. In some embodiments, the result of CO*(AO+MO) is sent to the Pricing Engine and results in a Network Price Update. FIG. 79 shows an overview of the future performance algorithm according to some embodiments.

In some embodiments, the system includes a pricing engine. In some embodiments, the pricing engine is configured to manage one or more pricing related activities on the system network. In some embodiments, this includes asset price updates, fiat and crypto conversion rates, quotes for various services on the network, and forex markup rates for assets.

In some embodiments, the system includes a block (chain) explorer. In some embodiments, the block explorer provides full transparency on all block chain transactions. In some embodiments, the block chain explorer provides real time AML/KYC status on all addresses. In some embodiments, no private or client identifiable information is ever shared. In some embodiments, the block chain explorer also reports on all types of transactions (data transmissions, token performance and price adjustments).

In some embodiments, the system includes malicious threat and fraud detection/monitoring with AI. In some embodiments, the system is configured to consume data from AI models based on (e.g., ten billion) internet signals from various sources. In some embodiments, this data is used to evaluate fraud probability or malicious intent of the user and response in several ways. In some embodiments, if system determines that the user has not passed the acceptable evaluation, the system will automatically challenge the user's authenticity/intent in order to be able to continue with the requested action.

In some embodiments, the system includes regulatory compliance. In some embodiments, this function actively maintains a real time compliance profile of each customer on the network. In some embodiments, clients are required to maintain a favorable compliant profile to gain full access to the network. In some embodiments, if the client's compliant profile falls into an unfavorable state, all accounts for the client are automatically set to a restricted state until the user can reverify their status or UC compliance officer can review their information and issue a favorable status.

In some embodiments, the system includes node governance. In some embodiments, the node governance system manages nodes on or connected to the network. In some embodiments, its sole job is to make sure that no one entity controls more than 50% on the network in node capacity. In some embodiments, this can be a project specific node or general-purpose nodes.

In some embodiments, the system includes blockchain industries (channels). In some embodiments, industry channels are micro blockchain networks within the large UC Blockchain system. In some embodiments, these networks include dedicated resources for processing approximately 1 million transactions each minute by default as a non-limiting example. In some embodiments, each of these micro networks also come with default behaviors and properties that make management of assets and data unique to each channel.

In some embodiments, a Distributed Data Company (DCC) is a collective group of users on the UC blockchain network who agrees to make their anonymized data available for sale for research purposes. In some embodiments, a Smart Non-Fungible Token (sNFT) is able to operate in two states, as a fully digital traditional NFT and an Augmented NFT, which can also be paired with AI functionality. In some embodiments, an Augmented sNFT is a digital non-fungible token that is legally bound to a physical object using smart contracts and legal documents, which can have a digital twin paired to the physical object.

With the above embodiments in mind, it is understood that the system can employ various computer-implemented operations involving data stored in computer systems. Moreover, the above-described databases and models described throughout this disclosure can store analytical models and other data on computer-readable storage media within the computer system 410 and on computer-readable storage media coupled to the computer system 410 according to various embodiments. In addition, in some embodiments, the above-described applications of the system can be stored on computer-readable storage media within the computer system 410 and on computer-readable storage media coupled to the computer system 410. In some embodiments, these operations are those requiring physical manipulation of physical quantities. Usually, though not necessarily, in some embodiments these quantities take the form of one or more of electrical, electromagnetic, magnetic, optical, or magneto-optical signals capable of being stored, transferred, combined, compared and otherwise manipulated. In some embodiments, the computer system 410 can comprise at least one computer readable medium 436 coupled to at least one of at least one data source 437a, at least one data storage 437b, and/or at least one input/output 437c. In some embodiments, the computer system 410 can be embodied as computer readable code on a computer readable medium 436. In some embodiments, the computer readable medium 436 can be any data storage that can store data, which can thereafter be read by a computer (such as computer 440). In some embodiments, the computer readable medium 436 can be any physical or material medium that can be used to tangibly store the desired information or data or instructions and which can be accessed by a computer 440 or processor 432. In some embodiments, the computer readable medium 436 can include hard drives, network attached storage (NAS), read-only memory, random-access memory, FLASH based memory, CD-ROMs, CD-Rs, CD-RWs, DVDs, magnetic tapes, other optical and non-optical data storage. In some embodiments, various other forms of computer-readable media 436 can transmit or carry instructions to a remote computer 440 and/or at least one user 431, including a router, private or public network, or other transmission or channel, both wired and wireless. In some embodiments, the software application modules 438 can be configured to send and receive data from a database (e.g., from a computer readable medium 436 including data sources 437a and data storage 437b that can comprise a database), and data can be received by the software application modules 438 from at least one other source. In some embodiments, at least one of the software application modules 438 can be configured within the computer system 410 to output data to at least one user 431 via at least one graphical user interface rendered on at least one digital display.

In some embodiments, the computer readable medium 436 can be distributed over a conventional computer network via the network interface 435a where the system embodied by the computer readable code can be stored and executed in a distributed fashion. For example, in some embodiments, one or more components of the computer system 410 can be coupled to send and/or receive data through a local area network ("LAN") 439a and/or an internet coupled network 439b (e.g., such as a wireless internet). In some embodiments, the networks 439a, 439b can include wide area networks ("WAN"), direct connections (e.g., through a universal serial bus port), or other forms of computer-readable media 436, or any combination thereof.

In some embodiments, components of the networks 439a, 439b can include any number of personal computers 440 which include for example desktop computers, and/or laptop computers, or any fixed, generally non-mobile internet appliances coupled through the LAN 439a. For example, some embodiments include one or more of personal computers 440, databases 441, and/or servers 442 coupled through the LAN 439a that can be configured for any type of user including an administrator. Some embodiments can include one or more personal computers 440 coupled through network 439b. In some embodiments, one or more components of the computer system 410 can be coupled to send or receive data through an internet network (e.g., such as network 439b). For example, some embodiments include at least one user 431a, 431b, is coupled wirelessly and accessing one or more software modules of the system including at least one enterprise application 438 via an input and output ("I/O") 437c. In some embodiments, the computer system 410 can enable at least one user 431a, 431b, to be coupled to access enterprise applications 438 via an I/O 437c through LAN 439a. In some embodiments, the user 431 can comprise a user 431a coupled to the computer system 410 using a desktop computer, and/or laptop computers, or any fixed, generally non-mobile internet appliances coupled through the internet 439b. In some embodiments, the user can comprise a mobile user 431b coupled to the computer system 410. In some embodiments, the user 431b can connect using any mobile computing 431c to wireless coupled to the computer system 410, including, but not limited to, one or more personal digital assistants, at least one cellular phone, at least one mobile phone, at least one smart phone, at least one pager, at least one digital tablets, and/or at least one fixed or mobile internet appliances.

The subject matter described herein are directed to technological improvements to the field of blockchain technology by establishing a relationship between a digital asset and a performance metric of an associated organization to establish and/or modify the value of the digital asset (e.g., token). The disclosure describes the specifics of how a machine including one or more computers comprising one or more processors and one or more non-transitory computer implement the system and its improvements over the prior art. The instructions executed by the machine cannot be performed in the human mind or derived by a human using a pin and paper but require the machine to convert process input data to useful output data. Moreover, the claims presented herein do not attempt to tie-up a judicial exception with known conventional steps implemented by a general-purpose computer; nor do they attempt to tie-up a judicial exception by simply linking it to a technological field. Indeed, the systems and methods described herein were unknown and/or not present in the public domain at the time of filing, and they provide a technologic improvements advantages not known in the prior art. Furthermore, the system includes unconventional steps that confine the claim to a useful application.

It is understood that the system is not limited in its application to the details of construction and the arrangement of components set forth in the previous description or illustrated in the drawings. The system and methods disclosed herein fall within the scope of numerous embodiments. The previous discussion is presented to enable a person skilled in the art to make and use embodiments of the system. Any portion of the structures and/or principles included in some embodiments can be applied to any and/or all embodiments: it is understood that features from some embodiments presented herein are combinable with other features according to some other embodiments, and all embodiments are part of a single system. Thus, some embodiments of the system are not intended to be limited to what is illustrated but are to be accorded the widest scope consistent with all principles and features disclosed herein. The instructions listed in conjunction with a specific action and executed by the one or more processors are not limited to that specific example, but instead represent different aspects of the system that support an overall functionality.

Some embodiments of the system are presented with specific values and/or setpoints. These values and setpoints are not intended to be limiting and are merely examples of a higher configuration versus a lower configuration and are intended as an aid for those of ordinary skill to make and use the system.

Furthermore, acting as Applicant's own lexicographer, Applicant imparts the explicit meaning and/or disavow of claim scope to the following terms:

Applicant defines a token as a digital representation of value or rights (i) that has or may have a transaction history that: (A) is recorded on a distributed ledger, blockchain, or other digital data structure; (B) has transactions confirmed through an independently verifiable process; and (C) resists modification or tampering of the transaction; (ii) that is capable of being transferred between persons without an intermediary party; and (iii) that does not represent a financial interest in a company, partnership, or fund, including an ownership or debt interest, revenue share, entitlement to any interest or dividend payment.

WSCE is defined as the World Sports Coin Exchange. A subsidiary of UssCyber Inc. It is the parent branch for all sport projects for UssCyber Inc. WSCE is also the digital base currency for the entire WSCE network according to some embodiments.

WFCE is defined as World Football Coin Exchange. A subsidiary of WSCE and the first sports blockchain implementation of the WSCE group and the official name of the football project. Also, it is the name given to all football tokens issued on the system network. Each football team will be issued a unique token attached to their performance data.

WST is defined as World Sports Token and is the category name given to all layer 2 tokens that operate WSCE Blockchain network regardless of the type of sports. Each team will be issued a unique token attached to their performance data.

WFCE Divisions are defined as divisions not set by WFCE and are control by the hosting countries for each club.

Division 1 is defined as the team that most participate in the countries or regional champion league or prominent league.

Division 2 is defined as clubs that participate in the countries or regional B leagues.

Applicant defines any use of "and/or" such as, for example, "A and/or B," or "at least one of A and/or B" to mean element A alone, element B alone, or elements A and B together. In addition, a recitation of "at least one of A, B, and C," a recitation of "at least one of A, B, or C," or a recitation of "at least one of A, B, or C or any combination thereof" are each defined to mean element A alone, element B alone, element C alone, or any combination of elements A, B and C, such as AB, AC, BC, or ABC, for example.

"Substantially" and "approximately" when used in conjunction with a value encompass a difference of 5% or less of the same unit and/or scale of that being measured.

"Simultaneously" as used herein includes lag and/or latency times associated with a conventional and/or proprietary computer, such as processors and/or networks described herein attempting to process multiple types of data at the same time. "Simultaneously" also includes the time it takes for digital signals to transfer from one physical location to another, be it over a wireless and/or wired network, and/or within processor circuitry.

As used herein, "can" or "may" or derivations there of (e.g., the system can execute instructions X) are used for descriptive purposes only and is understood to be synonymous and/or interchangeable with "configured to" (e.g., the computer is configured to execute instructions X) when defining the metes and bounds of the system.

In addition, the term "configured to" means that the limitations recited in the specification and/or the claims must be arranged in such a way to perform the recited function: "configured to" excludes structures in the art that are "capable of" being modified to perform the recited function but the disclosures associated with the art have no explicit teachings to do so. For example, a recitation of a "container configured to receive a fluid from structure X at an upper portion and deliver fluid from a lower portion to structure Y" is limited to systems where structure X, structure Y, and the container are all disclosed as arranged to perform the recited function. The recitation "configured to" excludes elements that may be "capable of" performing the recited function simply by virtue of their construction but associated disclosures (or lack thereof) provide no teachings to make such a modification to meet the functional limitations between all structures recited. Another example is "a computer system configured to or programmed to execute a series of instructions X, Y, and Z." In this example, the instructions must be present on a non-transitory computer readable medium such that the computer system is "configured to" and/or "programmed to" execute the recited instructions: "configure to" and/or "programmed to" excludes art teaching computer systems with non-transitory computer readable media merely "capable of" having the recited instructions stored thereon but have no teachings of the instructions X, Y, and Z programmed and stored thereon. The recitation "configured to" can also be interpreted as synonymous with operatively connected when used in conjunction with physical structures.

It is understood that the phraseology and terminology used herein is for description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The previous detailed description is to be read with reference to the figures, in which like elements in different figures have like reference numerals. The figures, which are not necessarily to scale, depict some embodiments and are not intended to limit the scope of embodiments of the system. Any text within the figures is part of the written description. Any display of a graphical user interface or dashboard is part of the disclosure, and it is understood that descriptions of one or more portions of the graphical user interface when defining the metes and bounds of the system does not require verbatim language in the specification so long as the language used is supported by the image in the figure.

Any of the operations described herein that form part of the invention are useful machine operations. The invention also relates to a device or an apparatus for performing these operations. The apparatus can be specially constructed for the required purpose, such as a special purpose computer. When defined as a special purpose computer, the computer can also perform other processing, program execution or routines that are not part of the special purpose, while still being capable of operating for the special purpose. Alternatively, the operations can be processed by a general-purpose computer selectively activated or configured by one or more computer programs stored in the computer memory, cache, or obtained over a network. When data is obtained over a network the data can be processed by other computers on the network, e.g., a cloud of computing resources.

The embodiments of the invention can also be defined as a machine that transforms data from one state to another state. The data can represent an article, that can be represented as an electronic signal and electronically manipulate data. The transformed data can, in some cases, be visually depicted on a display, representing the physical object that results from the transformation of data. The transformed data can be saved to storage generally, or in particular formats that enable the construction or depiction of a physical and tangible object. In some embodiments, the manipulation can be performed by a processor. In such an example, the processor thus transforms the data from one thing to another. Still further, some embodiments include methods can be processed by one or more machines or processors that can be connected over a network. Each machine can transform data from one state or thing to another, and can also process data, save data to storage, transmit data over a network, display the result, or communicate the result to another machine. Computer-readable storage media, as used herein, refers to physical or tangible storage (as opposed to signals) and includes without limitation volatile and non-volatile, removable, and non-removable storage media implemented in any method or technology for the tangible storage of information such as computer-readable instructions, data structures, program modules or other data.

Although method operations are presented in a specific order according to some embodiments, the execution of those steps do not necessarily occur in the order listed unless explicitly specified. Also, other housekeeping operations can be performed in between operations, operations can be adjusted so that they occur at slightly different times, and/or operations can be distributed in a system which allows the occurrence of the processing operations at various intervals associated with the processing, as long as the processing of the overlay operations are performed in the desired way and result in the desired system output.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein. Various features and advantages of the invention are set forth in the following claims.

We claim:

1. A system for determining a value of a digital asset comprising: one or more computers comprising one or more processors and one or more non-transitory computer readable media, the one or more non-transitory computer readable media including instructions stored thereon that when executed cause the one or more computers to:
generate, by the one or more processors, a first digital asset;
associate, by the one or more processors, the digital asset with a first sport team;
assign, by the one or more processors, a first monetary value to the first digital asset;
generate, by the one or more processors, a second digital asset;
associate, by the one or more processors, the second digital asset with a second sport team;
assign, by the one or more processors, a second monetary value to the second digital asset; execute, by the one or more processors, an analysis of a performance of the first sport team;
execute, by the one or more processors, an analysis of a performance of the second sport team;
determine, by the one or more processors, which of the first sport team or the second sport team has a higher performance;
alter, by the one or more processors, the first monetary value of the first digital asset to be higher than the second monetary value of the second digital asset if the first sport team is determined to have a higher performance than the second sport team; and
alter, by the one or more processors, the second monetary value of the second digital asset to be higher than the first monetary value of the first digital asset if the second sport team is determined to have a higher performance than the first sport team,
wherein the system is configured to alter the first monetary value of the first digital asset during a live sporting event including a competition between the first sport team and a different sport team;
wherein the first digital asset and the second digital asset are stored on a blockchain;
wherein the one or more non-transitory computer readable media further include instructions stored thereon that when executed cause the one or more computers to:
generate, by the one or more processors, a dashboard on a graphical user interface (GUD; and
display, by the one or more processors, a change in monetary value over time of the first digital asset on the dashboard;
display, by the one or more processors, a link to purchase at least one of a plurality of digital assets;
receive, by the one or more processors, a request to purchase at least one of the plurality of digital assets;
convert, by one or more processor, one or more conventional crypto based currencies to fiat currencies or any other currencies by burning tokens and allotting to completing transactions;
receive, by the one or more processors, a confirmation of a purchase of the at least one of the plurality of digital assets; and
record, by the one or more processors, the confirmation on a blockchain.

2. The system of claim 1, wherein the system is configured to alter the first monetary value of the first digital asset based on a score between the first sport team and the different sport team.

3. The system of claim 1, the analysis of the performance of the first sport team includes a ranking analysis of a first sport team's national and/or international ranking.

4. The system of claim 1, wherein determining whether the performance of the first sport team is higher than the performance of the second sport team includes determining if a first sport team fan participation of the first sport team is higher than a second sport team fan participation of the second sport team.

5. The system of claim 4, wherein the first sport team fan participation and the second sport team fan participation each include one or more of game ticket sales, game attendance, pay-per-view subscriptions, broadcast ratings, polling data, online views, online searches, online trending.

6. The system of claim 1,
wherein the one or more non-transitory computer readable media further include instructions stored thereon that when executed cause the one or more computers to:
generate, by the one or more processors, a first digital wallet for a first user; generate, by the one or more processors, a dashboard on a graphical user interface (GUD; and display, by the one or more processors, a first digital wallet link to the first digital wallet on the dashboard; wherein the first digital wallet is configured to store an access right to the digital asset.

7. The system of claim 1, wherein the one or more non-transitory computer readable media further include instructions stored thereon that when executed cause the one or more computers to:

generate, by the one or more processors, a dashboard on a graphical user interface (GUD;

display, by the one or more processors, a list of sport teams; display, by the one or more processors, a list of digital assets including a plurality of digital assets; and display, by the one or more processors, a monetary value of each digital asset on the list of digital assets; wherein each of the plurality of digital assets is associated with a sport team on the list of sport teams.

8. The system of claim 7, wherein the one or more non-transitory computer readable media further include instructions stored thereon that when executed cause the one or more computers to: display, by the one or more processors, a link to purchase at least one of the plurality of digital assets on the GUI.

9. The system of claim 1, wherein the one or more non-transitory computer readable media further include instructions stored thereon that when executed cause the one or more computers to: send, by the one or more processors, a crypto key to a digital wallet; wherein the crypto key is configured to enable a user to access the at least one of the plurality of digital assets on the blockchain.

10. The system of claim 1, wherein the digital asset is one of a crypto coin and a crypto token.

* * * * *